US012327459B2

(12) United States Patent
Shigeta

(10) Patent No.: US 12,327,459 B2
(45) Date of Patent: Jun. 10, 2025

(54) MANAGEMENT SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 16/770,110

(22) PCT Filed: Oct. 30, 2018

(86) PCT No.: PCT/JP2018/040308

§ 371 (c)(1),
(2) Date: Jun. 5, 2020

(87) PCT Pub. No.: WO2019/111593

PCT Pub. Date: Jun. 13, 2019

(65) Prior Publication Data

US 2020/0349806 A1 Nov. 5, 2020

(30) Foreign Application Priority Data

Dec. 5, 2017 (JP) ................................ 2017-233190

(51) Int. Cl.
*G07F 17/32* (2006.01)

(52) U.S. Cl.
CPC ...... *G07F 17/3248* (2013.01); *G07F 17/3209* (2013.01); *G07F 17/322* (2013.01); (Continued)

(58) Field of Classification Search
CPC ............. G07F 17/3248; G07F 17/3209; G07F 17/322; G07F 17/3234; G07F 17/3241; G07F 17/3237
See application file for complete search history.

(56) References Cited

U.S. PATENT DOCUMENTS 5,651,548 A 7/1997 French et al.
9,361,577 B2 6/2016 Miyashita
(Continued)

FOREIGN PATENT DOCUMENTS

CN 101804251 A 8/2010
CN 105580057 A 5/2016
(Continued)

OTHER PUBLICATIONS

International Search Report issued on Jan. 29, 2019 issued in corresponding / family PCT Application PCT/JP2018/040308.
(Continued)

*Primary Examiner* — Jasson H Yoo
(74) *Attorney, Agent, or Firm* — NORTON ROSE FULBRIGHT US LLP

(57) ABSTRACT

A management system includes a card distributing device that determines a win/loss result of a game using substitute gaming chips on a game table, a dealer chip determining device that specifies type and the number of substitute gaming chips held in a substitute gaming chip tray, a measuring device that measures position, type, and the number of substitute gaming chips on the game table, and a management control device that has a function of transmitting a signal or performing display on a display device depending on a comparison result between a collection amount and an increase amount and a comparison result between a payment amount and a decrease amount, and changes the signal or an output content of the display depending on a content of inconsistency when the inconsistency is determined in the comparison results.

28 Claims, 37 Drawing Sheets

(52) U.S. Cl.
CPC ...... *G07F 17/3225* (2013.01); *G07F 17/3234* (2013.01); *G07F 17/3241* (2013.01); *G07F 17/3244* (2013.01)

(56) References Cited

U.S. PATENT DOCUMENTS

| | | | | |
|---|---|---|---|---|
| 9,779,582 | B1 | 10/2017 | Ben Hanan et al. | |
| 10,032,335 | B2 * | 7/2018 | Shigeta | G07F 17/3248 |
| 10,134,231 | B2 | 11/2018 | Takeda | |
| 10,600,282 | B2 * | 3/2020 | Shigeta | A63F 3/00157 |
| 11,074,780 | B2 | 7/2021 | Shigeta | |
| 2001/0000778 | A1 | 5/2001 | Sines et al. | |
| 2002/0042298 | A1 | 4/2002 | Soltys et al. | |
| 2002/0042299 | A1 * | 4/2002 | Soltys | G07F 17/32 463/29 |
| 2002/0090988 | A1 | 7/2002 | Frost et al. | |
| 2003/0064774 | A1 | 4/2003 | Fujimoto et al. | |
| 2004/0219975 | A1 | 11/2004 | Soltys et al. | |
| 2005/0026680 | A1 | 2/2005 | Gururajan | |
| 2005/0137005 | A1 * | 6/2005 | Soltys | A63F 1/18 463/13 |
| 2005/0278542 | A1 | 12/2005 | Pierson et al. | |
| 2006/0019739 | A1 | 1/2006 | Soltys et al. | |
| 2006/0128472 | A1 | 6/2006 | Beavers | |
| 2006/0252521 | A1 | 11/2006 | Gururajan et al. | |
| 2007/0111773 | A1 | 5/2007 | Gururajan et al. | |
| 2008/0113783 | A1 | 5/2008 | Czyzewski et al. | |
| 2009/0140492 | A1 | 6/2009 | Yoseloff et al. | |
| 2009/0233699 | A1 * | 9/2009 | Koyama | G07F 17/32 463/31 |
| 2009/0291762 | A1 | 11/2009 | Walker | |
| 2010/0105486 | A1 | 4/2010 | Shigeta | |
| 2010/0171267 | A1 | 7/2010 | Walker | |
| 2010/0222140 | A1 | 9/2010 | Dewaal | |
| 2011/0052049 | A1 | 3/2011 | Rajaraman et al. | |
| 2012/0252564 | A1 | 10/2012 | Moore et al. | |
| 2013/0307215 | A1 | 11/2013 | Shigeta | |
| 2013/0316797 | A1 | 11/2013 | Gelinotte et al. | |
| 2014/0094256 | A1 | 4/2014 | Hilbert et al. | |
| 2014/0194199 | A1 | 7/2014 | DiGiovanni | |
| 2014/0291399 | A1 | 10/2014 | Koyama | |
| 2015/0036920 | A1 | 2/2015 | Wu et al. | |
| 2015/0072775 | A1 | 3/2015 | McDonald et al. | |
| 2015/0312517 | A1 | 10/2015 | Hoyt et al. | |
| 2015/0373284 | A1 | 12/2015 | Blazevic | |
| 2016/0093165 | A1 | 3/2016 | Panambur et al. | |
| 2016/0171336 | A1 | 6/2016 | Schwartz | |
| 2017/0039807 | A1 | 2/2017 | Shigeta | |
| 2017/0076553 | A1 | 3/2017 | Washington et al. | |
| 2018/0070687 | A1 | 3/2018 | Shigeta | |
| 2018/0075690 | A1 * | 3/2018 | Moore | G07F 17/3288 |
| 2018/0247134 | A1 | 8/2018 | Bulzacki et al. | |
| 2018/0357850 | A1 | 12/2018 | Moore | |
| 2019/0287349 | A1 | 9/2019 | Cohen | |

FOREIGN PATENT DOCUMENTS

| | | | |
|---|---|---|---|
| CN | 106408785 | A | 2/2017 |
| CN | 107358758 | A | 11/2017 |
| JP | 2003070957 | A | 3/2003 |
| JP | 2005342175 | A | 12/2005 |
| JP | 2010263997 | A | 11/2010 |
| JP | 2011067339 | A | 4/2011 |
| JP | 2012196422 | A | 10/2012 |
| JP | 2016093565 | A | 5/2016 |
| JP | 2016110232 | A | 6/2016 |
| JP | 2017064386 | A | 4/2017 |
| WO | 2008120749 | A1 | 10/2008 |
| WO | 2015107902 | A1 | 7/2015 |
| WO | 2016187164 | A1 | 11/2016 |
| WO | 2017022767 | A1 | 2/2017 |

OTHER PUBLICATIONS

Chinese Office Action dated Oct. 30, 2020 issued in CN patent application 201811453594.6.
US Office Action issued on Sep. 24, 2021 issued in U.S. Appl. No. 16/207,723.
Japanese Office Action issued on Jul. 5, 2022 issued in JP Application 2018-203827.
Japanese Office Action issued for JP2022-210970 dated Sep. 12, 2023.
US Office Action issued for U.S. Appl. No. 18/218,201 dated Mar. 22, 2024.
Chinese Office Action issued for CN 201880079109.5 dated Jun. 13, 2024.
European Patent Office Action dated Apr. 22, 2025, issued in EP Application No. 20211592.9.

* cited by examiner

MANAGEMENT SYSTEM

CROSS REFERENCE TO RELATED APPLICATION

This nonprovisional application is a national phase application under 35 U.S.C. § 371 of International Application No. PCT/JP2018/040308 filed Oct. 30, 2018, which claims priority to Japanese Patent Application No. 2017-233190 filed Dec. 5, 2017, the entire contents of each of which are hereby incorporated by reference.

FIELD

The present invention relates to a management system that manages a game using substitute gaming chips in a game house.

BACKGROUND AND SUMMARY

In a game house such as a casino, an attempt to prevent various fraudulent acts has been conducted. The game house includes a monitoring camera for monitoring the fraudulent acts, and has prevented fraud by determining fraud of a game or fraud due to collection or redemption of substitute gaming chips that does not accord with a win/loss result from an image obtained from the monitoring camera.

Meanwhile, it has been proposed to grasp an amount of substitute gaming chips by attaching radio integrated substitute gaming chip (IC) (radio frequency identification (RFID)) tags to the respective substitute gaming chips in order to grasp the number or a total amount of bet substitute gaming chips.

In a card game monitoring system described in WO 2015/107902 A, it is determined whether substitute gaming chips put on a game table have been collected or paid depending on a win/loss result by image analysis for the movement of the substitute gaming chips to monitor fraudulent acts.

An object of the present invention is to provide a novel management system that manages liquidation of substitute gaming chips in a game using the substitute gaming chips.

A management system according one aspect of the present embodiment is a management system that manages a game using substitute gaming chips, and includes substitute gaming chips that are individually identifiable; a game table for playing a game using the substitute gaming chips; a win/loss determining device that determines and displays a win/loss result of the game on the game table; a substitute gaming chip tray that holds substitute gaming chips used by a dealer on the game table; a dealer chip determining device that specifies types and the numbers of substitute gaming chips held in the substitute gaming chip tray; a measuring device that measures positions, types, and the numbers of substitute gaming chips on the game table; and a management control device that has a function of grasping the positions, the types, and the numbers of substitute gaming chips on the game table and calculating a balance of a casino side on the game table using the win/loss result obtained from the win/loss determining device, wherein the management control device has a function of comparing a collection amount of substitute gaming chips to be collected from the game table by the casino side in the game on the basis of information obtained from the measuring device, the dealer chip determining device, and the win/loss determining device with an increase amount of substitute gaming chips in the substitute gaming chip tray after the dealer collects the substitute gaming chips, comparing a payment amount of substitute gaming chips to be paid by the casino side in the game with a decrease amount of substitute gaming chips in the substitute gaming chip tray after the dealer takes out and pays the substitute gaming chips from the substitute gaming chip tray, and transmitting a signal or performing display on a display device depending on a comparison result between the collection amount and the increase amount and a comparison result between the payment amount and the decrease amount, and changes the signal or an output content of the display depending on a content of inconsistency when the inconsistency is determined in the comparison results.

EXAMPLES FOR CARRYING OUT THE INVENTION

Figure 1:
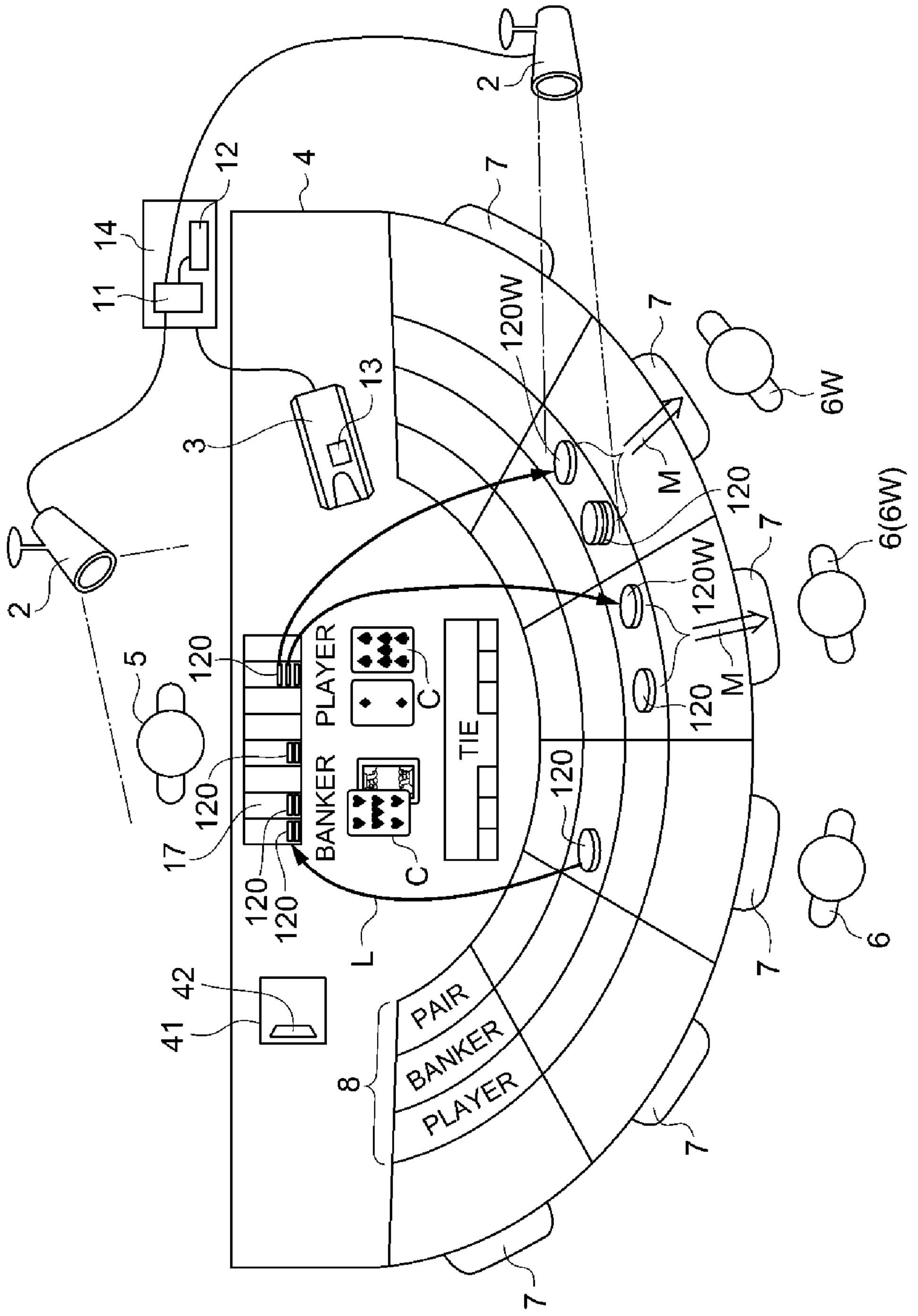
FIG. 1 is a diagram illustrating an overview of the whole fraud detecting system in a game house including a plurality of gaming tables according to a first embodiment of the present invention.

A management system according one aspect of the present embodiment is a management system that manages a game using substitute gaming chips, and includes substitute gaming chips that are individually identifiable; a game table for playing a game using the substitute gaming chips; a win/loss determining device that determines and displays a win/loss result of the game on the game table; a substitute gaming chip tray that holds substitute gaming chips used by a dealer on the game table; a dealer chip determining device that specifies types and the numbers of substitute gaming chips held in the substitute gaming chip tray; a measuring device that measures positions, types, and the numbers of substitute gaming chips on the game table; and a management control device that has a function of grasping the positions, the types, and the numbers of substitute gaming chips on the game table and calculating a balance of a casino side on the game table using the win/loss result obtained from the win/loss determining device, wherein the management control device has a function of comparing a collection amount of substitute gaming chips to be collected from the game table by the casino side in the game on the basis of information obtained from the measuring device, the dealer chip determining device, and the win/loss determining device with an increase amount of substitute gaming chips in the substitute gaming chip tray after the dealer collects the substitute gaming chips, comparing a payment amount of substitute gaming chips to be paid by the casino side in the game with a decrease amount of substitute gaming chips in the substitute gaming chip tray after the dealer takes out and pays the substitute gaming chips from the substitute gaming chip tray, and transmitting a signal or performing display on a display device depending on a comparison result between the collection amount and the increase amount and a comparison result between the payment amount and the decrease amount, and changes the signal or an output content of the display depending on a content of inconsistency when the inconsistency is determined in the comparison results.

The management control device may, when there is the inconsistency between the actual liquidation amount and the calculated liquidation amount and the inconsistency is a small amount (less than a predetermined threshold), report that there is the inconsistency of a small amount or an amount of the inconsistency to a backyard, in addition to this/instead of this, may output a signal to the game table to display a lamp indicating continuing games at the game table without stopping games or to display the amount of the inconsistency at the game table.

The management control device may, when there is the inconsistency between the actual liquidation amount and the calculated liquidation amount and the inconsistency is a small amount, display the amount of the inconsistency directly at the game table, and the dealer may determine whether to stop games based on the displayed amount or continue the games without stopping the games.

The management control device may, when there is the inconsistency between the actual liquidation amount and the calculated liquidation amount and a ratio of the amount of the inconsistency to bet amount is less than a certain ratio, output a signal indicating continuing the games without stopping.

The management control device may have a function of outputting a signal for stopping the game of the game table or a signal for continuing the game of the game table without stopping the game of the game table when the inconsistency is determined in the comparison result between the collection amount and the increase amount or the comparison result between the payment amount and the decrease amount.

The management control device may have a function of outputting a signal for stopping the game of the game table when the inconsistency is continuous even though the inconsistency is a small amount of inconsistency when an amount of inconsistency is divided by a predetermined amount.

The management control device may have a function of causing the display device displaying the inconsistency to perform display specifying a player position or a game participant that is a cause of the inconsistency.

A management system according another aspect of the present embodiment is a management system that manages a game using substitute gaming chips, and includes a game table for playing a game using the substitute gaming chips; a game determining unit that determines a game result; a bet determining unit that determines a bet target and a bet amount of a player; a liquidation determining unit that determines an actual liquidation amount of substitute gaming chips delivered between a dealer and the player; and a control unit that performs a first control when a predetermined condition is not satisfied and performs a second control different from the first control when the predetermined condition is satisfied, in the case where there is a difference between a calculated liquidation amount and the actual liquidation amount, the calculated liquidation amount being calculated from the game result and the bet target and the bet amount, and the actual liquidation amount being determined by the liquidation determining unit.

The predetermined condition may be a condition relating to the difference.

The predetermined condition may be that the difference in a one-time game is larger than a first threshold value.

The predetermined condition may be that a total sum of the differences in recent predetermined-time games is larger than a second threshold value.

The predetermined condition may be that the difference is continuously equal to or larger than a third threshold value in recent predetermined-time games.

The predetermined condition may be that the bet amount is equal to or larger than a fourth threshold value.

The control unit may perform a third control different from the first control and the second control in the case where there is no difference.

The management system may further include a display panel, wherein the control unit may perform the first control and the second control on the display panel.

The control unit may display different contents on the display panel in the first control and the second control.

The management system may further include a lighting device, wherein the control unit may perform the first control and the second control on the lighting device.

The control unit may turn on the lighting device with different colors in the first control and the second control.

The management system may further include a card distributing device that distributes cards used in the game to the game table, wherein the control unit may perform the first control and the second control on the card distributing device.

The control unit may perform a control to prohibit distribution of the card from the card distributing device as the second control.

The control unit may change the predetermined condition based on an input from a user.

The management system may further include a storage device, wherein the control unit may record the difference in the storage device.

Hereinafter, embodiments of the present invention is described more in detail.

In game houses such as casinos, while substitute gaming chips are piled to have a high volume and is placed on a game table, there is a problem in that a total amount cannot be correctly read by a reading device for IC tags disposed under the game table, and, when the sensitivity of the reading device is increased, substitute gaming chips placed at a different position (winning/losing depends on the position) is added, and there is a problem in that a total amount of substitute gaming chips at each position cannot be perceived. In addition, in imaging using a camera, there is a problem in that a blind area is generated according to the viewing angle of the camera, or a substitute gaming chip enters a shadow due to overlapping, and thus, there is a problem in that a total amount of substitute gaming chips cannot be perceived.

In addition, according to player's squeeze (a behavior for seeing a card little by little by bending a card facing the back side while enjoying the rank of the card or the like) of a card, which is frequently performed in a Baccarat game, or the like, the card is bent, and there is a problem in that the rank and the suit of the card cannot be determined through an analysis of an image acquired from a camera.

Furthermore, fraud on a game table has been advanced, and there is a new problem in that fraud using an advanced betting method or the like that cannot be found in simple detection of a large winning amount on a game table or the like cannot be found by using a camera or tracking a winning amount. In addition, the prevention of fraud according to a conspiracy of a dealer and a player is not sufficient according to the conventional technology.

In order to solve the various problems described above, a fraud detecting system according to a first embodiment in a game house including a plurality of game tables is a fraud detecting system in a game house including a plurality of game tables and includes: a game recording device that records a state of progress of a game performed on each of the game table as a video including a dealer and a player through a camera; an image analyzing device that performs an image analysis of the recorded video of the state of progress of the game; a card distributing device that determines and displays a result of winning/losing of each game in the game table; and a control device that detects fraud performed in the game table by using a result of the image analysis performed by the image analyzing device and the result of winning/losing determined by the card distributing device.

In addition, in the fraud detecting system, the card distributing device has a structure capable of reading the rank of each distributed card, and the control device has a structure capable of determining match/mismatch by combining information of a rank acquired by the image analyzing device from a video of each card distributed in the game table and information of a rank of a card read by the card distributing device.

In addition, in the fraud detecting system, the image analyzing device or the control device has an artificial intelligence-utilizing or deep-learning structure capable of acquiring information of a rank of a card from a card that is distributed in the game table and is bent by the player or is contaminated.

Furthermore, in the fraud detecting system, the control device acquires the position, the type, and the number of substitute gaming chips that is bet by each player through the image analyzing device and determines whether or not collection of losing substitute gaming chips that is bet by each player and repayment for the winning chips are appropriately performed according to the result of winning/losing of the game by analyzing the video of the state of progress of the game through the image analyzing device.

In addition, in the fraud detecting system, the image analyzing device or the control device has an artificial intelligence-utilizing or deep-learning structure capable of acquiring information of the type, the number, and the position of the bet substitute gaming chips also in a state in which a plurality of substitute gaming chips placed on a game table is in a state in which a part or the whole one is hidden according to a hidden area of the camera.

Furthermore, in the fraud detecting system, the control device has an artificial intelligence-utilizing or deep-learning structure capable of comparing/calculating whether or not the amount of substitute gaming chips perceived in a dealer's substitute gaming chip tray in the game table is increased/decreased according to the collection of losing substitute gaming chips that is bet by each player and a paid amount for winning chips based on a result of winning/losing of the game after the game ends and a settlement.

In addition, in the fraud detecting system, the control device has an artificial intelligence-utilizing or deep-learning structure capable of acquiring the position and the amount of substitute gaming chips that is bet at each play position of the game table and extracting an abnormal situation by comparing a winning/losing history and an acquired amount of substitute gaming chips for each player that are acquired from a result of winning/losing of each game with statistical data of past game.

Furthermore, in the fraud detecting system, the control device has an artificial intelligence-utilizing or deep-learning structure capable of extracting an abnormal situation by comparing a state in which the amount of the bet substitute gaming chips at the time of losing is smaller than the amount of the bet substitute gaming chips at the time of losing at a play position of a game table with statistical data of past games.

In addition, in the fraud detecting system, the control device has a structure capable of specifying whether the abnormal situation is extracted through the image analyzing device or an individual player at a play position at which winning of a predetermined amount of more is acquired.

Furthermore, in the fraud detecting system, the control device has a warning function for giving a notification of the presence of a specific player at another game table when the specified player leaves the seat and arrives at the another game table.

In order to solve the various problems described above, according to the present invention, a fraud detecting system in a game house including a plurality of game tables includes: a game recording device that records a state of progress of a game performed on each of the game table as a video including a dealer and a player through a camera; a card distributing device that determines a result of winning/losing of each game in the game table; an image analyzing device that performs an image analysis of the recorded video of the state of processing of the game; and a control device that can detect bills and substitute gaming chips in the game table by using a result of the image analysis performed by the image analyzing device, and the image analyzing device or the control device has an artificial intelligence-utilizing or deep-learning structure capable of detecting exchange of bills and substitute gaming chips in the game table in a situation other than in the middle of dealing cards based on information acquired from the card distributing device or the dealer, recognizing a total amount of genuine bills verified using among the bills and capable of recognizing a total amount of substitute gaming chips also in a state in which a plurality of substitute gaming chips come out onto the game table as an exchange target is in a state in which a part or the whole one is hidden due to a blind area of the camera and comparing a total amount of bills come out from the player onto the game table and a total amount of substitute gaming chips come out from the dealer with each other and determining whether or not the both numbers match.

In addition, in the fraud detecting system, the control device has an artificial intelligence-utilizing or deep-learning structure capable of comparing/calculating whether or not the amount of substitute gaming chips perceived in a dealer's substitute gaming chip tray in the game table is increased/decreased according to a payed amount of substitute gaming chips corresponding to exchanged bills after a settlement through exchange of bills and substitute gaming chips.

Furthermore, in the fraud detecting system, the control device has an artificial intelligence-utilizing or deep-learning structure capable of comparing/calculating match/mismatch of an input amount of bills according to a dealer's input and a total amount of bills according to a result of the image analysis performed by the image analyzing device after the settlement through exchange of bills and substitute gaming chips. In addition, the control device has an artificial intelligence-utilizing or deep-learning structure capable of comparing/calculating match/mismatch of a total input amount of bills according to a dealer's input in the game table for which the dealer is responsible and a total amount of bills according to a result of the image analysis performed by the image analyzing device.

According to a fraud detecting system according to this embodiment, also when a card is bent according to player's squeeze of the card that is frequently performed in a Baccarat game or the like, the rank and the suit of the card can be determined through an image analysis, and a total amount of substitute gaming chips disposed in the blind area or overlapping substitute gaming chips can be perceived together with the position. In addition, fraud at the time of exchange of bills and substitute gaming chips can be detected as well.

Hereinafter, an overview of the whole fraud detecting system in a game house including a plurality of game tables according to a first embodiment of the present invention will be described in more detail. FIG. 1 is a diagram illustrating an overview of the whole system, the fraud detecting system in a game house including a plurality of game tables 4 includes: a game recording device 11 that records the state of progress of a game performed in the game table 4 as a video including players 6 and a dealer 5 through a plurality of camera devices 2; an image analyzing device 12 that performs an image analysis of the recorded video of the state of process of the game; and a card distributing device 3 that determines and displays a result of winning/losing of each game in the game table 4. The card distributing device 3 is a so-called electronic shooter that has already been used by persons skilled in the art and has rules of a game programmed in advance and has a structure capable of determining winning/losing of a game by reading information of distributed cards C. For example, in a Baccarat game, winning of the baker, winning of a player, or tie (drawn) is determined basically based on the ranks of two to three cards, and a determination result (a result of winning/losing) is displayed in a result display lamp 13.

The fraud detecting system further includes a control device 14 that compares the rank of actual cards according to a result of the image analysis performed by the image analyzing device 12 and a result of winning/losing determined by the card distributing device 3 with each other and detects fraud (mismatch between a sum of ranks of distributed cards and a result of winning/losing) performed in the game table 4. The card distributing device 3 has a structure capable of reading ranks (A, 2 to 10, J, Q, K) and suits (hearts, spades, or the like) of cards C that are manually distributed by the dealer 5, and the control device 14 has a structure capable of determining match/mismatch by collating information of a rank and suites acquired by the image analyzing device 12 (using artificial intelligence) from a video (captured by using the camera device 2) of cards distributed in the game table 4 and information of cards and suits read by the card distributing device 3 with each other. The image analyzing device 12 and the control device 14 of the fraud detecting system have a structure integrally including a computer formed as one body or by a plurality of configurations, a program, and a memory.

Figure 3:
FIG. 3 is an enlarged diagram of a mark illustrating contamination of a card perceived according to the first embodiment of the present invention.

The image analyzing device 12 and the control device 14 have an artificial intelligence-utilizing or deep-learning structure capable of acquiring information of ranks of cards also for cards C that are distributed in the game table 4 and are bent or contaminated by the player 6. For a contaminated card C, as illustrated in FIG. 3, there is a situation in which it is difficult to determine clubs or spades. Also in such a case, the suite can be determined by an artificial intelligence-utilizing computer or control system, an analysis and a determination of an image using a deep learning (structure) technology. In addition, also in a case where a card is bent according to a player's squeeze of a card, which is frequently performed in a Baccarat game or the like, by using self-learning of examples of many deformations of images or the like, a suit and a rank of a card before deformation can be recognized according to an artificial intelligence-utilizing computer or control system and a deep learning (structure) technology. The artificial intelligence-utilizing computer or control system and the deep learning (structure) technology are known as a person skilled in the art and can be used, and thus, detailed description thereof will not be presented.

Figure 2A:
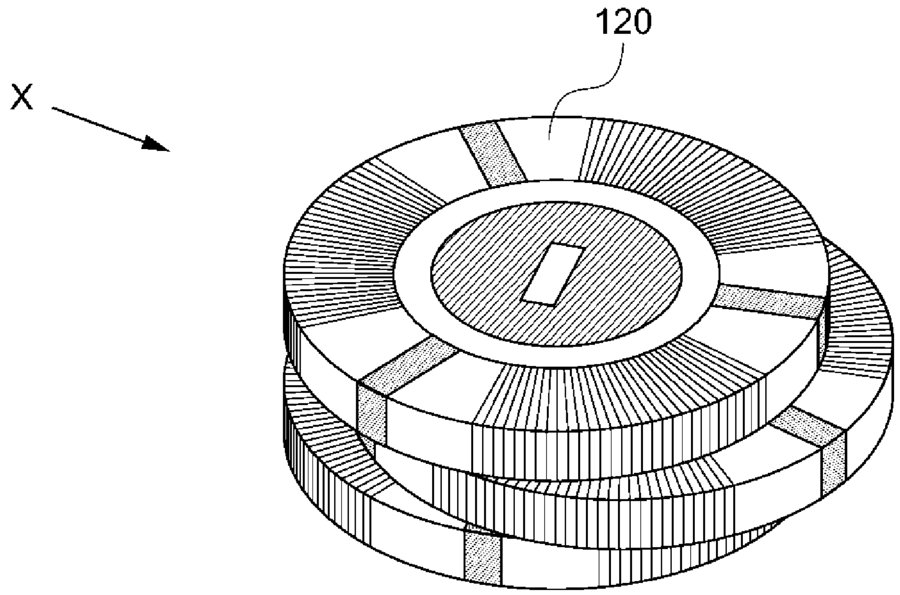
FIG. 2A is a perspective view of substitute gaming chips illustrating an example of another overlapping state of substitute gaming chips perceived according to the first embodiment of the present invention.
Figure 2B:
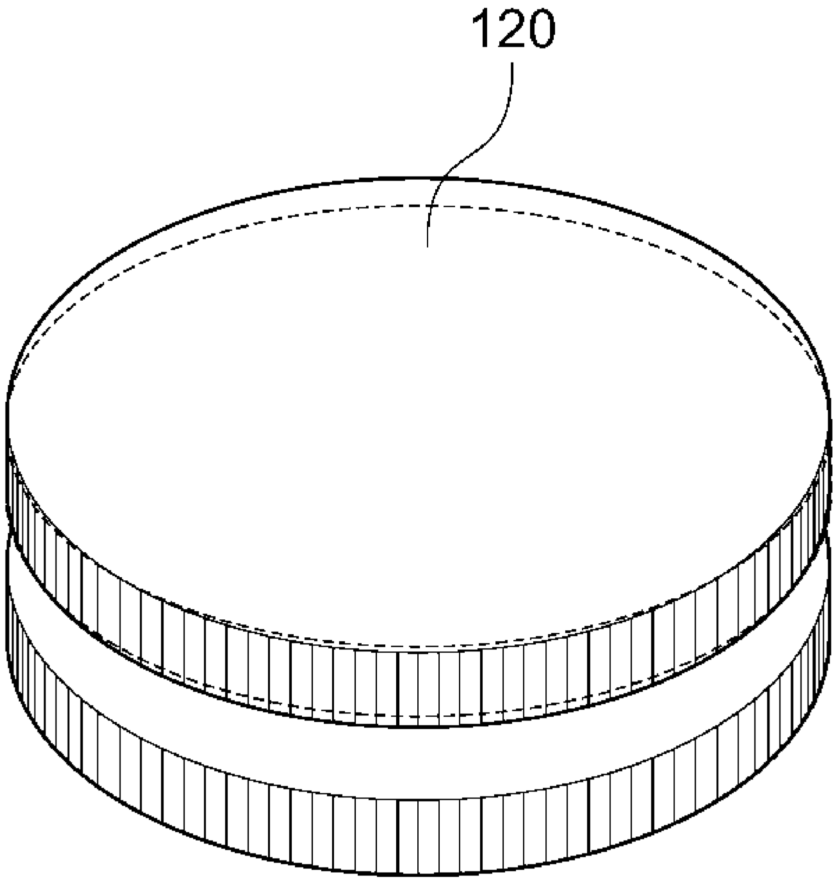
FIG. 2B is a perspective view of substitute gaming chips illustrating an example of another overlapping state of substitute gaming chips perceived according to the first embodiment of the present invention.

The control device 14 having an artificial intelligence-utilizing or deep learning structure can perceive a position (a player, a banker, or a pair) inside a bet area 8 on which each player 6 bets substitute gaming chips 120, the type (a value of a different amount is assigned to substitute gaming chips 120 for each color) and the number of the bet substitute gaming chips 120 through the camera device 2 and the image analyzing device 12. Not only there is a case where the substitute gaming chip 120 is vertically arranged to be superimposed but also there is a case where the substitute gaming chips are superimposed with deviations as illustrated in FIG. 2A. In such a case, in a case where the camera device 2 is positioned in the direction of an arrow X illustrated in FIG. 2A (or the direction of the substitute gaming chip 120 is relatively in a blind area), as illustrated in FIG. 2B, it is assumed that the substitute gaming chip 120 is not visible (enters a blind area). According to the artificial intelligence-utilizing computer or control system or the deep-learning technology, by using a self-learning function or the like, hidden substitute gaming chip 120 due to a blind area or the like is recognized (there are case where a part of one unit of substitute gaming chips are hidden or a case where the whole substitute gaming chips are hidden), and the number and the like can be correctly perceived.

In this way, since a position (a player, a banker, or a pair) inside the bet area 8 on which the substitute gaming chips 12 are bet and the type (a value of a different amount is assigned to substitute gaming chip 120 for each color) and the number of the bet substitute gaming chips 120 can be perceived, the control device 14 determines whether or not collection (denoted by an arrow L) of the losing substitute gaming chips bet by each player 6 and payment (120W) for winning chips to a player 6W who has won are properly performed according to a result of winning/losing of a game in accordance with a result of winning/losing of the game determined by the card distributing device 3 in each game by analyzing a video of the state of process of the game through the image analyzing device 12. In a case where a determination result acquired through an analysis using the image analyzing device 12 is different from a result (for example, a result of reading using an RFID) of reading using the other means, the intelligent-type control device 14 stores the analysis image and can verify the result later. As a result of the verification, in the case of an error in the intelligent-type control device 14, by using the analysis image as sample data of teacher leaning in the deep-learning technology, the accuracy of the intelligent-type control device 14 can be improved.

The control device 14 can analyze and acquire a total amount of the substitute gaming chips 120 in the substitute gaming chip tray 17 for the dealer 5 in the game table 4 by using the image analyzing device 12 and can compare and calculate whether or not a total amount of the substitute gaming chips 120 inside the tray 17 for the substitute gaming chips 120 has been increased or decreased according to the amount of collection of the losing substitute gaming chips 120 bet by each player 6 and the amount of the payment 120W for winning chips to a player 6W who has won after the end of the game and the settlement based on a result of winning/losing of the game. A total amount of the substitute gaming chips 120 in the substitute gaming chip tray 17 120 may be constantly acquired using means such as an RFID, and the control device 14 determines whether or not the increased/decreased amount is correct by analyzing the video of the state of progress of the game through the image analyzing device 12.

For this, the artificial intelligence-type or deep-leaning structure is also used.

In this example, since fraud or a mistake is detected based on a result of winning/losing of a game, information of the type of bet substitute gaming chip 120, the position (a player, a banker, or a pair) inside the bet area 8 on which the substitute gaming chips 120 are bet, and the amount of the substitute gaming chips 120, and an increased/decreased amount of the substitute gaming chips 120 in the substitute gaming chip tray 17 after the end of the collection of losing substitute gaming chips and the repayment for the won substitute gaming chips 120 without acquiring the movement of the substitute gaming chips 120 after the end of the game, that is, whether the bet substitute gaming chips 120 has been moved to the player side or the dealer side.

For example, in the case of Baccarat, a result of winning/losing of a game can be determined based on rules of Baccarat by reading ranks of cards C delivered in that game by the card distributing device 3. In addition, a result of winning/losing of a game can be determined also by imaging an area on the game table 4 by using the camera device 2, analyzing the image using the image analyzing device 12, and collating a result of the analysis with the rules of the game by using the control device 14. In such a case, a winning/losing result determining device is configured by the camera device 2, the image analyzing device 12, and the control device 14. The information of a player of each play position 7, the type of bet substitute gaming chip 120, the position (a player, a banker, or a pair) inside the bet area 8 on which the substitute gaming chips 120 is bet, and the amount of the substitute gaming chips 120 is acquired by imaging the substitute gaming chips 120 placed on the bet area 8 by using the camera device 2 and analyzing the image for each play position 7 by using the image analyzing device 12.

In addition, an increased/decreased amount of substitute gaming chips 120 in the substitute gaming chip tray 17 before and after the collection of losing substitute gaming chips 120 and the repayment for winning chips 120 can be calculated by comparing a total amount of the substitute gaming chips 120 disposed inside the substitute gaming chip tray 17 before the collection of losing substitute gaming chips 120 and the repayment for won substitute gaming chips 120 with a total amount of the substitute gaming chips 120 disposed inside the substitute gaming chip tray 17 after the collection of losing substitute gaming chips 120 and the repayment for won substitute gaming chips 120.

The total amount of the substitute gaming chips 120 disposed inside the substitute gaming chip tray 17 before the collection of losing substitute gaming chips 120 and the repayment for won substitute gaming chips 120 and the total amount of the substitute gaming chips 120 disposed inside the substitute gaming chip tray 17 after the collection of losing substitute gaming chips 120 and the repayment for won substitute gaming chips 120 can be detected by imaging the substitute gaming chip tray 17 housing the substitute gaming chips 120 using the camera device 2 and analyzing the image using the image analyzing device 12. In addition, by embedding an RFID representing the amount inside substitute gaming chips 120 and arranging an RFID reader in the substitute gaming chip tray 17, a total amount of the substitute gaming chips 120 housed in the substitute gaming chip tray 17 may be configured to be detected.

For example, it is assumed that the total amount of the substitute gaming chips 120 disposed on the substitute gaming chip tray 17 before the start of a game is Bb, and the total amount of the substitute gaming chips 120 disposed on the substitute gaming chip tray 17 after the game ends, and the collection of losing substitute gaming chips 120 and the re-payment for winning chips 120 is Ba. In addition, in this game, a total amount of all the play positions 7 of substitute gaming chips 120 that is bet on the player area is bp, a total amount of all the play positions 7 of substitute gaming chips 120 that is bet on the banker area is bb, and a total amount of all the play positions 7 of substitute gaming chips 120 that is bet on a tie area is bt. For example, in a case where a result of winning/losing of a game is the winning of the banker, Ba−Bb=bp−bb+bt needs to be satisfied. Alternatively, the total amount Ba of the substitute gaming chips 120 of the substitute gaming chip tray 17 after the end of the game needs to be (Bb+bp−bb+bt). Otherwise, it can be determined that there is fraud or a mistake in the collection or repayment of the substitute gaming chips.

Figure 13A:
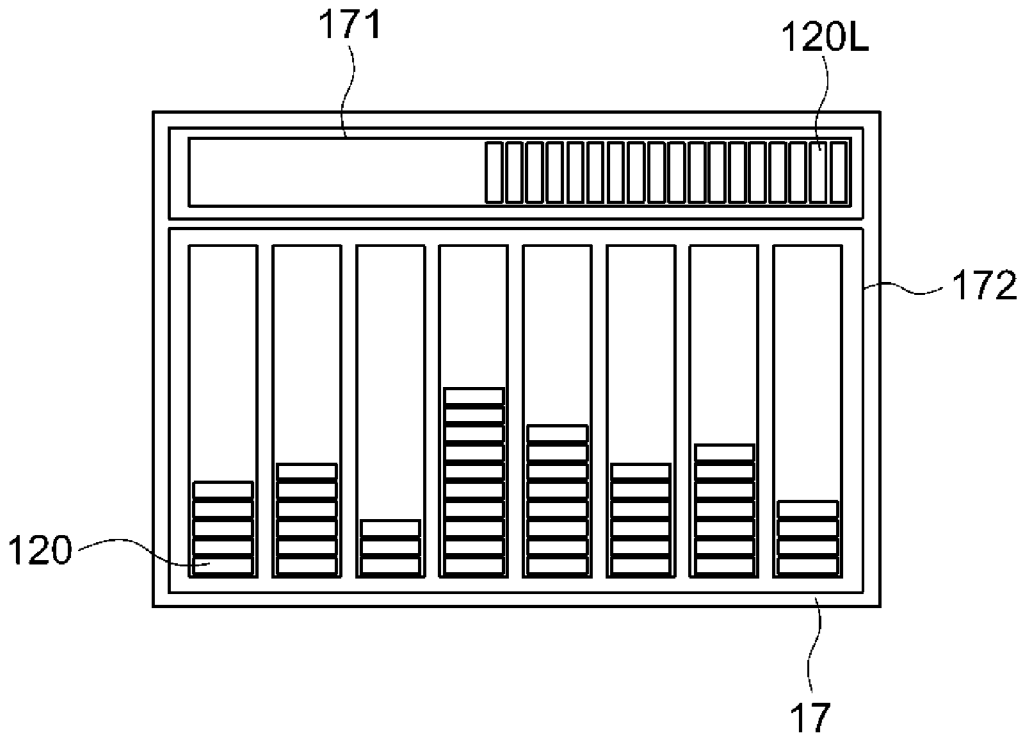
FIG. 13A is a diagram illustrating details of a substitute gaming chip tray according to the first embodiment of the present invention.
Figure 13B:
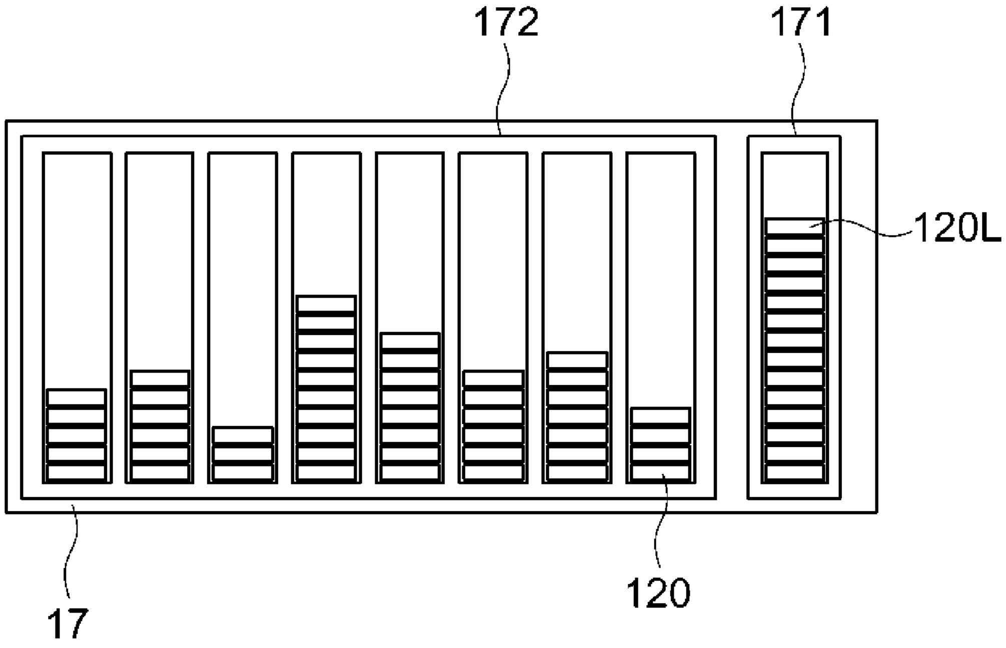
FIG. 13B is a diagram illustrating another example of a substitute gaming chip tray according to the first embodiment of the present invention.

FIG. 13A is a diagram illustrating details of a substitute gaming chip tray according to this embodiment, and FIG. 13B is a diagram illustrating another example of a substitute gaming chip tray. In the substitute gaming chip tray 17, a collection substitute gaming chip tray 171 that is used for collecting and temporarily storing substitute gaming chips 120L that are bet by a losing player 6L and a repayment substitute gaming chip tray 172 for substitute gaming chips 120W that are used for storing substitute gaming chips 120L to be re-payed are arranged. The image analyzing device 12 and the control device 14 acquire the position, the type, and the number of substitute gaming chips 120L that are bet by the losing player 6L and calculates an increased amount (an amount of substitute gaming chips 120 to be present in the collection substitute gaming chip tray 171) of substitute gaming chips 0L in the game. In addition, the image analyzing device 12 and the control device 14 acquires a real total amount of substitute gaming chips 120 in the substitute gaming chip tray 171 after the collection and compare a total amount with the real total amount to determine whether or not there is a difference therebetween.

In addition, for the repayment of substitute gaming chips 120W for a winning player 6W, by using substitute gaming chips 120 that is present in the repayment substitute gaming chip tray 172, a sufficient time can be secured for the image analyzing device 12 and the control device 14 to acquire a real total amount of substitute gaming chips 120 in the collection substitute gaming chip tray 171 after collection.

As illustrated in FIG. 1, the game table 4 includes a disposal area 41 and/or a disposal slot 42 used for disposing cards C used in a game. When a game ends, the cards C used in the game are collected and are put into the disposal area 41 or the disposal slot 42 on the game table 4.

The game table 4 further includes a marker 43 representing winning/losing of a game.

Figure 4A:
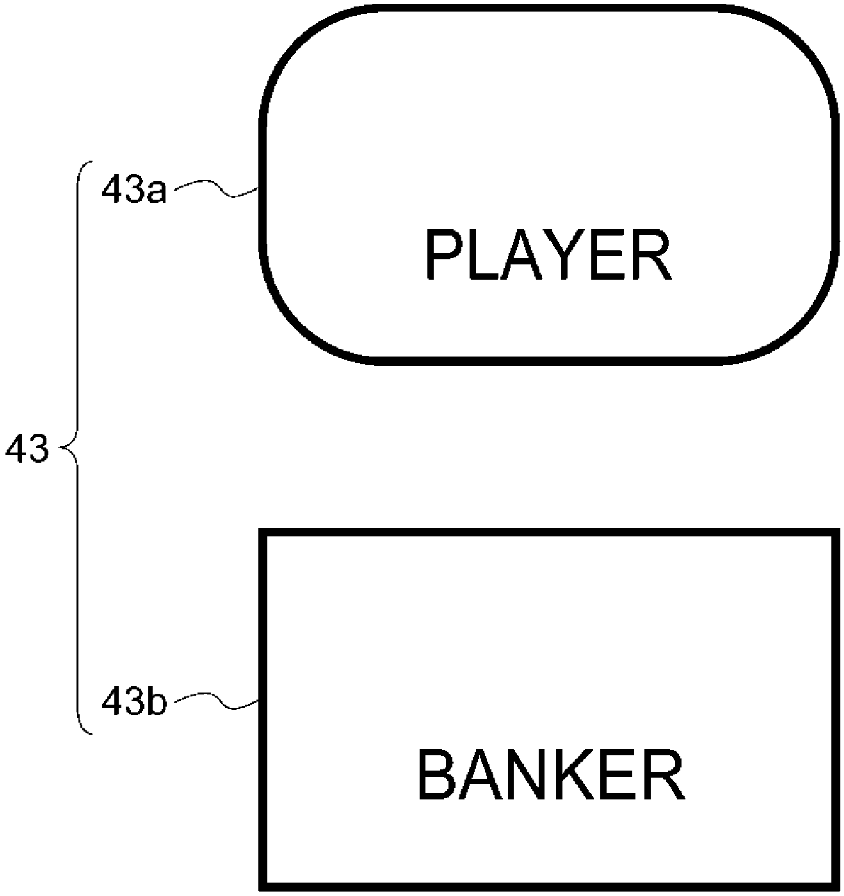
FIG. 4A is a plan view illustrating the front side of a marker.
Figure 4B:
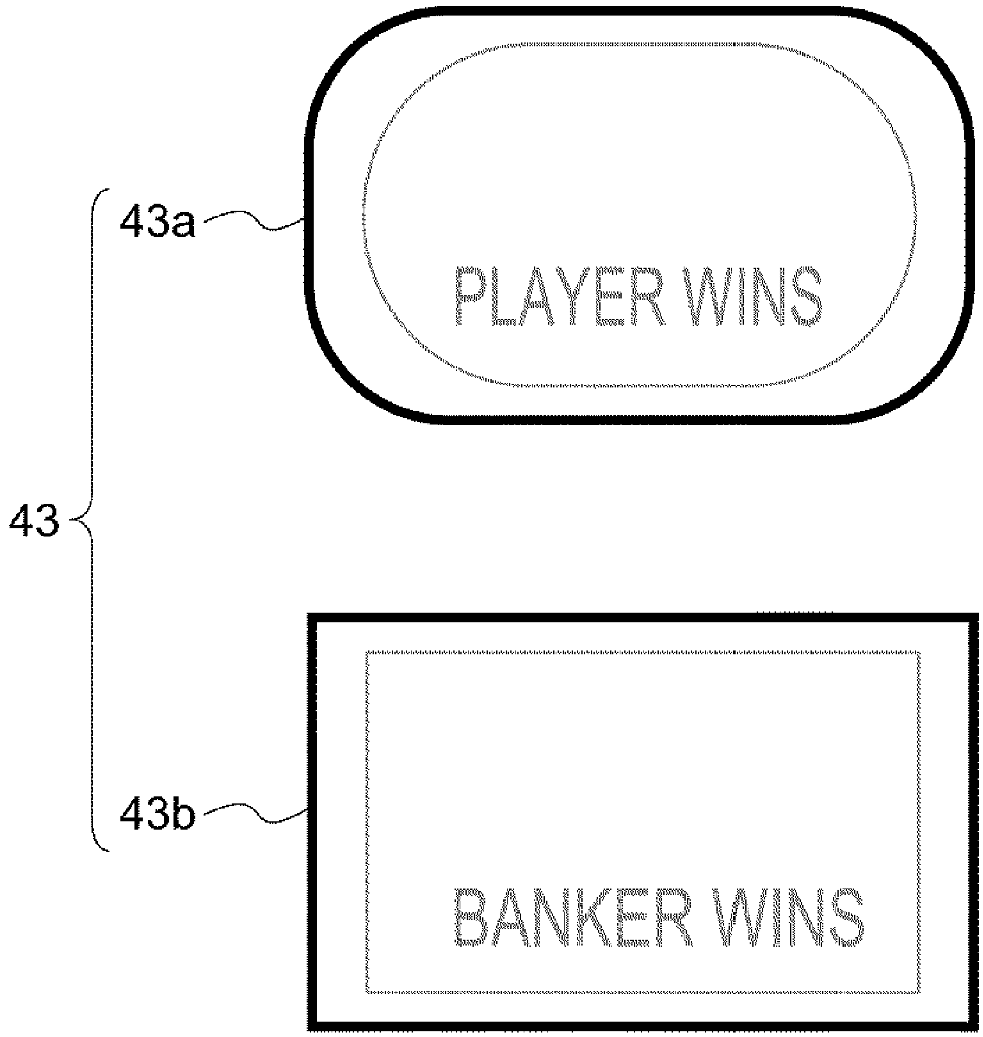
FIG. 4B is a plan view illustrating the back side of a marker.

FIG. 4A is a plan view illustrating the front side of a marker, and FIG. 4B is a plan view illustrating the back side of a marker. In a Baccarat game, two types of a marker **43*a* representing the winning of the player and a marker 43*b* representing the winning of the banker are used, and, when a result of a game comes out, the dealer 5 overturns the marker of the winning side out of the player or the banker. In this way, winning/losing of a game is represented on the table to be easily understood. The overturned marker is returned to the original state by the dealer 5 after the collection and the repayment of substitute gaming chips 120**. By returning the marker to the original state, it also represents a state in which a next game can be started.

As above, in this embodiment, the control device 14 calculates the amount of bet substitute gaming chips on the game table 4 and a balance of substitute gaming chips from a result of winning/losing of a game for each game and verifies an increased amount of the balance of substitute gaming chips inside the substitute gaming chip tray 17 after the game. When a difference is detected in this verification, the control device 14 generates an alarm or adds recording of an indication thereof in the recording of a video captured by the camera device 2. A casino operator can peruse the reason for the difference by checking the video.

The fraud detecting system according to this embodiment adds/subtracts an increased/decreased amount of substitute gaming chips in a game calculated based on the positions, the types, and the numbers of substitute gaming chips 120 that is bet by all the players 6 in the game and a result of winning/losing of the game acquired by the winning/losing result determining device to/from a total amount of substitute gaming chips 120 in the substitute gaming chip tray 17 before a settlement of each game, compares a total amount of substitute gaming chips 120 to be present in the substitute gaming chip tray 17 after the settlement at the time of the end of the game with a real total amount of substitute gaming chips 120 in the substitute gaming chip tray 17 at the time of end of the game that is acquired through the image analyzing device 12, and determines whether or not there is a difference between a total amount and a real total amount.

The control device 14 acquires the position, the type, and the number of substitute gaming chips that is bet by each player through the image analyzing device 12, acquires a real total amount of substitute gaming chips placed in the substitute gaming chip tray when all the collections of losing substitute gaming chips bet by each player end, compares a total amount of substitute gaming chips 120 to be present in the substitute gaming chip tray 17, which is acquired by adding an increased amount in the substitute gaming chip tray 17 in the game based on the positions, the types, and the numbers of substitute gaming chips bet by losing players to a total amount of substitute gaming chips placed in the substitute gaming chip tray before a settlement of each game, with a real total amount of substitute gaming chips 120 placed in the substitute gaming chip tray 17, and determines whether or not there is a difference between the total amount and the real total amount.

In a case where the control device 14 compares a total amount of substitute gaming chips 120 to be present in the substitute gaming chip tray 17, which is acquired by adding an increased amount in the substitute gaming chip tray 17 in the game based on the positions, the types, and the numbers of substitute gaming chips 120 bet by losing players to a total amount of substitute gaming chips 120 placed in the substitute gaming chip tray 17 before a settlement of each game, with a real total amount of the substitute gaming chips 120 placed in the substitute gaming chip tray 17, and determines that there is no difference between the total amount and the real total amount, and compares a total amount to be present in the substitute gaming chip tray 17 after the settlement at the time of end of the game with a real total amount of substitute gaming chips 120 placed in the substitute gaming chip tray 17 at the time of end of the game acquired through the image analyzing device 12, and determines that there is a difference between the total amount and the real total amount, the control device 14 determines a mistake in the payment and generates a payment error signal used for giving a notification of the mistake in the payment.

In the substitute gaming chip tray 17, the collection substitute gaming chip tray 171 that collects and temporarily stores substitute gaming chips 120 bet by losing players is arranged, and the image analyzing device 12 compares a total amount of substitute gaming chips 120 to be present in the collection substitute gaming chip tray 171, which is acquired by adding an increased amount of substitute gaming chips 120 in the game that is calculated based on the positions, the types, and the numbers of the substitute gaming chips 120L bet by losing players, with a real total amount of the substitute gaming chips 120 placed in the substitute gaming chip tray 171, and determines whether or not there is a difference between the total amount and the real total amount.

When the control device 14 determines a difference in the real total amount of the substitute gaming chips 120 acquired from the substitute gaming chip tray 17 for the dealer 5 of the game table 4 not corresponding to the increased/decreased amount of the substitute gaming chips calculated based on the amount of substitute gaming chips bet by all the players and a result of winning/losing of the game, the game recording device 11 assigns an index or time to the acquired video or can reproduced with a collection scene or a payment scene of the substitute gaming chips 120 specified such that the recording of the game in which the difference occurs can be analyzed by the game recording device 11.

In this way, the control device 14 acquires a total amount of substitute gaming chips (chips) placed in the substitute gaming chip tray 17 after a settlement at the time of end of a game through the image analyzing device 12. In this case, the determination of "after the settlement" is when one of "1)" to 4)" described below occurs.

1) when repayment for won substitute gaming chips 120 (won substitute gaming chips) ends.

2) when cards C used in the game are collected and are disposed in the disposal area or the disposal slot of the table.

3) when a predetermined button accompanying the winning/losing result determining device is pressed.

4) when the marker 43 representing winning/losing is returned to the original state.

In the management system of the table game, the management control device images the positions, the types, and the numbers of substitute gaming chips that is placed by game participants in each game when any one of 1) to 3) described below is detected.

1) when the card distributing device detects that a first card is drawn.

2) before and after drawing.

3) after the management control device recognizes a dealer's bet end sign.

In addition, the control device 14 has an artificial intelligence-utilizing or deep-learning structure capable of acquiring the position (a position for betting on the player, the banker, or the fair) and the amount (the types and numbers) of bet substitute gaming chips at each player position 7 of the game table 4, comparing a winning/losing history of each player 6 and the amount (won amount) of acquired substitute gaming chips that can be acquired based on the result of winning/losing of each game with statistical data of many (big data) games in the past, and extracting an abnormal situation (set in the casino).

Typically, the control device 14 is included which has an artificial intelligence-utilizing or deep-learning structure capable of extracting an occurrence of a won amount of a certain amount (one million dollars) or more and an abnormal situation in which, in a play position 7 of a specific game table 4, a state in which the amount of bet substitute gaming chips is small at the time of losing a game, and the amount of bet substitute gaming chips is large at the time of winning a game is continued for several games and is determined as an abnormal situation based on a comparison with statistical data (big data or the like) of games in the past.

In addition, the control device 14 (integrated with the image analyzing device 12) of the fraud detecting system has a structure capable of extracting an abnormal situation or specifying an individual player 6 at the play position 7 at which winning of a predetermined amount of more is acquired. In such specifying of a player 6, the image of each face is specified with a profit and an identify number (an ID or the like) assigned thereto in the image analyzing device 12. Then, the control device 14 has a warning function for giving a notification of the presence of a specific player in another game table when the specified player 6 leaves a seat and arrives at the another game table. More specifically, a notice is given to a pit manager managing each game table 4 or each table staff (or a dealer), wherein further prevention of an abnormal phenomenon is achieved.

The control device 14 includes a database recording a history of exchange of bills K and substitute gaming chips 120, refers to the database at the interval of a predetermined time or in units of one day and determines through a comparison whether or not the amount of substitute gaming chips 120 acquired in the substitute gaming chip tray 17 for the dealer 5 of the game table 4 has been increased or decreased according to a payed amount of substitute gaming chips 120 corresponding to exchanged bills K or a total amount of payment of bills K corresponding to exchanged substitute gaming chips 120.

In addition, a winning/losing history of each play position 7 and the amount (won amount) of acquired substitute gaming chips may be monitored without specifying an individual player 6.

In such a case, while, in a case where each player 6 leaves the seat, the player 6 cannot be tracked, an abnormal situation such as a case where, a state in which the amount of bet substitute gaming chips is small at the time of losing a game at a specific play position 7 of one game table 4, and the amount of bet substitute gaming chips at the time of winning a game is large is continued for several games or the like can be detected. Then, in a case where such a play position 7 is detected, there is a suspicion that there is fraud or a mistake at the play position 7. Then, by verifying a video in which the play position 7 is imaged, a fraud or a mistake can be found.

More specifically, the camera device 2 is mounted to image at least substitute gaming chips 120 placed in the bet area 8 of the game table 4. The image analyzing device 12 analyzes images captured by the camera device 2 and detects a position among the positions of the player, the banker, and the tie of the bet area 8 at which substitute gaming chips are placed for each user position 7 and the amount of the placed substitute gaming chips. In addition, the card distributing device 3 also functions as a winning/losing result determining device and determines a result of winning/losing of a game. The control device 14, based on the position (the player, the banker, or the tie) inside the bet area 8 at which the substitute gaming chips 120 are placed and the result of winning/losing of the game, records monitors) a winning/losing history for each play position 7 and the amount (an acquired amount of the substitute gaming chips) of the substitute gaming chips that has been acquired. Here, any one of the winning/losing history and the acquired amount of the substitute gaming chips may be recorded. In a case where the winning/losing history/or the acquired amount of the substitute gaming chips is in an abnormal situation (set in the casino) when compared with the statistical data of many (big data) games in the past, the control device 14 specifies this player position 7 as a play position at which a suspicion of fraud is present.

In a case where there is a suspicion of fraud for a specific player position 7, the fraud detecting system may be configured to generate an alarm (light, a sound, or a vibration) such that at least the dealer gets near at the time point. In this way, a game thereafter is stopped at least at the place or the like, and the continuation of fraud can be blocked. In addition, information representing a suspicion of fraud may be added to a video that is captured and recorded by the camera device 2. Accordingly, by checking the video, the cause of the suspicion of fraud can be investigated.

The fraud detecting system in a game house including a game table according to this embodiment further has a function of performing an inspection at the time of exchange of bills and substitute gaming chips that is frequently performed in the game table 4. In a game house such as a casino, before a game, a player 6 exchanges bills (cash or the like) and substitute gaming chips at a predetermined substitute gaming chip clearing house. However, when all the substitute gaming chips are used, the player 6 can continue the game by exchanging cash (bills) with substitute gaming chips 120 on the game table (a Baccarat table or the like) without leaving the seat from the game table 4. However, here, there is a chance for fraud between the dealer 5 and the player. The exchange of cash (bills) for substitute gaming chips 120 on a game table (for example, a Baccarat table or the like) needs to be performed when a game does not advance. In order to determine winning/losing of a game, the card distributing device 3 can detect the start of dealing of cards and the end of dealing (a time period for determining winning/losing). For this reason, the card distributing device 3 detects a situation other than the distribution (dealing) of cards, and the control device 14 detects exchange of bills and substitute gaming chips 120 on the game table 4 in a situation other than the dealing of cards (illustrated in FIG. 5).

Being in the middle of the dealing (or any other situation) of cards can be detected based on information acquired from the operation of the card distributing device 3 or the dealer 5.

Figure 5:
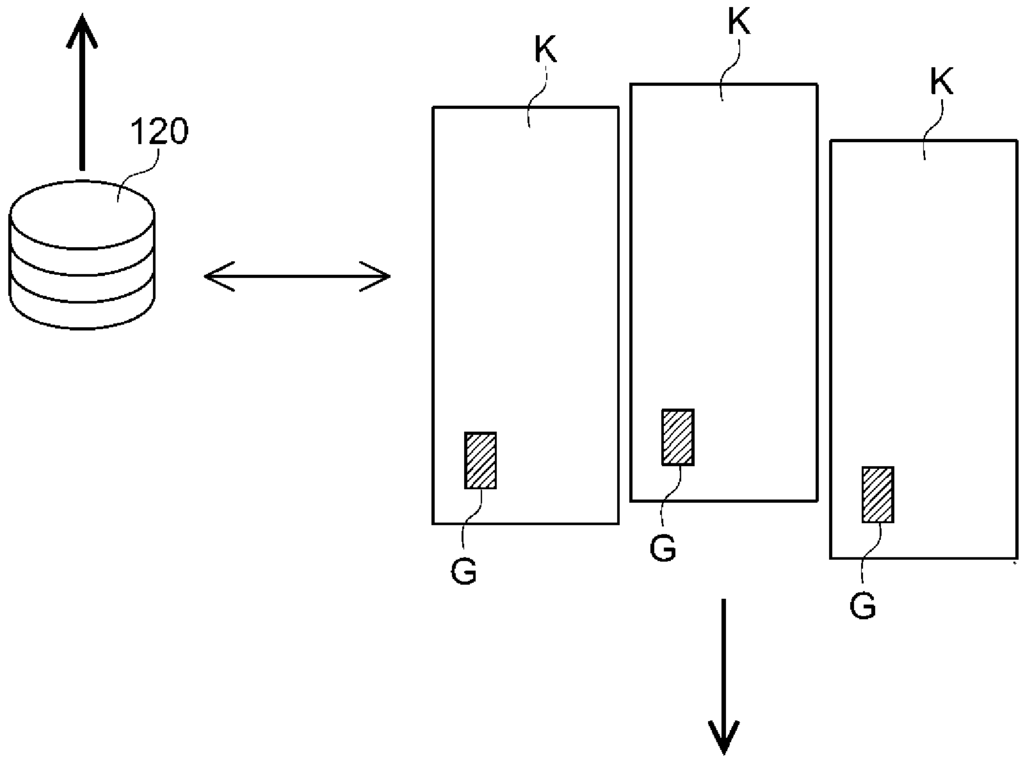
FIG. 5 is an explanatory diagram simplifying a video of the state of exchange of bills and substitute gaming chips perceived according to the first embodiment of the present invention.

The control device 14 can recognize the number and the amount of bills by performing an image analysis of the surfaces of the bills K. In addition, in the game table 4, it is determined whether or not bills K to be exchanged for substitute gaming chips 120 are genuine by detecting genuine marks G of the bills by emitting black light. As illustrated in FIG. 5, the control device 14 has an artificial intelligence-utilizing or deep-learning structure verifying the genuine marks G through an image analysis, recognizing a total amount of genuine bills, being capable of recognizing a total amount of substitute gaming chips even in a state in which a plurality of substitute gaming chips come out onto the game table as an exchange target is hidden due to a blind area of the camera device 2, comparing a total amount of the bills K come out onto the game table 4 from a player with a total amount of the substitute gaming chips 120 come out from the dealer 5, and being capable of determining whether or not both the amounts match each other.

The control device 14 has an artificial intelligence-utilizing or deep-leaning structure capable of determining whether or not a total amount of substitute gaming chips 120 placed in the substitute gaming chip tray 17 for the dealer 5 of the game table 4 has been increased/decreased according to a paid amount of substitute gaming chips corresponding to the exchanged bills after a settlement through exchange of the bills and the substitute gaming chips. A case may be considered as well in which the total amount of the substitute gaming chips 120 placed in the substitute gaming chip tray 17 for the dealer 5 is constantly acquired in advance by using RFIDs of substitute gaming chips 120 or the like. In addition, the total amount of the substitute gaming chips 120 housed in the substitute gaming chip tray 17 can be detected by imaging the substitute gaming chip tray 17 housing the substitute gaming chips 120 by using the camera device 2 and analyzing the image using the image analyzing device 12.

In addition, the control device 14 detects whether an increase/decrease in the amount of the substitute gaming chips 120 present inside the substitute gaming chip tray 17 before and after the exchange of bills and the substitute gaming chips matches an exchange amount of the substitute gaming chips as a result of an image analysis on the game table 4. The amount of paid bills may be input by the dealer 5 to the control device 14 through key input or the like or may be specified by imaging an area disposed on the game table 4 in which bills are paid by using the camera device 2 and analyzing the image using the image analyzing device 12.

As described above, the control device 14 determines whether or not a decreased amount of the substitute gaming chips 120 from the substitute gaming chip tray 17 according to the exchange of bills and the substitute gaming chips matches the amount paid to the dealer 5 from players 6. In addition, the control device 14 is an intelligence-type control device capable of determining match/mismatch of an input amount (commonly, according to key input or the like) of bills input by the dealer 5 and a calculated amount of bills that is a result of an image analysis performed by the image analyzing device 12 after the settlement through the exchange of the bills and the substitute gaming chips through a comparison and calculation and may have an artificial intelligence-utilizing or deep-learning structure.

Furthermore, the control device 14 has an artificial intelligence-utilizing or deep-learning structure capable of determining match/mismatch of a total amount of bills according to the input of a dealer in the game table 4 for which the dealer is responsible and a total amount of bills according to a result of an image analysis using the image analyzing device 12 through a comparison and calculation.

The control device 14 determines whether or not the amount of substitute gaming chips 120 perceived in the substitute gaming chip tray 17 for the dealer 5 of the game table 4 has increased/decreased according to a paid amount of substitute gaming chips 120 corresponding to exchanged bills after the exchange of the bills and the substitute gaming chips 120 or a paid amount of bills corresponding to the exchanged substitute gaming chips 120 through a comparison.

The control device 14 is a control device having an artificial intelligence-utilizing or deep-learning structure capable of acquiring information of the types and the numbers of the substitute gaming chips 120 even in a state in which a part of or the whole one unit of substitute gaming chips are hidden when the types and the numbers of the substitute gaming chips 120 are determined.

A management system according to a second embodiment relates to a management system of table games in a game house.

In a game house such as a casino, there are various attempts preventing dealer's mistakes in handling substitute gaming chips. A game house includes monitoring cameras used for monitoring dealer's mistakes in handling substitute gaming chips, and such mistakes are prevented using a determination of mistakes and fraud according to collection and repayment of substitute gaming chips that are different from a result of winning/losing based on images acquired using the monitoring cameras and the like.

Meanwhile, in order to acquire the number and a total amount of substitute gaming chips, it has been proposed to acquire the amount of the substitute gaming chips by attaching an IC tag to each substitute gaming chip.

In a card game monitoring system disclosed in PCT Application Publication No. PCT/JP2015/000171, it is determined whether or not substitute gaming chips place on a game table are collected or re-payed according to a result of winning/losing by performing an image analysis of movement of the substitute gaming chips, and monitoring of dealer's mistakes in handling the substitute gaming chips are performed.

Figure 7:
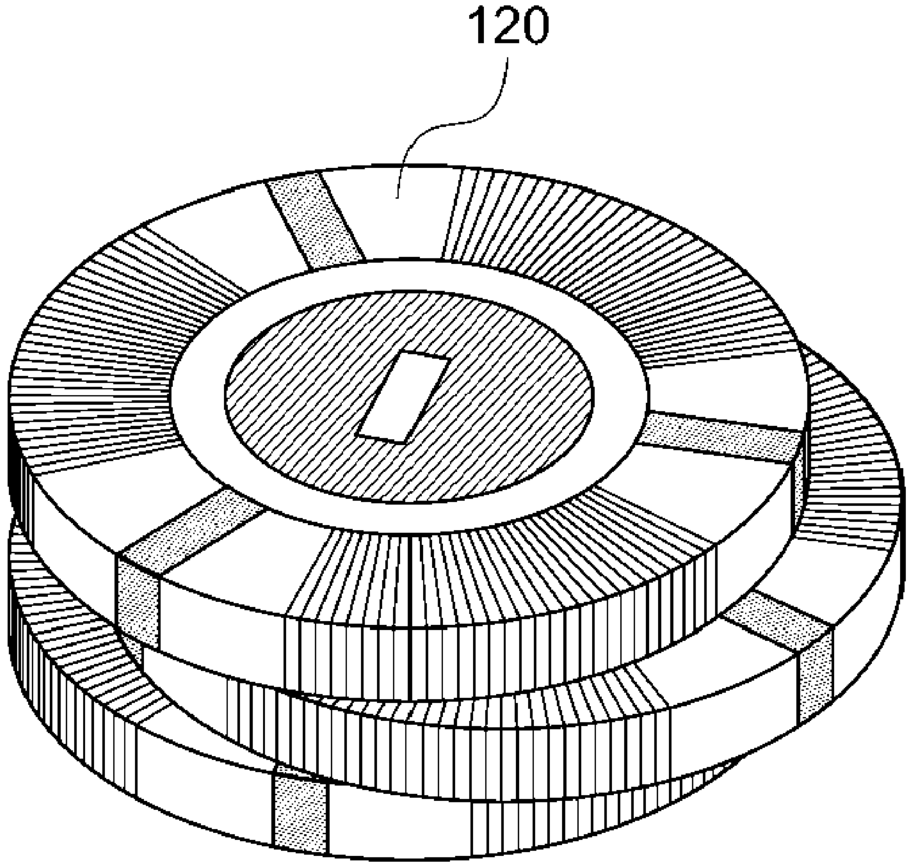
FIG. 7 is a perspective view of conventional substitute gaming chips.

In game houses such as casinos, while substitute gaming chips are piled to have a high volume and is placed on a game table, there is a problem in that a total amount cannot be correctly read by a reading device for IC tags disposed under the game table, and, when the sensitivity of the reading device is increased, substitute gaming chips placed at a different position (winning/losing depends on the position) is added, and there is a problem in that a total amount of substitute gaming chips at each position cannot be perceived. In addition, conventionally, as illustrated in FIG. 7, the pattern of substitute gaming chip (substitute gaming chips for gaming) 9 is complicated, and, when a plurality of substitute gaming chips are piled, there is a problem in that the number of such a pile cannot be accurately acquired using a camera.

Furthermore, fraud on a game table has been advanced, and there is a new problem in that fraud using an advanced betting method or the like that cannot be found in simple detection of a large winning amount on a game table or the like cannot be found by using a camera.

In addition, it is necessary for a dealer to collect or re-paid substitute gaming chips placed on a game table according to a result of winning/losing. In a case this is to be determined by performing an image analysis of the substitute gaming chips, since the pattern of the substitute gaming chip (substitute gaming chips for gaming) is complicated, there is a problem in that it cannot be determined whether or not a dealer correctly performs re-payment when substitute gaming chips corresponding to the bet substitute gaming chips is re-payed by using a currently-existing practical image analyzing technology, and the prevention of mistakes is not sufficient.

In order to solve the various problems described above, a management system of table games according to this embodiment includes: a card distributing device that determines and displays a result of winning/losing of each game in a game table; a measurement device that measures the types and the numbers of substitute gaming chips place on the game table by using a camera; and a management control device that specifies and stores the position, the types, and the numbers of substitute gaming chips placed on the game table by a game participant by using a result of the measurement performed by the measurement device in each game. The substitute gaming chip has a configuration in which a plurality of plastic layers of different colors are stacked, at least a coloring layer is included in the middle, and a stripe pattern in a stacking direction is formed on a side face by employing a multi-layer structure in which white layers or thin-color layers are stacked on both sides of the coloring layer disposed in the middle, and the type of the substitute gaming chip can be specified by using the coloring layer. The management control device has calculation functions of determining a winner and a loser among participants in each game by using a result of winning/losing acquired from the card distributing device and a result of the measurement of the position, the types, and the numbers of the substitute gaming chips placed by each game participant and calculating the balance of the casino side in the game table for each game.

In addition, in the management system, the management control device has a structure including a function of determining the amount of the substitute gaming chips by measuring the number of coloring layers, the white layers, or the thin-color layers of the substitute gaming chips placed by each game participant.

In order to solve the various problems, a substitute gaming chip according to this embodiment has a configuration in which a plurality of plastic layers of different colors are stacked, at least a coloring layer is included in the middle, and a stripe pattern in a stacking direction is formed on a side face by stacking white layers or thin-color layers on both sides of the coloring layer, and the type of the substitute gaming chip can be specified by using the coloring layer.

In addition, in the substitute gaming chip, on the surface of the white layer or the thin-color layer, a print representing the type of the substitute gaming chip is formed, transparent layers are disposed in outermost layers, and each interlayer is thermos-compressed to form a structure of at least five layers.

In addition, in the substitute gaming chip, marks using UV ink or ink (carbon black ink) absorbing infrared rays are arranged on the surfaces of the white-color layers or the thin-color layers, or embossing processing is performed for the transparent layer of the outermost layer, or R processing is performed for the ends of the transparent layers of the outermost layers, or the coloring layer is formed by a plurality of layers, and RFIDs may be built in the coloring layers.

In order to solve the various problems described above, an inspection device inspecting substitute gaming chips according to this embodiment includes: a passage including an inlet and an output through which the substitute gaming chips can pass in a radial direction; a substitute gaming chip type determining device that determines a color of the stripe in the staking direction of the side face by imaging the side face of the substitute gaming chip passing through the passage; a mark reading device that reads a mark, which is formed using the UV ink or the ink (carbon black ink) absorbing infrared rays, arranged on the surface of the passing substitute gaming chip; a print inspecting device that reads a print representing the type arranged on the surface of the substitute gaming chip in a vertical direction with respect to the passage; and a control device of the whole device. The control device is configured to inspect whether or not the type of the substitute gaming chip determined by the substitute gaming chip type determining device matches a content of the print representing the type acquired by the print inspecting device.

According to the system of this embodiment, even in a case where many substitute gaming chips (substitute currency for gaming) are piled up, the number of the substitute gaming chips can be determined, and a total amount of relatively overlapping substitute gaming chips can be acquired based on the position and the color.

Figure 6:
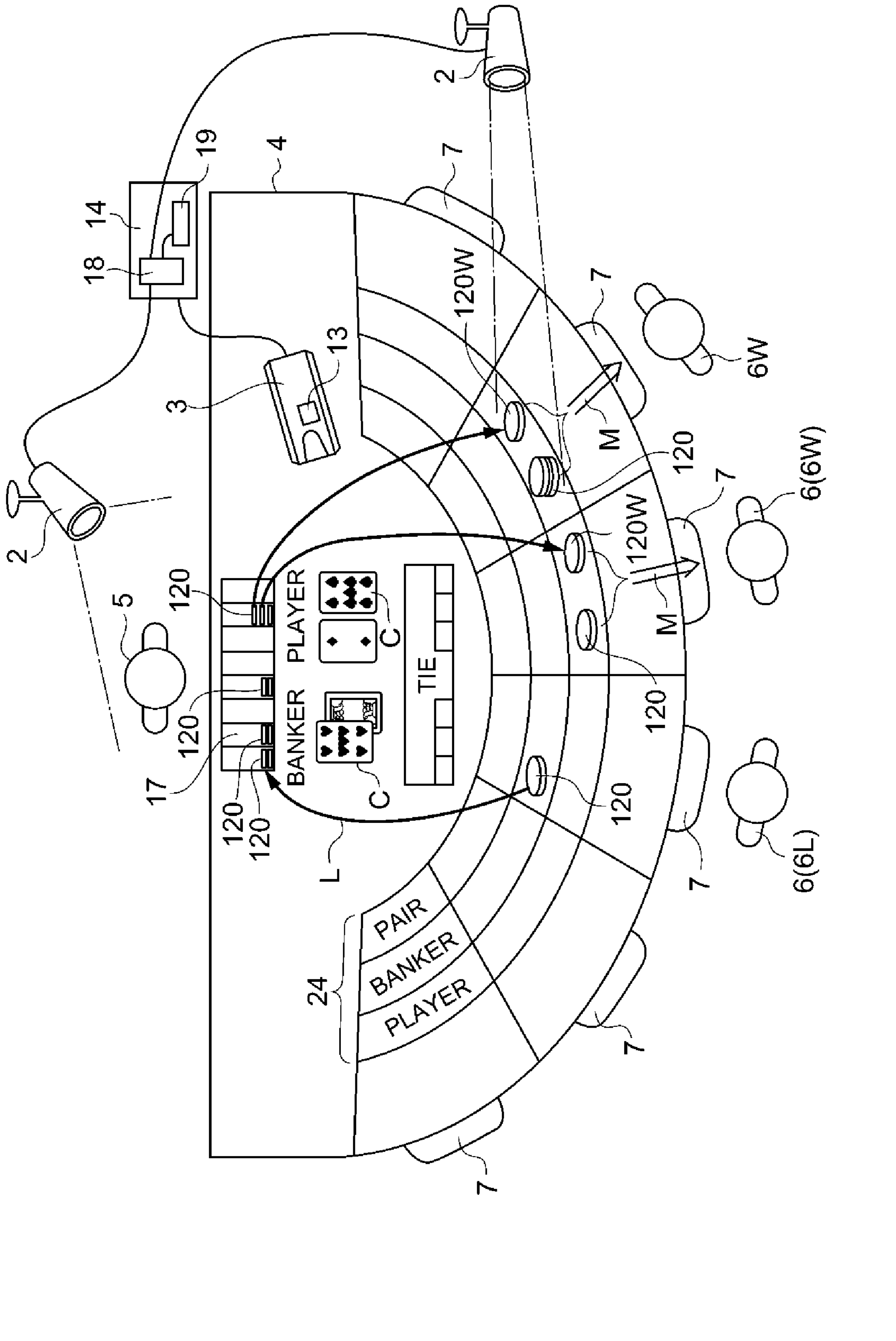
FIG. 6 is a plan view illustrating an overview of the whole management system for table games in a game house according to a second embodiment of the present invention.

Hereinafter, a management system of table games in a game house including a game table according to an embodiment of the present invention will be described. FIG. 6 is a diagram that illustrates an overview of the whole system. The management system of table games in a game house including a plurality of game tables 4 includes: a measurement device 19 including an image analyzing device 18 that records a state of process of a game played in the game table 4 as a video including game participants 6 and a dealer 5 through a plurality of camera devices 2 and performs an image analysis of the recorded video of the state of process of the game; and a card distributing device 3 that determines and displays a result of winning/losing of each game in the game table 4. The card distributing device 3 is a so-called electronic shooter that has already been used by persons skilled in the art and has rules of a game programmed in advance and has a structure capable of determining winning/losing of a game by reading information of distributed cards C. For example, in a Baccarat game, winning of the baker, winning of a player, or tie (drawn) is determined basically based on the ranks of two to three cards, and a determination result (a result of winning/losing) is displayed in a result display lamp 13.

The management control device 14 reads information (ranks and suits) of cards C acquired from the card distributing device 3 and determines a result of winning/losing of each game and determines a winner 6W and a loser 6L among the participants 6 in each game by using a result of measurement of the position, the types, and the numbers of substitute gaming chips 120 placed by the game participants 6.

In addition, the management control device 14 has a calculation function of calculating a balance (an amount acquired by subtracting a total amount of substitute gaming chips 120 that is re-paid to a winner 6W among the participants 6 from a total amount of substitute gaming chips 120 bet by the loser 6L) of the casino side in the game table 1 for each game.

The image analyzing device 18, the measurement device 19, and the management control device 14 of this detection system have a structure integrally including a computer formed as one body or by a plurality of configurations, a program, and a memory.

Figure 8:
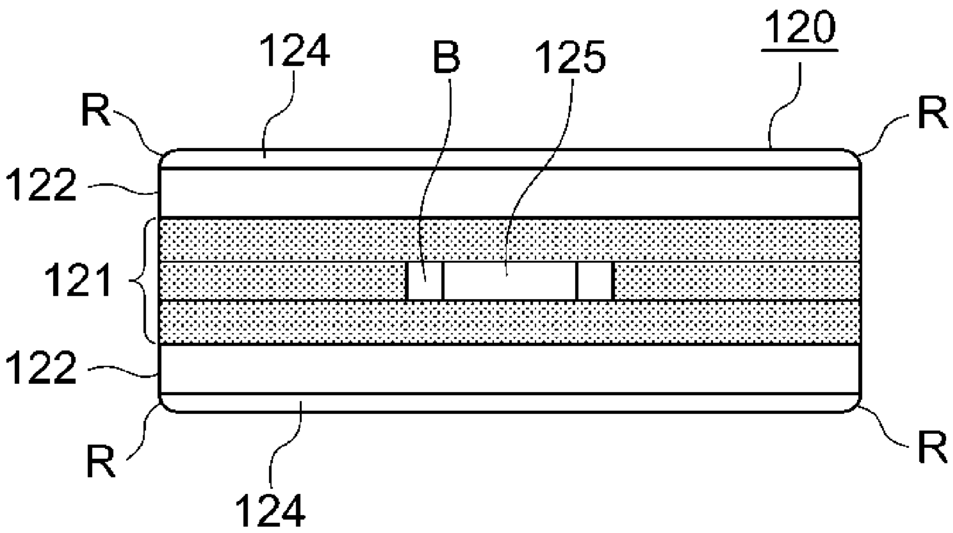
FIG. 8 is a side-face cross-sectional view of a substitute gaming chip according to the second embodiment of the present invention.

Next, details of substitute gaming chip used in this detection system will be described. FIG. 8 is a front cross-sectional view of a substitute gaming chip 120 used in this detection system. The substitute gaming chip 120 has a multi-layer structure in which a plurality of plastic layers having different colors are stacked, a coloring layer 121 is included at least in the middle, and white layers 122 or thin-color layers (while not illustrated in the drawing, the layers may be layers of a color that is thinner than that of the coloring layer 121) are stacked on both sides of the coloring layer 121 of the middle.

Figure 9A:
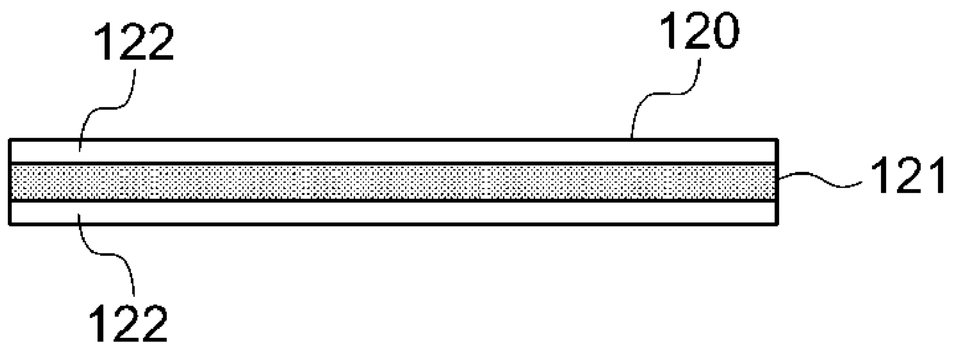
FIG. 9A is a side view of a substitute gaming chip according to the second embodiment of the present invention.

In this way, by employing a multi-layer structure in which the coloring layer 121 is included, and white layers 122 or thin-color layers (while not illustrated in the drawing, the layers may be layers of a color that is thinner than that of the coloring layer 121) are stacked on both sides of the coloring layer 121 of this middle, as illustrated in FIG. 9A, a stripe pattern is formed on the side face in the stacking direction, and the type of the substitute gaming chip 120 can be specified by changing the color (red, green, yellow, blue, or the like) of the coloring layer 121 for each type (10 points, 20 points, 100 points, 1000 points, and the like) of the substitute gaming chip 120.

Figure 10A:
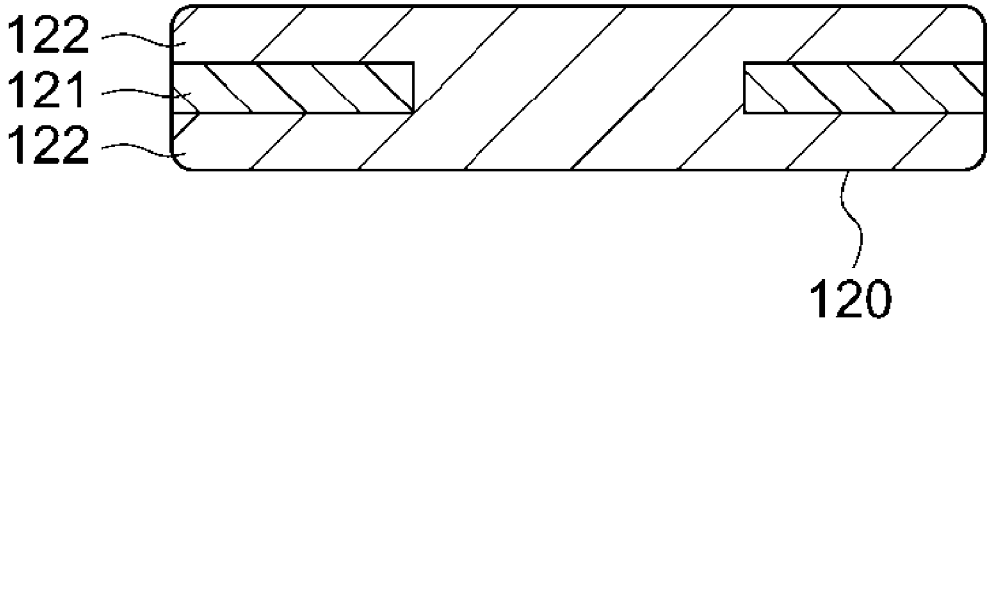
FIG. 10A is a diagram illustrating another example of a substitute gaming chip according to the second embodiment of the present invention.
Figure 10B:
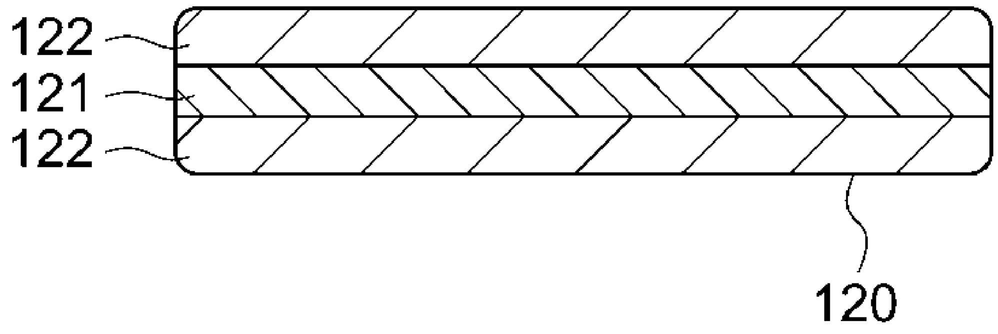
FIG. 10B is a diagram illustrating another example of a substitute gaming chip according to the second embodiment of the present invention.

The substitute gaming chip 120 is configured as a structure body including the coloring layer 121 and the white layer 122 or the thin-color layer at least in the outer appearance to form a stripe pattern in the axial direction on the side face and has a configuration enabling the type of the substitute gaming chip 120 to be specified using the coloring layer 121. While FIGS. 10A and 10B illustrate different examples, in the examples, the coloring layer 121 and the white layer 122 or the thin-color layer are formed through injection molding, and so-called two-color molding is used in which, first, the coloring layer 121 is molded inside a die for molding (not illustrated in the drawing), and thereafter, the white layer 122 or the thin-color layer is molded.

Figure 9B:
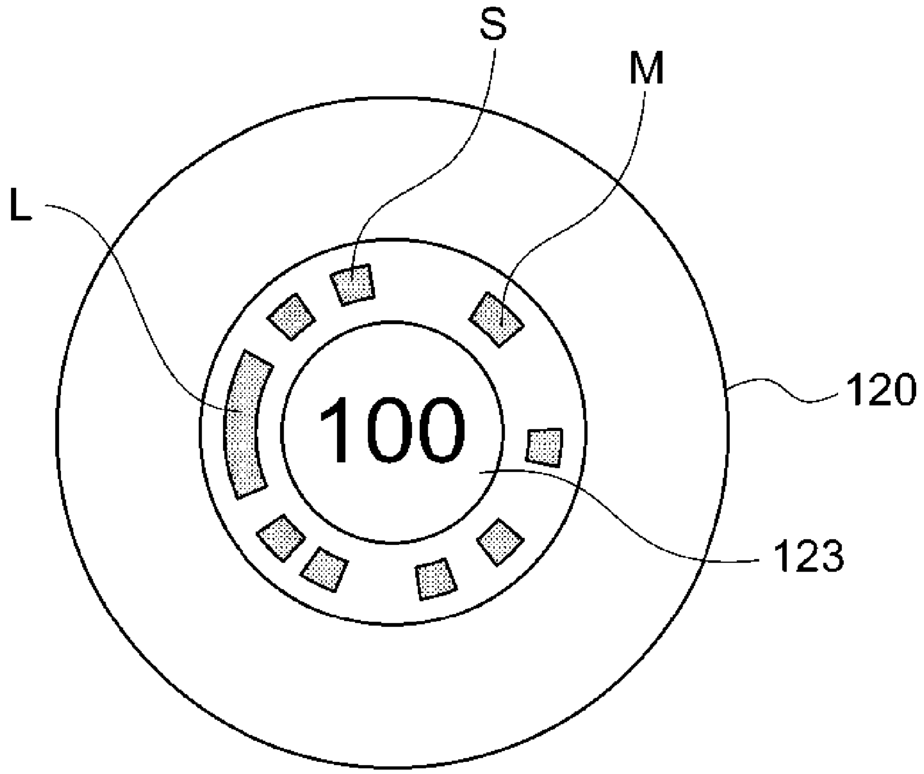
FIG. 9B is a side view of a substitute gaming chip according to the second embodiment of the present invention.

In addition, as illustrated in FIG. 9B, in the substitute gaming chip 120, prints 123 (100 points or the like) representing the type of the substitute gaming chip 120 are formed on the surfaces (the upper face and the lower face) of the white layer 122. As illustrated in FIG. 8, the transparent layers 124 are disposed in the outermost layers, and each interlayer is thermos-compressed, and a structure of at least five layers is formed. Such substitute gaming chip 120 is formed by using a plastic material having a thin long shape, and layers (the coloring layer 121, the white layer 122, and the transparent layer 124) are thermo-compressed to form a closely adhering state (a structure of five layers or the like) in the state of a long length, and thereafter, holes having a circular shape, a rectangular shape, or the like are formed therein through press or the like.

When a hole is formed through the press, die of mold for punching, and the size of punching are designed, and R processing (round angle) is performed for the ends of the transparent layer 124 of the outermost layer.

That is, in order to manufacture the substitute gaming chip 120, first, a plate-shaped coloring layer 121 formed using plastic and a plate shaped white layer 122 or a thin-color layer formed using plastic are stacked, and a stacked structure body configured by a plurality of plastic layers is formed. Then, drawing patterns are printed on the upper face and the lower face of this stacked structure body, and transparent layers 124 are formed thereon. Then, the layers of the stacked structure body and the transparent layers 124 are heated and pressed to be heated and welded, whereby a substitute gaming chip original plate is generated. Then, punching processing is performed for the substitute gaming chip original plate acquired in this way, whereby a plurality of substitute gaming chips 120 having a predetermined shape are acquired. When this punching processing is performed, R processing is performed for upper and lower angles of the substitute gaming chip 120 using a mold.

Figure 11:
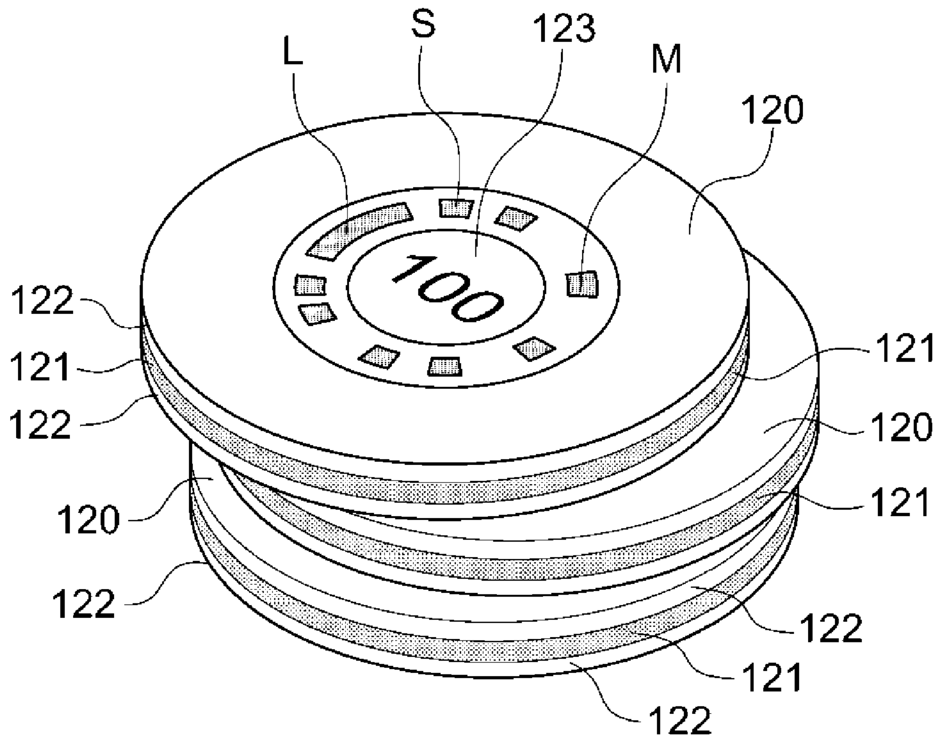
FIG. 11 is a perspective view of a state in which substitute gaming chips are piled according to the second embodiment of the present invention.

In addition, in the substitute gaming chips 120, face codes using the UV ink or ink (carbon black ink) absorbing an infrared rays are arranged on the surface of the white layer 122 (see FIG. 9B). This face codes represent the authenticity of the substitute gaming chip 120, and, when ultraviolet rays (or infrared rays) are emitted thereto, a mark is visible to the eyes, and a combination of the form and the number of the marks represents the authenticity. FIG. 11 is a perspective view of a state in which the substitute gaming chips 120 are stacked up, and a face code M is acquired by combining a long code L and a short code S. In the outermost layers, while transparent layers (print layers) 124 are thermally compressed or formed as coating layers to cover the print 123 and the face code, embossing processing is performed for these transparent layers 124, and the close adherence between the substitute gaming chips 120 is prevented. In addition, in this embodiment, while an example has been described in which face codes are printed on the surfaces of the white layers 122, instead of the face codes or together with the face codes, one or both of a security mark and an optically variable device (OVD) may be printed.

The R processing (R) is performed for the ends of the transparent layers (print layer) 124 of the outermost layer for which the print 123 (100 points or the like), and in the punching process of the substitute gaming chip 120, the surfaces of the white layers 122 are prevented from being deformed to appear on the side face. In addition, it is prevented that a sharp end remains in the substitute gaming chip 120 and damages the hands or the other substitute gaming chip 120.

The coloring layer 121, as illustrated in FIG. 8, may be formed by a plurality of colored layers (three layers in the case illustrated in FIG. 8). Since the plurality of colored layers (three layers in the case illustrated in FIG. 8) are thermos-compressed, a state in which the three-layer structure can be visually observed, as illustrated in FIG. 8, is not formed. However, three layers are illustrated in FIG. 8 for description. In addition, in a middle layer among the three layers of the coloring layer 121, a partly hollowed portion B is arranged, and an RFID 125 is built therein.

In addition, without arranging the hollowed portion B in the coloring layer 121, the RFID 125 may be built in the substitute gaming chip 120 by arranging the RFID 125 between the coloring layer 121 having a flat surface and the white layer 122 having a flat surface and performing thermos-compressing of the coloring layer 121 and the white layer 122 as it is. By configuring at least one of the coloring layer 121 and the white layer 122 using a material such as plastic that can be thermally deformed, out of the coloring layer 121 and the white layer 122 having the RFID 125 interposed therebetween through thermal compression, a plastic layer is thermally deformed, and accordingly, the RFID 125 is tightly fixed between such layers without arranging the hollowed portion B.

Figure 12:
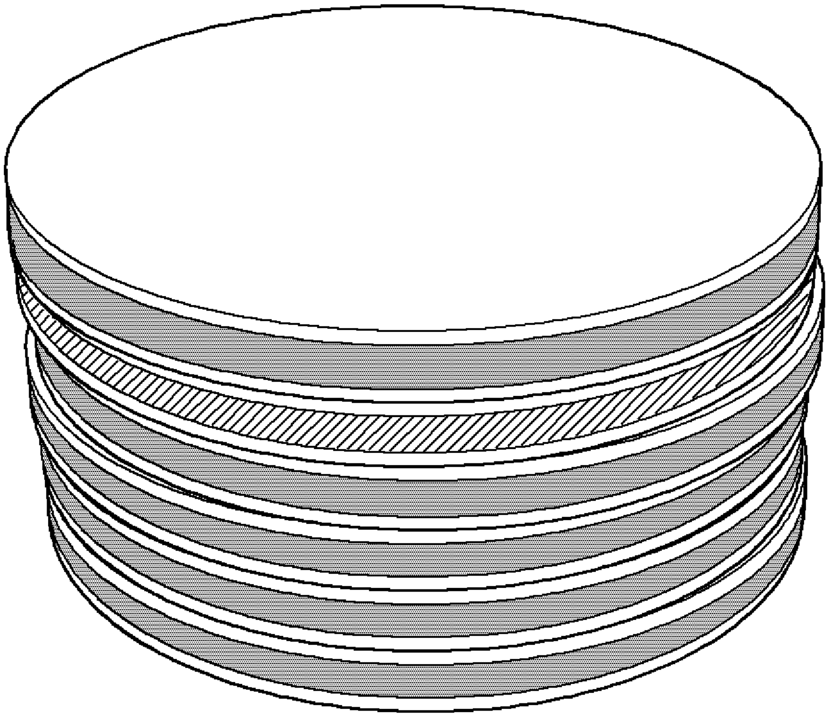
FIG. 12 is a perspective explanatory photographic diagram illustrating a state in which different kinds of substitute gaming chips are piled.

FIG. 12 is a perspective explanatory photographic diagram that illustrates a state in which substitute gaming chips of different types are piled up. The management control device 14 images substitute gaming chips 120 placed on the game table 1 by the game participant 6 by using the camera device 2 and measures each area 8 (whether the bet is on the banker, the player, the pair, or the tie) in which the substitute gaming chips 120 are placed by using the measurement device 19 including the image analyzing device 18, and the measurement device 19 (by using information acquired by the image analyzing device 18) analyzes and measures the number and the colors of coloring layers 121 (or the thin-color layers) or white layers 122 of the substitute gaming chips 120 that are stacked in each area and determines the types and the numbers of the substitute gaming chips 120. The management control device 14 performs control of the camera device 2 such that imaging using the camera device 2 is performed when the first card is drawn from the card distributing device, before and after the drawing, or after a dealer's sign representing the end of betting.

The management control device 14 may be a control device having an artificial intelligence-utilizing or deep learning structure. The management control device 14 can perceive the position 8 (a position betting on a player, a banker, or a pair), the types (a value of a different amount is assigned to the substitute gaming chips 120 for each color), and the numbers of the substitute gaming chips 120 that is bet by each participant 6 through the camera device 2 and the image analyzing device 18. The artificial intelligence-utilizing computer or control system can perceive the position 8 (a position betting on a player, a banker, or a pair), the types (a value of a different amount is assigned to the substitute gaming chips for each color), and the numbers of the substitute gaming chips 120 by using a self-learning function or the like in the deep-learning (structure) technology, and thus, according to a result of winning/losing of a game determined by the card distributing device 3 in each game, determines whether or not the collection (denoted using an arrow L) of substitute gaming chips 120 bet by a losing participant 6L and the re-payment (payment (120W)) for winning chips 120 for the winning game participant 6W are appropriately performed according to a result of winning/failure of the game in each game by analyzing a video of the state of progress of the game by using the management control device 14 through the image analyzing device 18.

In such a case, as illustrated in FIG. 11 (compared to conventional substitute gaming chips illustrated in FIG. 7), a stacked multi-layer structure is formed, and a stripe pattern is formed on the side face in the stacking direction, and accordingly, the measurement device 19 including the image analyzing device 18 can accurately perform the measurement of the types and the numbers of substitute gaming chips in an easy manner. In addition, by using an artificial intelligence-utilizing computer or control system and a deep-learning (structure) technology, the analysis and the determination of the image can be performed more accurately. The artificial intelligence-utilizing computer or control system and the deep-learning (structure) technology are known to persons skilled in the art and can be used, and thus, detailed description thereof will be abbreviated.

The management control device 14 can analyze and perceive a total amount of substitute gaming chips 120 in the substitute gaming chip tray 17 for the dealer 5 of the game table 4 by using the image analyzing device 18 and can determine through a comparison and calculation whether or not a total amount of the substitute gaming chips 120 placed inside the substitute gaming chip tray 17 has been increased/decreased according to the collection of the losing substitute gaming chips 120 bet by each game participant 6 and the amount of the payment 120W for winning chips to the winning game participant 6W after the game ends and is settled based on the result of winning/losing of the game. The total amount of the substitute gaming chips 120 in the substitute gaming chip tray 17 may be constantly acquired by using means such as RFIDs, and it is determined whether or not the increased/decreased amount is correct by the management control device 14 by analyzing a video of the state of progress of the game through the image analyzing device 18. For these, an artificial intelligence-utilizing or deep-learning structure may be utilized.

In addition, the management control device 14 may have an artificial intelligence-utilizing or deep-learning structure capable of acquiring the position (a position for betting on the player, the banker, or the fair) and the amount (the types and numbers) of bet substitute gaming chips at each player position 7 of the game table 4, comparing a winning/losing history of each player 6 and the amount (won amount) of acquired substitute gaming chips that can be acquired based on the result of winning/losing of each game with statistical data of many (big data) games in the past, and extracting an abnormal situation (set in the casino). Typically, the management control device 14 is included which has an artificial intelligence-utilizing or deep-learning structure capable of extracting an occurrence of a won amount of a certain amount (one million dollars) or more and an abnormal situation in which, in a play position 7 of a specific game table 4, a state in which the amount of bet substitute gaming chips is small at the time of losing a game, and the amount of bet substitute gaming chips is large at the time of winning a game is continued for several games and is determined as an abnormal situation based on a comparison with statistical data (big data or the like) of games in the past.

The total amount of the substitute gaming chips 120 in the substitute gaming chip tray 17 for the dealer 5 of the game table 4 is settled for the substitute gaming chips 120 bet by each participant 6 after each game, and the management control device 14 has a structure capable of determining through a comparison and calculation whether or not an increase/decrease in the substitute gaming chips that corresponds to a settlement is correct after the settlement.

In the substitute gaming chip tray 17 used for storing the substitute gaming chips 120 for the dealer 5 illustrated in FIG. 6, the types and the numbers of the substitute gaming chips 120 can be determined by analyzing and measuring the numbers and the colors of the coloring layers 121 or the white layers 122 of the substitute gaming chips 120 stacked in the horizontal direction by using the measurement device 19 (by using the information acquired by the image analyzing device 18). The total amount of the substitute gaming chips 120 for the tray 17 for storing substitute gaming chips is constantly (or at predetermined time intervals) acquired in this way. As the management control device 14 has a calculation function of calculating a settlement amount (calculation of a balance of the casino side in the game table 4 (an amount acquired by subtracting a total amount of the substitute gaming chips 120 re-paid to the winner 6W among the participants 6 from a total amount of the substitute gaming chips 120 bet by the loser 6L) of each game for each game (see description presented above), the total amount of the substitute gaming chips 120 of the substitute gaming chip tray 17 is constantly (or at intervals of a predetermined time) is verified. That is, it is verified whether or not an increase/decrease in the substitute gaming chips matches a result of an image analysis performed by the image analyzing device 18 and the settlement amount of each game performed by the dealer 5.

FIG. 13A is a diagram that illustrates details of a substitute gaming chip tray according to this embodiment, and FIG. 13B is a diagram that illustrates another example of tray for the substitute gaming chip. In the substitute gaming chip tray 17, a collection substitute gaming chip tray 171 that is used for collecting and temporarily storing substitute gaming chips 120L that are bet by a losing player 6L and a repayment substitute gaming chip tray 172 120W that are used for storing substitute gaming chips 120L to be re-payed are arranged. The image analyzing device 12 and the control device 14 acquire the position, the type, and the number of substitute gaming chips 120L that is bet by the losing player 6L and calculates an increased amount (an amount of substitute gaming chips 120L to be present in the collection substitute gaming chip tray 171 120) of substitute gaming chips 120L in the game. In addition, the image analyzing device 12 and the control device 14 acquire a real total amount of the substitute gaming chips 120 in the substitute gaming chip tray 171 after the collection and determine whether or not there is a difference between the total amount and the real total amount through a comparison.

Figure 14A:
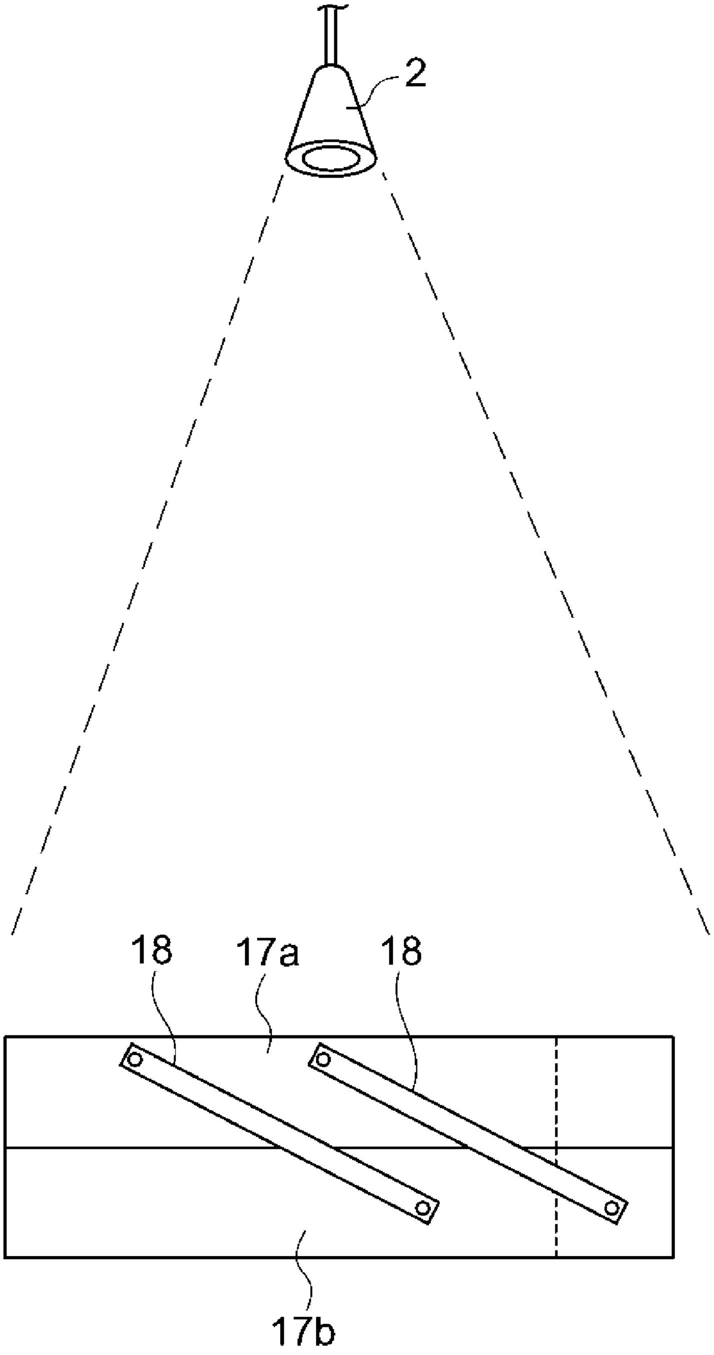
FIG. 14A is a diagram illustrating a relation between a substitute gaming chip tray having a two-stage structure and a camera device 2 and is a diagram illustrating a state in which two stages are overlapped.
Figure 14B:
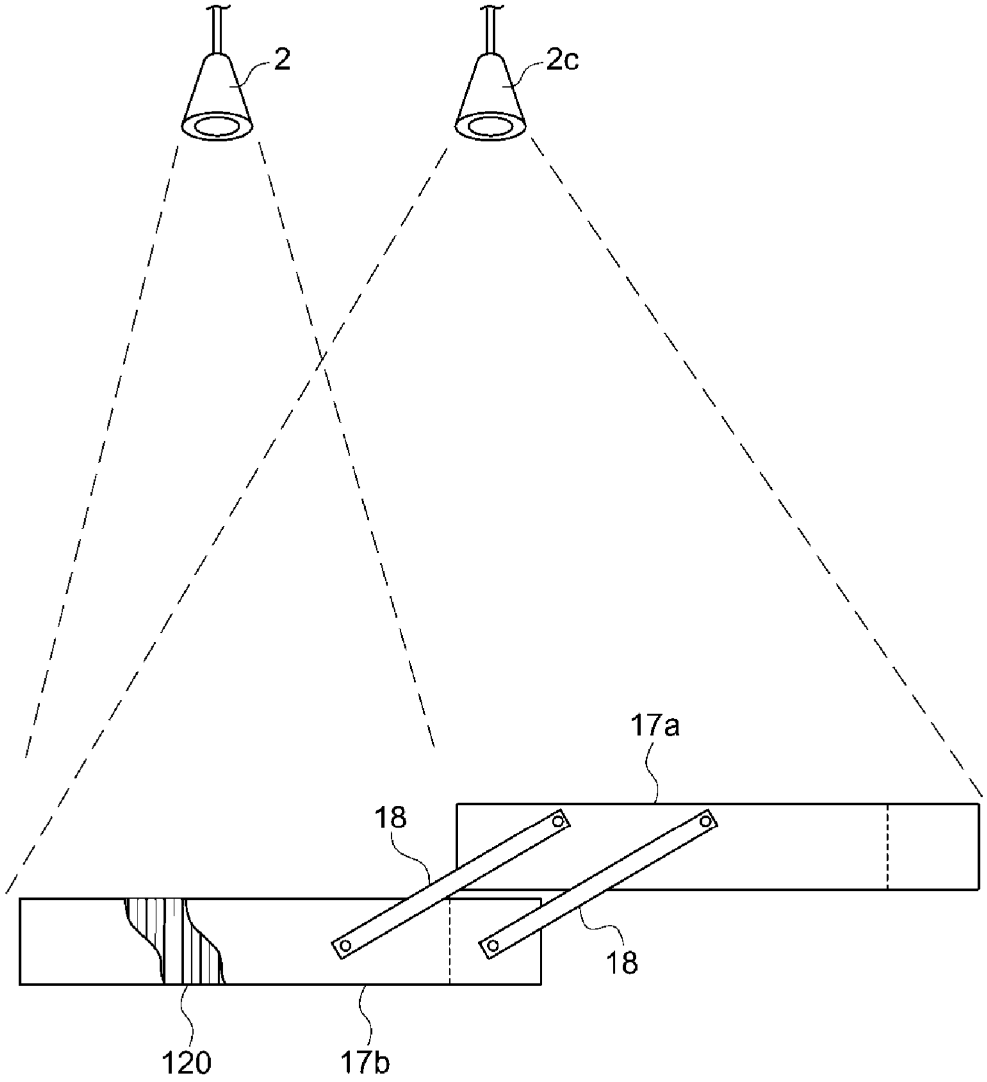
FIG. 14B is a diagram illustrating a relation between a substitute gaming chip tray having a two-stage structure and a camera device 2 and is a diagram illustrating a state in which two stages are shifted from each other.
Figure 15:
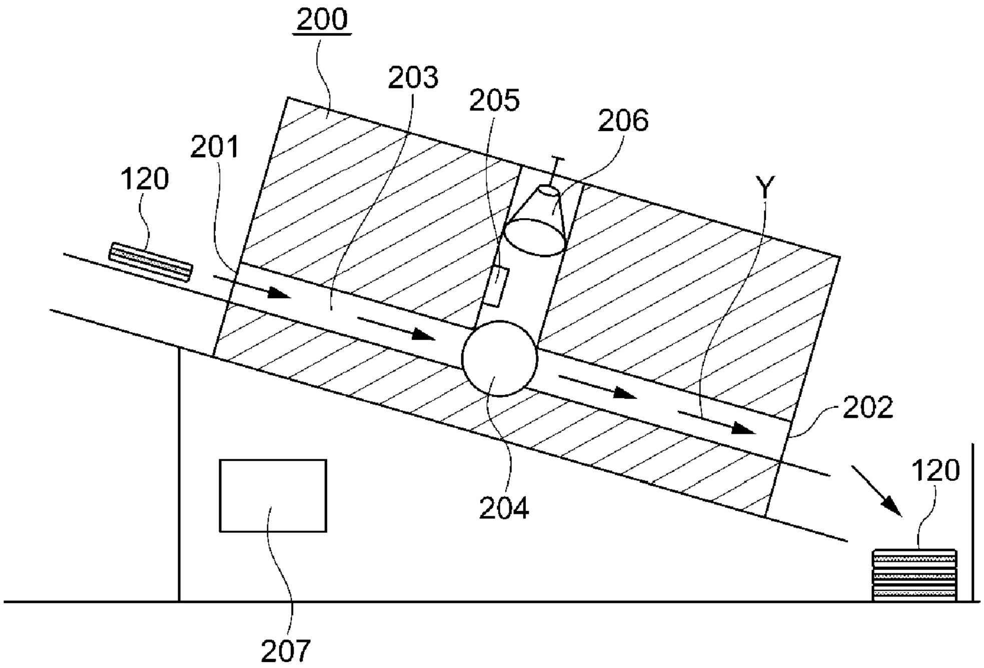
FIG. 15 is a diagram illustrating an inspection device inspecting substitute gaming chips according to the second embodiment.

Here, the substitute gaming chip tray 17 that is illustrated above has a two-stage structure formed by an upper stage substitute gaming chip tray 17*a* and a lower stage substitute gaming chip tray 17*b*. FIGS. 14A and 14B are diagrams that illustrate a relation between the substitute gaming chip tray 17 having a two-stage structure and a camera device 2, FIG. 14A illustrates a state in which two stages overlap each other, and FIG. 14B illustrates a state in which two stages are shifted from each other. In the lower stage of the upper stage substitute gaming chip tray 17*a*, the lower stage substitute gaming chip tray 17*b* is present, and the upper stage substitute gaming chip tray 17*a* and the lower stage substitute gaming chip tray 17*b* are connected through a hinge 17*c*. In a case where substitute gaming chips 120 placed in the upper stage substitute gaming chip tray 17*a* 120 is insufficient, substitute gaming chips 120 are supplemented from the lower stage substitute gaming chip tray 17*b* to the upper stage substitute gaming chip tray 17*a*. On the other hand, in a case where substitute gaming chips 120 placed in the upper stage substitute gaming chip tray 17*a* is excessive, the substitute gaming chips are moved to the lower stage substitute gaming chip tray 17*b*.

In order to take in the substitute gaming chips 120 from the lower stage substitute gaming chip tray 17*b*, the upper stage substitute gaming chip tray 17*a* is moved using the hinge 17*c* to be in a state illustrated in FIG. 14B. In the state illustrated in FIG. 14A, the upper stage substitute gaming chip tray 17*a* is imaged by the camera device 2, and, in the state illustrated in FIG. 14B, the lower stage substitute gaming chip tray 17*b* can be imaged using the camera device 2. In the state illustrated in FIG. 14B, the upper stage substitute gaming chip tray 17*a* and the lower stage substitute gaming chip tray 17*b* can be imaged by the camera device 2*c* simultaneously and in a state in which the trays can be identified from each other. In addition, in the state illustrated in FIG. 14B, the upper stage substitute gaming chip tray 17*a* and the lower stage substitute gaming chip tray 17*b* may be separately imaged. The camera devices 2 and 2*c* may respectively include a visible light camera corresponding to printed ink of a side ID 126 and an infrared-ray camera or may be cameras switchable between a plurality of functions of a visible-light camera corresponding to printed ink and an infrared-ray camera.

Next, an inspection device 200 inspecting the substitute gaming chips 120 according to an embodiment of the present invention will be described with reference to FIG.

15. The inspection device 200 includes a passage 203 that includes an inlet 201 through which substitute gaming chips 120 can pass in the radial direction (the direction of an arrow Y) and an outlet 202. The passage 203 inclines, and the substitute gaming chip 120 passes in the direction of the arrow Y). In the passage 203, a substitute gaming chip type determining device 204 that images the side face of the substitute gaming chip 120 and determines the color of a stripe pattern of the side face in the stacking direction; a mark reading device 205 that reads a face code as a face code using UV ink or ink (carbon black ink) absorbing infrared rays arranged on the surface of the passing substitute gaming chip 120; a print inspecting device 206 that reads the print 123 representing the type arranged on the surface of substitute gaming chip in the vertical direction with respect to the passage 203; and a control device 207 for the whole device. The control device 207 is configured to inspect whether or not the type of the substitute gaming chip determined by the substitute gaming chip type determining device 204 matches a content of the print representing the type acquired from the print inspecting device 206.

By using this inspection device 200, it can be inspected whether or not the print 123 of the manufactured substitute gaming chip 120 matches the type of the substitute gaming chip according to the color of the stripe pattern of the substitute gaming chip 120 and is correctly printed.

As above, the substitute gaming chip 120 according to this embodiment has a stacked structure, in which the coloring layer 121 and the white layer 122 or thin-color layers having the coloring layer 121 interposed therebetween are stacked, formed by a plurality of plastic layers and thus, has a side face on which a stride pattern is formed in the stacking direction. The substitute gaming chip 120 has a configuration enabling the type of the substitute gaming chip 120 to be specified using the coloring layer 121 appearing on the side face. In addition, prints are performed for the upper face and the lower face of the substitute gaming chips 120. More specifically, prints are performed for the surface of the white layer 122 of the thin-color layer, and the transparent layer 124 is included on the upper face thereof. The coloring layer 121 and the white layer 122 or the thin-color layer and the print layer 124 are thermos-compressed together to form a layered structure.

The white layers 122 or the thin-color layers having the coloring layer 121 interposed therebetween may be configured to have different depths in the vertical direction from each other.

In addition, in this embodiment, the R processing is performed for the outer edges of the upper face and the lower face of the substitute gaming chips 120. Accordingly, it can be prevented that a player's hand handling the substitute gaming chips 120 hurts, or the substitute gaming chip 120 damages the other substitute gaming chip 120.

In addition, in this embodiment, the RFID 125 is tightly fixed between plastic layers each forming one of the coloring layer 121 and the white layer 122 or the thin-color layer.

In addition, in this embodiment, on the upper face and/or the lower face of the substitute gaming chip 120, face codes using UV emission ink, infrared absorption ink such as ink (carbon black ink) absorbing infrared rays are arranged. In addition, as a modified example of this embodiment, one or both of a security mark and an optical variable device (OVD) may be printed on the surfaces of the substitute gaming chips 120 instead of the face codes or together with the face codes.

In addition, the substitute gaming chip 120 according to this embodiment has a structure in which the side ID 126 is attached to the side face, the RFID 125 is built, and face codes using UV emission ink or infrared absorption ink are arranged on the upper face or the lower face (the print layer 124). Then, the information of a side ID 126 and the information of an RFID 125 are associated with each other, the information of a side ID 126 and information of a face code are associated with each other, or the information of a side ID 126, information of an RFID 125, and the information of a face code are associated with each other.

In addition, the inspection device 200 according to this embodiment includes: the measurement device 19 of the type of substitute gaming chip 120 that images the side face of the substitute gaming chip 120 and determines the color of the stripe pattern of the side face in the stacking direction; and the mark reading device 205 that reads the print of the substitute gaming chips. In this way, a relation between the type of substitute gaming chips and the content of a print can be inspected.

The management control device 14 according to this embodiment performs imaging for determining the position, the types, and the numbers of substitute gaming chips placed by a game participant in each game when the first card is drawn from the card distributing device 3, before and after drawing, or after a dealer's sign representing the end of betting.

In addition, the substitute gaming chip 120 according to this embodiment is manufactured as below. First, a stacked structure body including a plurality of plastic layers is formed by heating and pressing the coloring layer 121 and the white layers 122 or the thin-film layers. Then, a drawing pattern is printed at least on the upper face or the lower face of the stacked structure body, whereby a substitute gaming chip original plate is generated. Then, punching processing is performed for the substitute gaming chip original plate by using a mold, whereby a plurality of substitute gaming chips having a predetermined shape are acquired. Here, at the time of punching processing, R processing is performed for the outer edges of the upper and lower faces of the substitute gaming chip 120 by using a mold.

In addition, in a case where substitute gaming chips 120 having side IDs is to be manufactured, side IDs are printed on the side faces of the white layers 122 or the thin-color layers through inkjet printing. Furthermore, in a case where substitute gaming chip 120 including an RFID is to be manufactured, an RFID is interposed between the layers of the stacked structure body, and the layers having the RFID interposed therebetween are heated and welded when the layers are thermos-compressed, whereby the periphery of the RFID is tightly fixed by the plastic layers.

In addition, the management system of table games according to this embodiment includes: the card distributing device 13 that determines and displays a result of winning/losing of each game in the game table 4; the camera device 2 that images substitute gaming chips 120 placed on the game table 4; and the management control device 14 that specifies and stores the position, the types, and the numbers of substitute gaming chips placed by the game participant 6 on the game table 4 by using a result of the imaging performed by the camera device 2. The substitute gaming chip 120 is a stacked structure body in which the coloring layer 121 and the white layers 122 or the thin-color layers are stacked and has a stripe pattern on the side face in the stacking direction. The management control device 14 has a calculation function calculating a balance of the casino side in the game table 4 for each game based on a result of winning/losing acquired from the card distributing device 13 and the position, the types, and the numbers of the substitute gaming chips 120 specified using the imaging result of the camera device 2.

The management control device 14 has a function of measuring the number of the coloring layers 121 or the white layers 122 or the thin-color layers of substitute gaming chips 120 placed by each game participant 6, determines the types and the numbers of the substitute gaming chips by using the colors of the coloring layer 121, and determining the amounts of the substitute gaming chips 120.

A system according to this embodiment relates to a management system of substitute gaming chip preventing the use of fake substitute gaming chips in a game house in a casino or other game facilities using substitute gaming chips.

Among many live table games played in a casino or a game facility, there are Baccarat and blackjack. In such games, a standard deck configured by 52 playing cards is used, and playing cards are distributed to a game table from a shooter including a plurality of decks (6 to 9 decks or 10 decks) shuffled in advance, and a game is played. In a casino or a game facility, substitute gaming chips are used for such games.

The use of fake substitute gaming chip should not occur in a casino. In order to prevent the use of fake substitute gaming chips in a casino, there is a technology for preventing the use of fake substitute gaming chips by attaching an RFID to substitute gaming chips. The RFID-attached substitute gaming chips are known and is disclosed in WO 2008/120749 A.

This embodiment provides a management system of substitute gaming chips preventing the use of fakes of substitute gaming chips in a casino or a game facility, and the use and unjust exchange of fake substitute gaming chip in a casino or a game facility can be prevented. In recent years, the technologies for manufacturing fake substitute gaming chips evolve, and technologies advance up to a level of copying an authenticity determination mark or an RFID almost perfectly. As a result, a mark or an RFID that is the same as a genuine authenticity determination mark or a genuine RFID is attached to substitute gaming chip, genuine and fake substitute gaming chip cannot be discriminated from each other, and there is a problem in that it is almost impossible to perform an authenticity determination.

In order to solve the conventional problem described above, a management system of substitute gaming chip according to this embodiment includes: substitute gaming chip to which a side ID that can be individually identified is attached; an ID reading device that reads a side ID attached to the substitute gaming chip; a storage in which the substitute gaming chip is stored in a cashier of a game house; a game table substitute gaming chip tray that stores the substitute gaming chip; a substitute gaming chip determining device that specifies types and numbers of the substitute gaming chips stored in the game table substitute gaming chip tray and the storage by using the ID reading device; and a management control device that manages the IDs associated with the substitute gaming chips in a database. The management control device has functions of registering the IDs of the substitute gaming chips to be used in the database in advance, managing the IDs of the substitute gaming chips present at least in the game table substitute gaming chip tray and the storage in the database together with presence information by using the database, specifying the substitute gaming chips in the game table substitute gaming chip tray and the storage at predetermined timing, searching the database, determining the following events through the database search 1) an ID not present in the database is newly present 2) two or more same IDs are present, and generating an error signal when a situation of 1) or 2) described above is present.

In addition, the management control device has functions capable of, when there is a change in the presence of the substitute gaming chips at least in the game table substitute gaming chip tray and the storage, recording time or a place at which there is the change in the database in association with the ID, searching the database, when there is a situation in which two or more same IDs are present, extracting the ID and information of time or a place recorded in association with the ID in the database from the database and storing extracted information, and specifying time when the substitute gaming chips to which the ID is attached, which is detected first, enters/exits the game table substitute gaming chip tray or the storage or a place of the game table substitute gaming chip tray or the storage in which the substitute gaming chips are stored.

Furthermore, the management system of substitute gaming chip may further include: a bet area substitute gaming chip determining device specifying the types and numbers of the substitute gaming chips bet on a bet area of the game table by using the ID reading device and may have functions of determining the following events through a search of the database also for the ID of the substitute gaming chip present in the bet area of the game table 1) an ID that has not been present in the database is newly present 2) presence of two or more same IDs and generating an error signal when there is a situation of 1) or 2) described above.

In addition, side IDs are attached to at least three positions on the side face of the substitute gaming chip. The side IDs are attached through inkjet printing by using ink that is visible using visible light. Particularly, a configuration is advantageous in which the side ID is attached as presence/absence of marks of a plurality of rows and a plurality of columns. In addition, transparent coating layers or varnish is disposed on the upper and lower faces of the substitute gaming chip.

In order to solve the conventional problems, substitute gaming chip according to this embodiment forms a stripe pattern on the side face in the stacking direction by employing a multi-layer structure in which a plurality of plastic layers having different colors are stacked, a coloring layer is included at least in one layer, white layers or thin-color layers are stacked on a further outer side than the coloring layer and has a configuration enabling the type of the substitute gaming chip to be specified by the coloring layer. In addition, side IDs are attached to at least three positions on the side faces of the white layers and the thin-color layers, and the type and the manufacturing information of substitute gaming chip can be specified by reading the ID by using the ID reading device, and a configuration in which the ID can be managed in a database is included. Then, the side ID may be attached using ink (visible ink) that is visible for visible light through inkjet printing. The side ID may be attached using ink (ink absorbing infrared rays, UV ink, or the like) that is not visible for visible light through inkjet printing. In addition, the side ID may be printed using at least two or more of ink that is visible for visible light, ink absorbing infrared rays, and UV ink.

In order to solve the conventional problems described above, substitute gaming chip according to this embodiment has a side ID that can be individually identified attached thereto, the side ID attached to the substitute gaming chip is read by an ID reading device, the ID reading device can read the substitute gaming chip stored in a storage maintained by a cashier of a game house and a substitute gaming chip tray of a game table, in addition, the types and the numbers of the substitute gaming chips stored in the substitute gaming chip tray and the storage are specified by a substitute gaming chip determining device through the ID reading device, the ID of the substitute gaming chip present in the substitute gaming chip tray of the game table and the storage is managed in the database together with the presence information thereof, it is inspected whether at least 1) an ID that has not been present in the database is newly present and 2) two or more same IDs are present, and the ID enabling the occurrence of the situation 1) or 2) described above to be determined is included.

Figure 16:
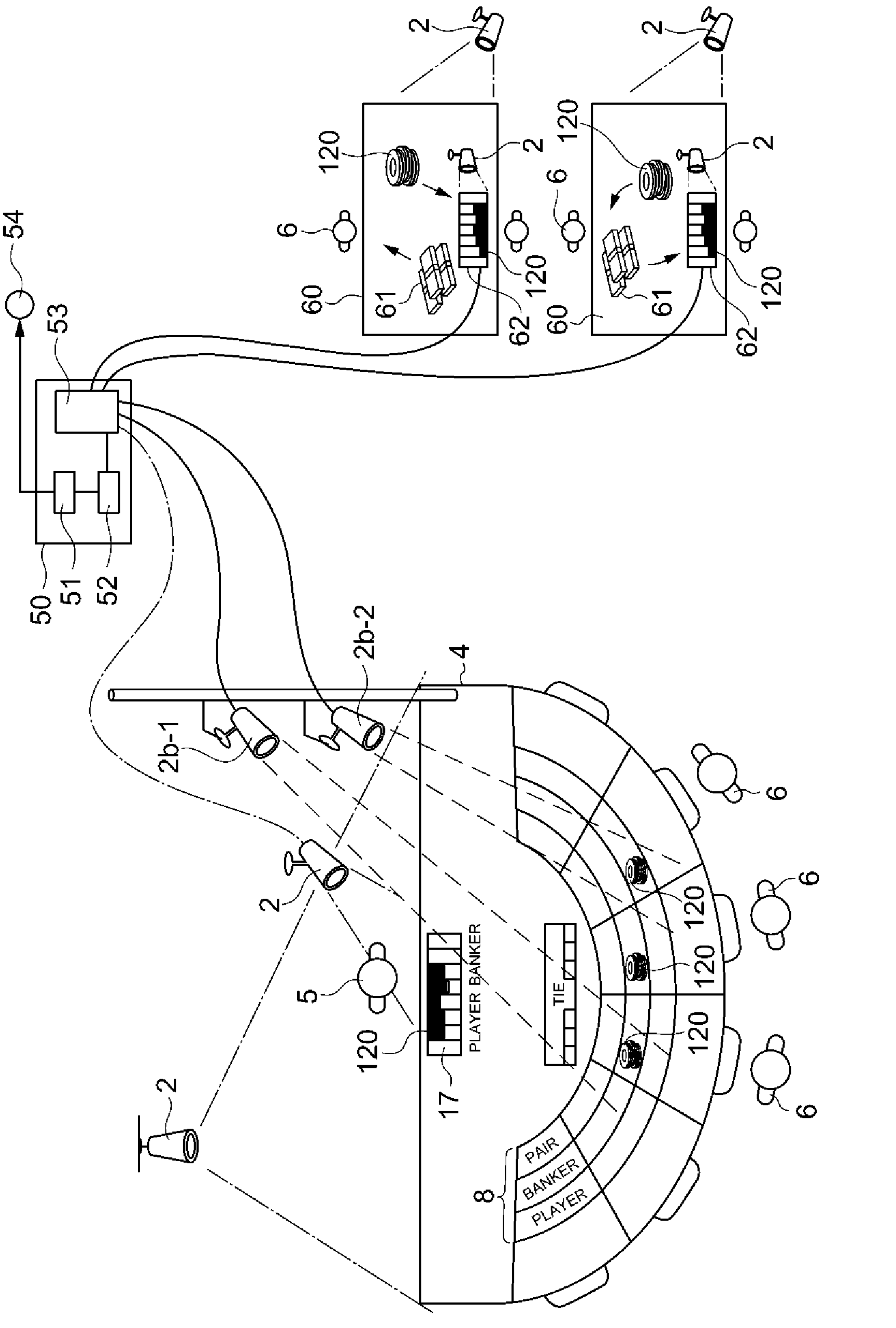
FIG. 16 is a diagram illustrating an overview of the whole substitute gaming chip management system according to a third embodiment of the present invention.

Hereinafter, a management system of substitute gaming chip in a game house including a game table according to an embodiment of the present invention will be described with reference the drawings. FIG. 16 is a diagram that illustrates an overview of the whole system. The management system of substitute gaming chip in a game house including a plurality of game tables 4 (only one game table is illustrated in FIG. 16) images the state of progress of a game played in the game table 4 including a game participant 6 and a dealer 5 through a plurality of camera devices 2 and stores and manages the state. Particularly, the management system of substitute gaming chip specifies the types and the numbers of substitute gaming chips 120 used in the game table 4 by analyzing image information acquired by the camera device 2. A side ID 126 is attached to the side face of the substitute gaming chip 120, and the types and the numbers of the substitute gaming chips 120 is acquired by determining the side ID 126 and reading the types and the numbers. In addition, in this specification, a description of "side ID" or "ID" is used not only in the meaning of an ID as a physical entity attached to the side face of the substitute gaming chip 120 but also in the meaning of identification information represented thereby. An ID reading device 53 disposed inside a management control device 50 connected to the camera device 2 specifies a side ID 126 by analyzing image information acquired from the camera device 2. Particularly, the management control device 50 includes a substitute gaming chip determining device 52 specifying the types and the numbers of the substitute gaming chips 120 that is in a horizontally aligned state or in a piled state based on a result of the reading of the side ID 126 acquired by analyzing the image data imaged through the camera device 2 therein.

In addition, the management system according to this embodiment is configured to image substitute gaming chips 120 disposed on a game table 4 by using a plurality of camera devices 2*b*-1 and 2*b*-2, which have different heights, arranged at predetermined positions in addition to the camera device 2 that images the substitute gaming chips 120 and records an acquired image. The camera device 2*b*-1 can image substitute gaming chips 120 disposed at a relatively far position on the game table 4, and the camera device 2*b*-2 is configured to image substitute gaming chips 120 disposed relatively close on the game table 4. By performing imaging the two camera devices 2*b*-1 and 2*b*-2, substitute gaming chips 120 disposed at a place that is in a blind area for one of the camera devices can be imaged as well.

In a plurality of cashiers 60 present in a game house, the substitute gaming chips 120 are exchanged with cash 61 paid by a game participant 6, and, in each cashier 60, substitute gaming chips 120 are stored in a storage 62 storing the substitute gaming chips 120. In each cashier 60 of a game house, substitute gaming chips 120 brought by a game participant 6 is refunded into cash 61. In the game table 4, substitute gaming chips 120 are stored in a game table substitute gaming chip tray 17, and a dealer 5 collects substitute gaming chips 120 bet by a game participant 6 who has lost the game from the table 4 in each game, returns the collected substitute gaming chips 120 to the game table substitute gaming chip tray 17, and then re-pays the substitute gaming chips 120 to a game participant 6 who has won each game. All such exchanges between a game participant 6 and a cashier 60 of a game table or a dealer 5 are imaged and recorded by all the camera devices 2. In the storage 62 or the game table substitute gaming chip tray 17, when there is exchange of substitute gaming chips 120 with a game participant 6, the substitute gaming chips 120 stored in the storage 62 or the game table substitute gaming chip tray 17 increases or decreases. The types and the numbers of the substitute gaming chips 120 stored in the game table substitute gaming chip tray 17 and the storage 62 are monitored at predetermined timing or constantly by the ID reading device 53 and the substitute gaming chip determining device 52 through the camera device 2. The management control device 50 stores the side IDs 126 of all the substitute gaming chips 120 assumed to be used in a game house in the database 51 in advance (the side IDs 126 of all the substitute gaming chips 120 assumed to be used in the game house are registered).

In addition, also in this embodiment, the substitute gaming chip tray 17, as illustrated in FIGS. 14A and 14B, may be configured by an upper substitute gaming chip tray 17*a* and a lower substitute gaming chip tray 17*b* of upper/lower two stages. In such a case, in the state illustrated in FIG. 14A, the upper substitute gaming chip tray 17*a* can be imaged by the camera device 2, and, in the state illustrated in FIG. 14B, the lower substitute gaming chip tray 17*b* can be imaged by the camera device 2. In the state illustrated in FIG. 14B, additionally, the upper substitute gaming chip tray 17*a* and the lower substitute gaming chip tray 17*b* can be imaged by the camera device 2*c* simultaneously and also in an individually-identifiable state. In addition, in the state illustrated in FIG. 14B, the upper substitute gaming chip tray 17*a* and the lower substitute gaming chip tray 17*b* may be separately imaged. Each of the camera devices 2 and 2*c* may include a single visible-light camera or a single infrared ray camera corresponding to ink printed for the side ID 126 or a camera capable of performing switching among a plurality of functions of a visible-light camera and an infrared-ray camera corresponding to the printed ink.

In this way, in the game house, by using the database 51, the management control device 50 managing the side IDs 126 associated with substitute gaming chips 120 manages all the side IDs 126 of at least substitute gaming chips 120 present in the game table substitute gaming chip tray 17 and the storage 62 in the database 51 together with the presence information thereof (the storage 62, the game table substitute gaming chip tray 17, in the middle of moving from a backyard (not illustrated in the drawing), held by a game participant 6, or the like). The management control device 50 specifies all the substitute gaming chips 120 disposed in the game table substitute gaming chip tray 17 and the storage 62 by using the side IDs 126 at predetermined timing or constantly, searches the database 51, and determines the following events through the search of the database 51: 1) A side ID 126 that has not been present (or not present) in the database 51 is determined to be newly present; and 2) Two or more same IDs are determined to be present.

The management control device 50 has a function of generating an error signal representing an abnormality and giving a notification to a management division or a security division 54 of the game house when the situation of 1) or 2)

described above is present. The management control device 50 specifies all the substitute gaming chips 120 disposed in the game table substitute gaming chip tray 17 and the storage 62 at predetermined timing or constantly by using the side IDs 126 and stores all the substitute gaming chips 120 in the database 51 and thus, can determine that 1) a side ID 126 that has not been present (or not present) in the database 51 is newly present and 2) two or more same IDs are present.

In addition, when there is a change in the presence of the substitute gaming chips 120 at least in the game table substitute gaming chip tray 17 and the storage 62, the management control device 50 records time or a place (the storage 62, the game table substitute gaming chip tray 17, or the like) at which the change is present in the database 51 in association with the side ID 126 and, as a result of the search of the database 51, when there is a situation in which two or more same side IDs 126 are present, extracts the side ID 126 and information of time or a place recorded in the database 51 in association with the side ID 126 from the database 51 and stores the side ID and the information that have been extracted, and thus, time at which substitute gaming chip 120 to which the side ID 126 is attached, which has been detected first (used first or cashed), enters/exits the game table substitute gaming chip tray 17 or the storage 13 or a place of the game table substitute gaming chip tray 17 or the storage 13 in which the substitute gaming chips 120 are stored can be specified by using the database 51. When the time and the place can be specified, a suspicious person for the use of unjust substitute gaming chips 120 or the like can be specified from the recorded video of the camera device 2.

In this management system of substitute gaming chip, the management control device 50 can specify the types and the numbers of the substitute gaming chips 120 bet on the bet area 8 of the game table 4 by using the ID reading device 53. The substitute gaming chips 120 of the bet area 8 are imaged by the camera device **2*b* that particularly images the bet area 8 and, also for the side ID 126 of the substitute gaming chip 120 present on the bet area 8 of the game table 4, determines the following events by searching the database 51: 1) A side ID 126 that has not been present in the database 51 is newly present in the bet area 16**; and 2) Two or more same IDs are present.

The management control device 50 has a function of generating an error signal when a situation of 1) or 2) described above is present.

The management control device 50 of this system, the ID reading device 53 disposed inside, and the substitute gaming chip determining device 52 specifying the types and the numbers of substitute gaming chips 120 have a structure integrally including a computer formed as one body or by a plurality of configurations, a program, and a memory.

Figure 17:
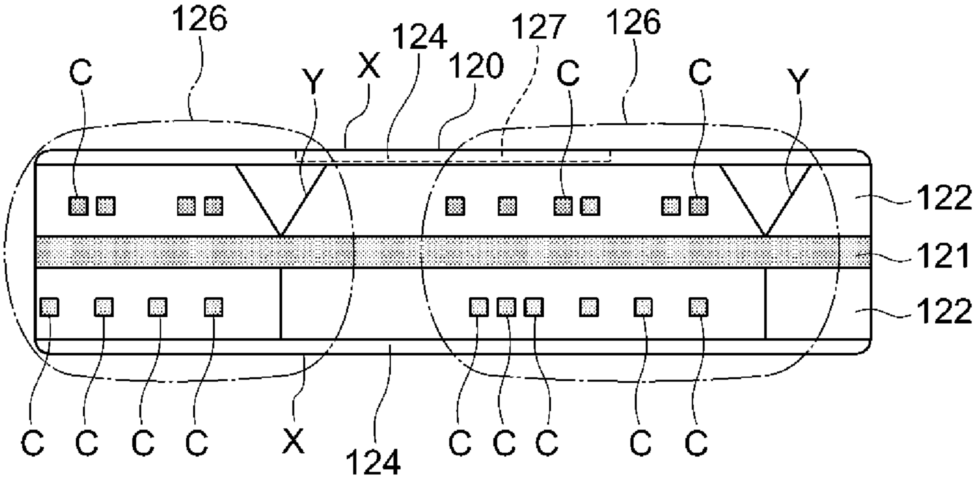
FIG. 17 is a side view of a substitute gaming chip according to the third embodiment of the present invention.

Next, details of substitute gaming chip 120 (so-called substitute currency for gaming) used in this system will be described. FIG. 17 is a side view of substitute gaming chip 120 used in this system, the substitute gaming chip 120 is formed by stacking a plurality of plate-shaped plastic layers having different colors, forming the plastic layers to be integrated using a means of thermo-compressing or the like, and then, punching holes in the shapes of circles and quadrangles. The substitute gaming chip 120 manufactured in this way has a multi-layer structure in which a coloring layer 121 is included at least in the middle, and white layers 122 or thin-color layers (may be layers of a color thinner than that of the coloring layer 121; not illustrated in the drawing) are stacked on both sides (in FIG. 17, the upper and lower sides) of the coloring layer 121 disposed in the middle. In this way, by employing the multi-layer structure in which the coloring layer 121 is included, and the white layers 122 or the thin-color layers (may be layers of a color thinner than that of the coloring layer 121; not illustrated in the drawing) are stacked on both sides of the coloring layer 121 disposed in the middle, as illustrated in FIG. 17, a stripe pattern (in the stacking direction) when seen from the side face is formed, and, by changing the color (red, green, yellow, blue, or the like) of the coloring layer 121 for each type (10 points, 20 points, 100 points, 1000 points, and the like) of the substitute gaming chip 120, the type of the substitute gaming chip 120 can be specified.

In addition, as illustrated in FIG. 17, in the substitute gaming chip 120, a side ID 126 representing the type of substitute gaming chip 120 is applied to the side faces of the white layers 122.

In the outermost layers, transparent layers 124 are arranged, and each interlayer is thermo-compressed to form a structure of at least five layers. Such substitute gaming chip 120 is formed by using a plastic material having a thin long shape, and layers (at least the coloring layer 121 and the white layers 122) are thermo-compressed to form a closely adhering state (the structure of five layers or the like) in the state of a long length, and thereafter, holes having a circular shape, a rectangular shape, or the like are formed therein through press or the like.

When a hole is formed through the press, die of mold for punching, and the size of punching are designed, and R processing (round angle) is performed for the ends of the transparent layer 124 of the outermost layer.

The transparent layers 124 may be a coat layer of varnish. The side ID 126 is attached to at least three positions on the side face of the substitute gaming chip 120. The side ID 126 is attached through inkjet printing using ink that is visible for visible light.

Figure 18:
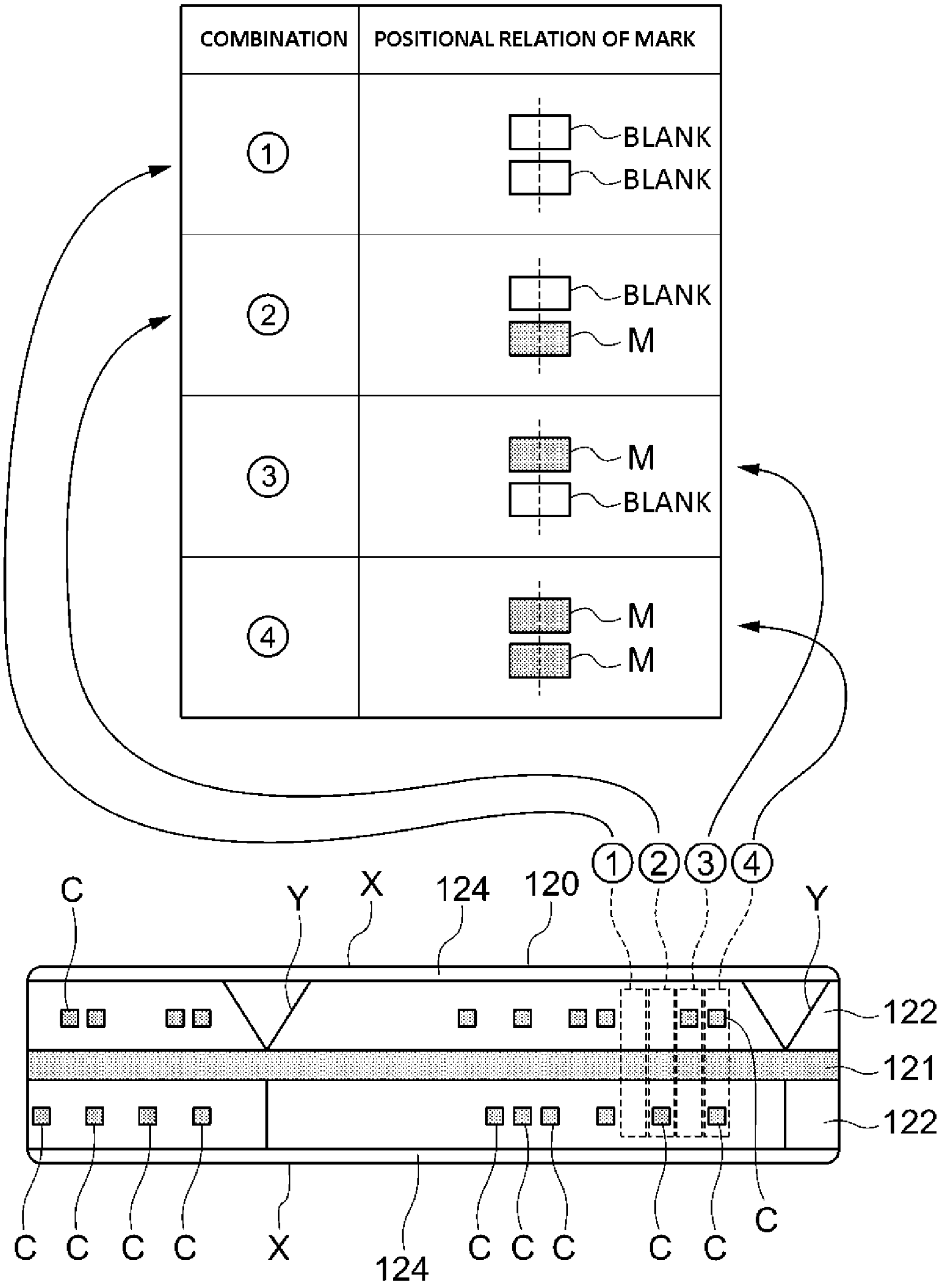
FIG. 18 is a diagram illustrating a substitute gaming chip configuring a code (four kinds) using upper and lower marks C as a pair.

Particularly, in this embodiment, the side ID 126 is configured to be attached as presence/absence of marks C of a plurality of rows and a plurality of columns. In the marks C of the plurality of rows and the plurality of columns, as illustrated in FIG. 17, upper and lower marks C are paired to configure a code, and a code of ten digits is formed in the case illustrated in FIG. 17. A configuration in which upper and lower marks C are paired to configure a code (four types) is illustrated in FIG. 18. A letter "Y" disposed to the side of marks C is an identification mark used for identifying upper and lower sides of a mark. A code configured by marks C is configured to specify a predetermined combination of marks C. As a result, in the example illustrated in FIG. 18, there are four types of combination of the marks C of upper and lower two columns, and, by printing these in ten columns, four to the power of 10 codes can be configured. Since there are four types of a 10-digit code, 4 to the power of 10 codes are acquired, and accordingly, the side IDs 126 of substitute gaming chip 120 can be sufficiently assigned.

The substitute gaming chip 120 forms a stripe pattern on the side face in the stacking direction by employing a multi-layer structure in which a plurality of plastic layers having different colors are stacked, the coloring layer 121 is included at least in one layer, the white layers 122 or the thin-color layers are stacked on a further outer side than the coloring layer 121 and has a configuration enabling the type of the substitute gaming chip 120 to be specified using the coloring layer 121. The side IDs 126 are disposed at least three positions (preferably, six positions) on the side face of the white layer 122 or the thin-color layer, and, in this example, six side IDs are disposed at a predetermined interval of 60 degrees in the rotation direction (circumferential direction). The side IDs 126 individually identifiable (different for each one) are attached to substitute gaming chip 120, and the side IDs 126 are disposed at a predetermined interval of 60 degrees in the rotation direction (circumferential direction) such that the side ID is necessarily seen from the lateral side. The side IDs 126 attached to the substitute gaming chip 120 are read by the ID reading device 53 described above. The type, the manufacturing information, and the like of substitute gaming chip 120 can be specified by reading the side ID 126 by using the ID reading device 53, and a configuration in which the side ID 126 can be managed in the database 51 is formed. In this embodiment, the side IDs 126 are attached using ink (visible ink) that is visible for visible light through inkjet printing. The side IDs 126 may be printed using at least one or a combination of ink (ink absorbing infrared rays) that is not visible for visible light and ink (including a side ID that is very small and is difficult to see) that is visible for at least visible light. In addition, the side IDs 126 may be printed by combining a plurality of such ink of a plurality of types. The ID reading device 53 includes at least a plurality of cameras (that is, a visible-light camera in a case where ink is visible ink, an infrared-ray camera in a case where ink is infrared reactive ink, and an ultraviolet camera in a case where ink is UV ink (UV radiator and a visible-light camera)) corresponding to the ink used for printing the side ID 126 or includes a camera capable of performing switching among a plurality of functions of cameras (a visible-light camera, an infrared ray camera, and an ultraviolet ray camera (an UV radiator and a visible-light camera or the like)) corresponding to the ink.

Figure 19:
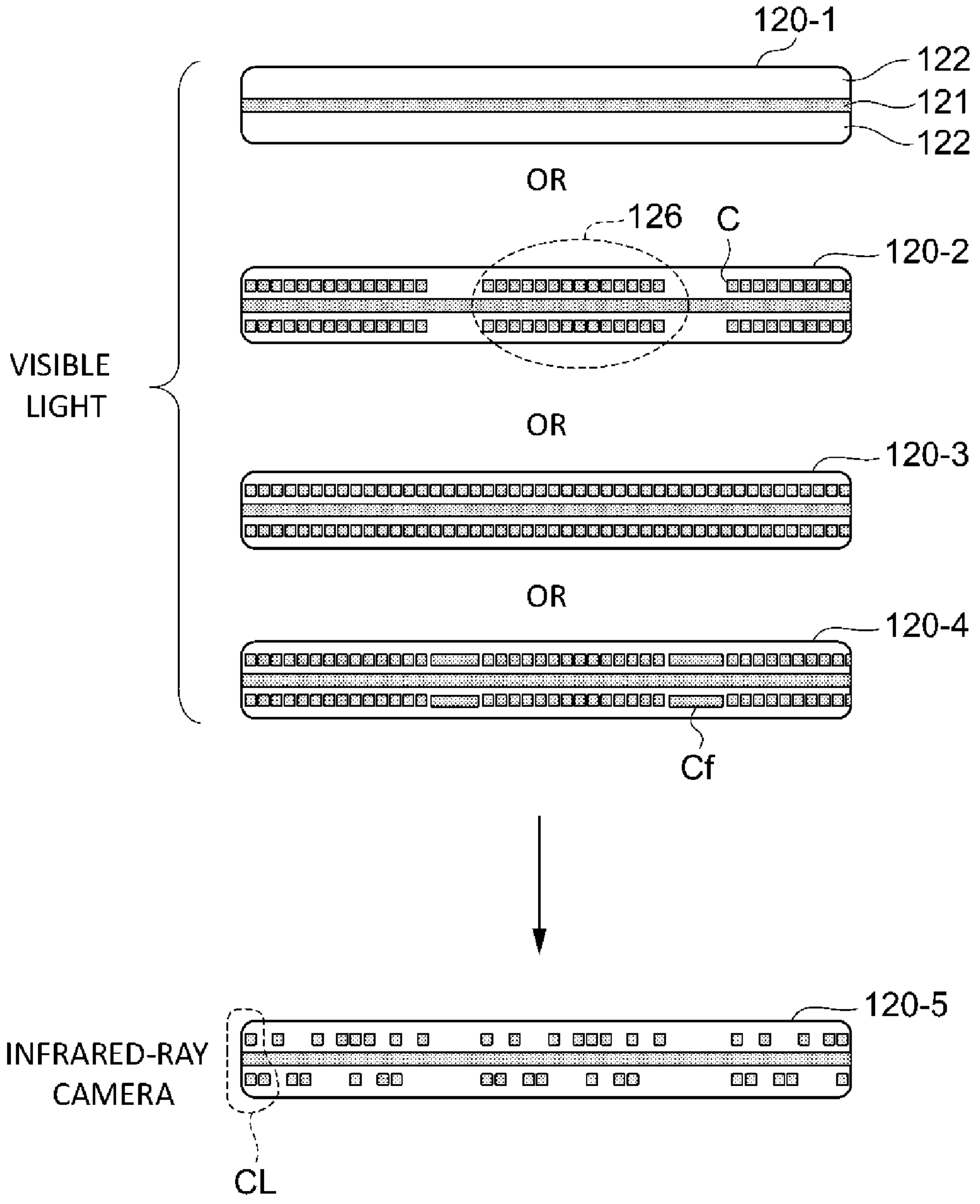
FIG. 19 is a diagram illustrating substitute gaming chips in which side IDs are printed using ink (ink absorbing infrared rays) that is invisible for visible light.

In the case illustrated in FIG. 19, in substitute gaming chip 120-1, side IDs 126 are printed using ink (ink absorbing infrared rays) that is not visible for visible light. In substitute gaming chip 120-2, marks C of a plurality of rows and a plurality of columns are printed using ink that is seen dark for visible light. In substitute gaming chip 120-3, additionally, marks C are printed using ink seen dark for visible light also between the side IDs 126, and the side IDs 126 are configured to dissolve in the design not to be visually distinguished. In substitute gaming chip 120-4, a start point and an end point of the side ID 126 are represented by a mark Cf representing the end. When the substitute gaming chips 120-1 to 120-4 are seen using an infrared-ray camera, ink absorbing infrared rays absorbs infrared rays to be seen dark, and the substitute gaming chips 120-1 to 120-4 can be imaged in a state (represented as the substitute gaming chip 120-5) in which the side ID 126 can be read. In addition, the upper and lower sides of the side ID 126 are illustrated using a mark CL representing the upper and lower sides. A relation between the upper and lower sides of the mark is as illustrated in FIG. 17. In addition, the side IDs 126 may be printed using a combination of ink that is visible for visible light and an infrared ray absorption ink.

Figure 20A:
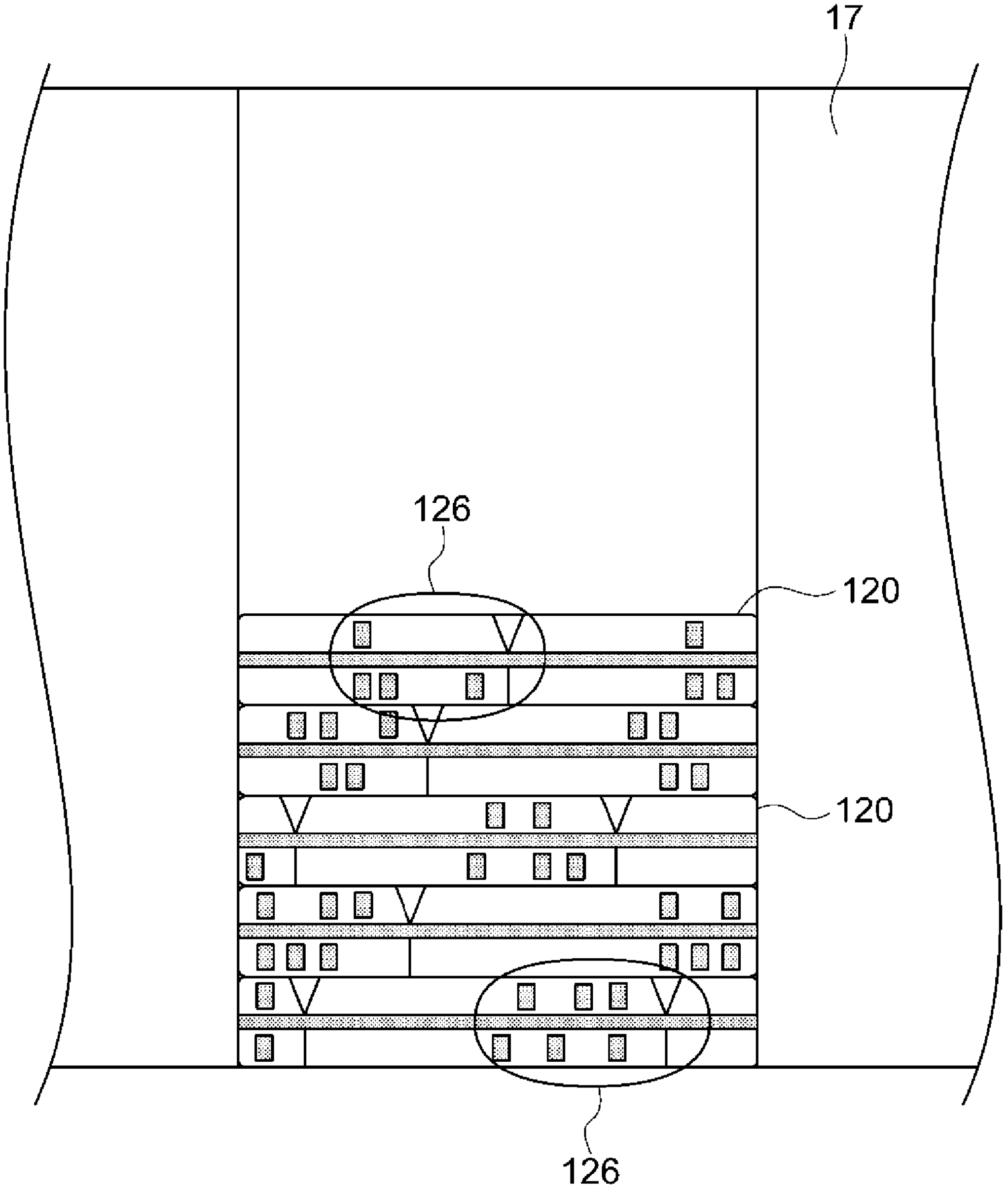
FIG. 20A is a plan view of a main part of a substitute gaming chip tray illustrating a state in which substitute gaming chips according to the third embodiment are held in a substitute gaming chip tray of a casino table.
Figure 20B:
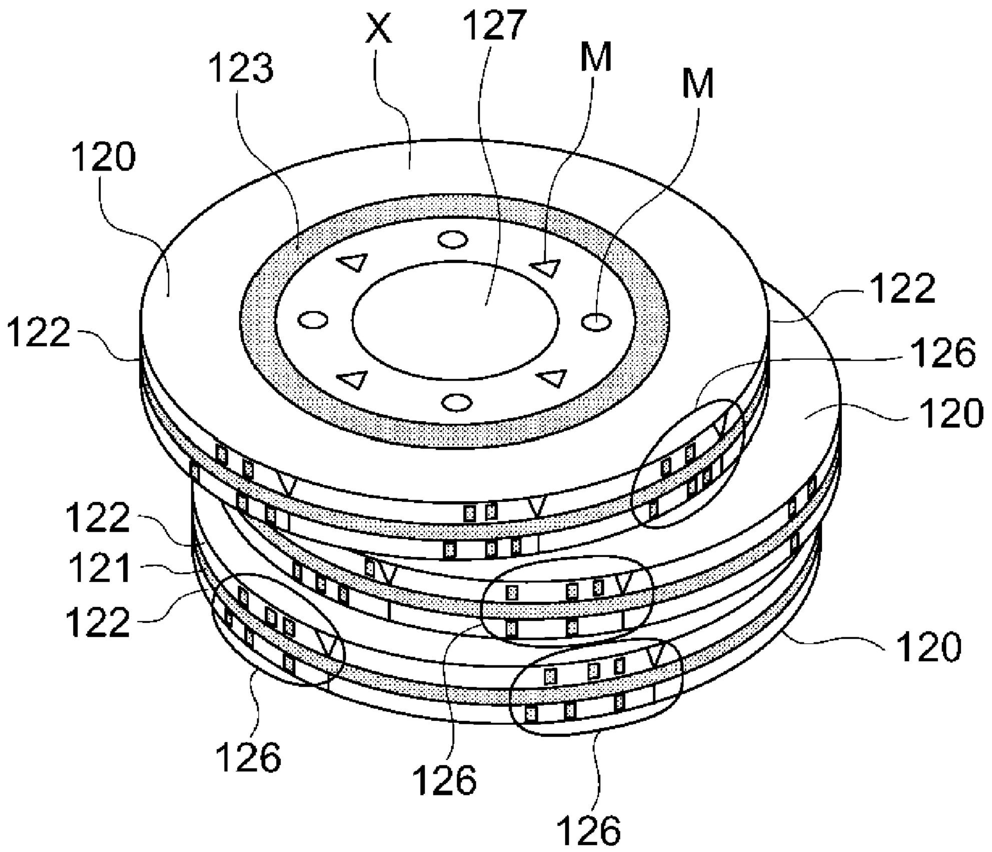
FIG. 20B is a perspective view of a state in which substitute gaming chips are piled.

The side IDs 126 attached to the substitute gaming chip 120 are read by the ID reading device 53 described above, and the ID reading device 53 can read the substitute gaming chip 120 held in the storage 62 of a cashier of a game house and the game table substitute gaming chip tray 17 of the game table, and actually, as illustrated in FIG. 20A, when the substitute gaming chips 120 is stacked horizontally, the side IDs 126 can be read. In addition, the substitute gaming chips 120 stacked in the bet area 8 or the like, as illustrated in FIG. 20B, can be also read.

Furthermore, in the substitute gaming chip 120, a face code using UV ink or ink (carbon black ink) absorbing infrared rays is arranged on the surface (X) of the white layer 122 (see FIG. 9B).

This face code represents authenticity of substitute gaming chip 120, and, when ultraviolet rays (or infrared rays) hit the face code, the face code becomes visible to the eyes and represents authenticity based on a combination of the forms and a number. While the transparent layers (print layers) 124 are thermos-compressed or coated in the outermost layers to cover a print 123 (100 points or the like) used for specifying a game house and a face code disposed on the surface, embossing process or varnish processing is performed for the transparent layers 124, and the substitute gaming chip 120 is prevented from adhering to each other and is caused to slide well. In the substitute gaming chip 120, a circular recess 127 is arranged at the center of each of the upper and lower faces.

According to the recesses 127, the substitute gaming chip 120 is prevented from being adhere to each other, and, by increasing the diameter of the recesses 127, the substitute gaming chip 120 can slide well.

The R processing (R) is performed for the ends of the transparent layers (print layers) 124 of the outermost layers for which a print 123 (100 points or the like) is performed, and, in the punching process of the substitute gaming chip 100, the surfaces of the white layers 122 are prevented from being deformed to appear on the side face. In addition, it is prevented that a sharp end remains in the substitute gaming chip 100 and damages the hands or the other substitute gaming chip 120. The coloring layer 121 may be formed by colored one layer or a plurality of layers. In addition, metal or ceramic used for increasing the weight may be built in a layer included in the layer of the coloring layer 121. More specifically, in the material of the layer included in the layer of the coloring layer 121, for example, metal powders (for example, a metal oxide of one or a plurality of metal oxides of zinc oxide and titanium oxide) may be contained. In addition, a part of the coloring layer 121 is hollowed out, or a space is arranged between the coloring layer 121 and the white layer 122, and an RFID may be built therein. In such a case, as the side ID 126 of the substitute gaming chip 120, a side ID 126 according to a code using the marks C and a side ID using the RFID are used together.

In the substitute gaming chip 120 configured in this way, the types and the numbers of the substitute gaming chips 120 that is held in the game table substitute gaming chip tray 17 and the storage 62 are specified by the substitute gaming chip determining device 52 through the camera device 2 and the ID reading device 53, and the side IDs 126 of the substitute gaming chip 120 present on the game table substitute gaming chip tray 17 and the storage 62 are managed in the database 51 together with the presence information thereof. In this way, at least, it is inspected whether 1) a side ID 126 that has not been present in the database 51 is newly present; and 2) two or more same side IDs 126 are present. By determining the occurrences of the situations of 1) and 2) described above by searching for all the side IDs 126, the inspection is realized.

As described above, while a game participant 6 can perform exchange of cash 61 for substitute gaming chips in the cashier 60, exchange of cash 61 for substitute gaming chips 120 can be performed also in the game table 4. The camera device 2 images bills placed on the game table 4 to exchange them for substitute gaming chips 120. That is, a plurality of camera devices 2 imaging the substitute gaming chips 120 disposed on the game table 4 are arranged at different positions to have different heights.

The management control device 50 specifies the types and the numbers of substitute gaming chips 120 to be discharged from the substitute gaming chip tray 17 in the exchange from bills by using a result of imaging of bills using the camera device 2. The management control device 50 compares real total amounts of the substitute gaming chips 120 housed in the substitute gaming chip tray 17 before and after the payment and determines whether or not this difference corresponds to the specified types and numbers of the substitute gaming chips 120 to be discharged.

That is, the management control device 50 determines through a comparison whether or not a total amount of the substitute gaming chips 120 perceived in the substitute gaming chip tray 17 corresponds to an increase/decrease according to a paid amount of the substitute gaming chips 120 corresponding to exchanged bills after the exchange of the bills and the substitute gaming chips 120. In addition, when collection and re-payment according to a result of winning/losing of a game are simultaneously performed, the management control device 50 determines through a comparison whether or not the total amount corresponds to an amount of the substitute gaming chips 120 bet by all the players 6 and an increase/decrease in the substitute gaming chips 120 calculated based on a result of the winning/losing of the game.

Here, the management control device 50 is a control device having an artificial intelligence-utilizing or deep-learning structure capable of acquiring information of the types and the numbers of the substitute gaming chips 120 even in a state in which a part or whole one unit of the substitute gaming chips 120 is hidden when the types and the numbers of the substitute gaming chips 120 are measured and determined.

As described above, the side IDs 126 are attached to the white layers 122 or the thin-color layers of the side face of the substitute gaming chip 120 at least at three or more positions spaced apart in a rotation direction (circumferential direction). The types and the manufacturing information of substitute gaming chips 120 can be specified by reading the side IDs 126 by using the ID reading device 53. The specified information specified through measurement has a configuration that can be collated and managed with the database 51.

The management control device 50 may be a control device having an artificial intelligence-utilizing or deep learning structure. The management control device 50 can perceive the position 8 (a position betting on a player, a banker, or a pair), the types (a value of a different amount is assigned to the substitute gaming chip for each color), and the numbers of the substitute gaming chips 120 by using an artificial intelligence-utilizing type computer or control system, a deep-learning (structure) technology, a self-learning function, or the like.

Figure 21:
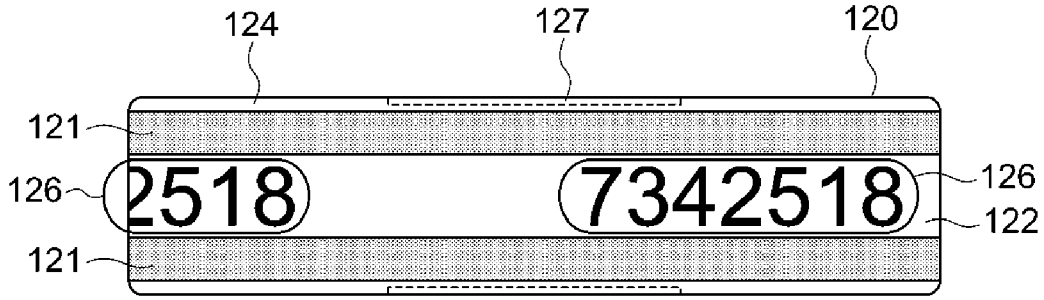
FIG. 21 is a diagram illustrating another example of a substitute gaming chip according to the third embodiment.

Hereinafter, a modified example of the substitute gaming chip 120 will be described. In the modified example, on the side face of the substitute gaming chip 120, a seven-digit number is printed as the side ID 126. In the example illustrated in FIG. 21, a white layer 122 is disposed in the middle, and, under the white layer, a coloring layer 121 is disposed. A number as a mark is printed on the white layer 122 disposed in the middle and configured a side ID 126. When 10 types of combinations of numbers are printed in seven digits, 10 to the power of 7 codes can be configured, and accordingly, the side IDs 126 of substitute gaming chip 120 can be sufficiently assigned. In the camera device 2 and an image analysis thereof, there are cases where it is difficult to determine and read a number, a combination of marks C described in the previous embodiment is considered to be advantageous in the image analysis.

Figure 22:
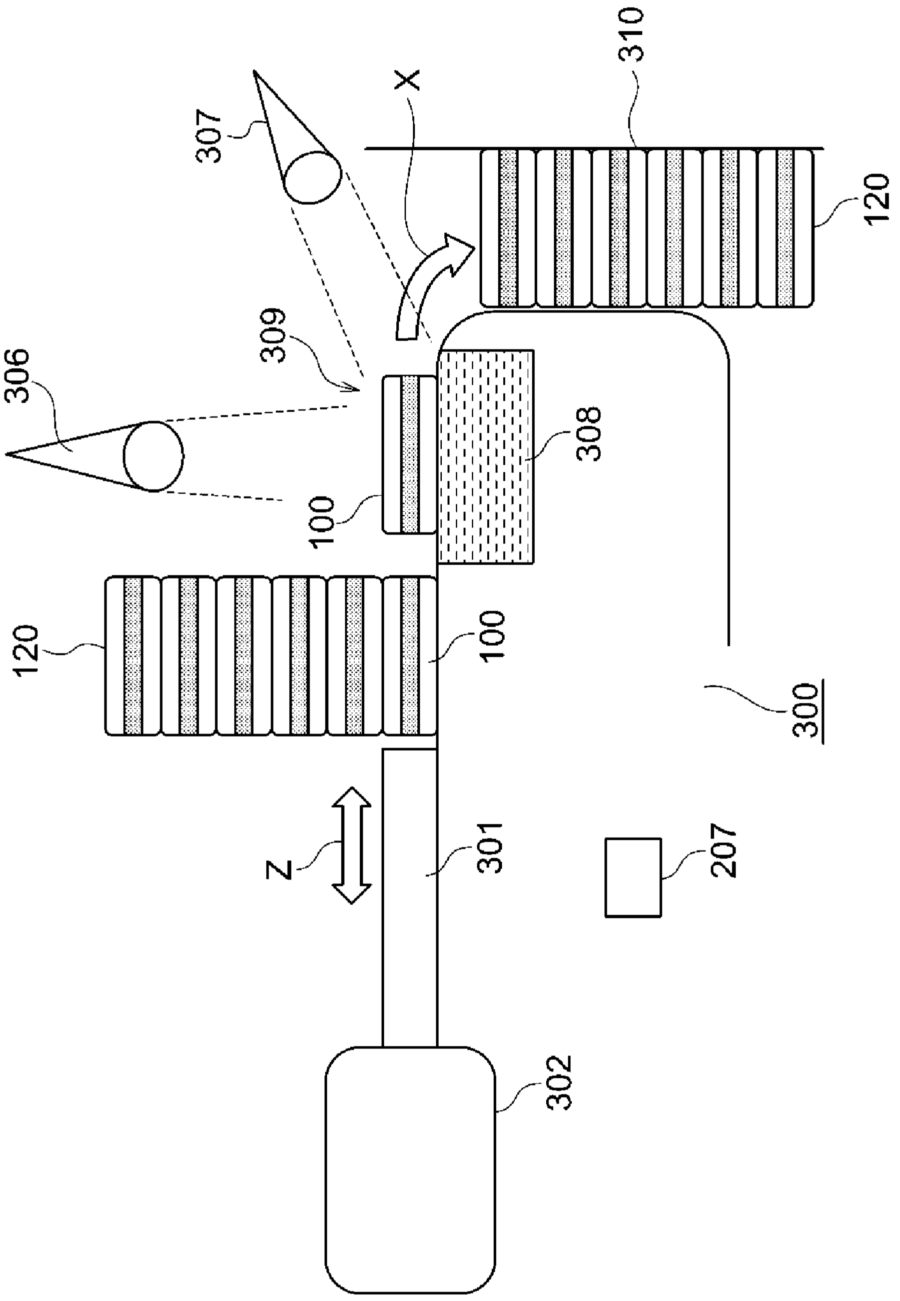
FIG. 22 is a diagram illustrating another example of an inspection device inspecting substitute gaming chips.

Another inspection device 300 inspecting the substitute gaming chips 120 will be described with reference to FIG. 22. The inspection device 300 includes: a face code reading device 306 that reads a face code M formed using UV emission ink or ink absorbing infrared rays disposed on the surface of the substitute gaming chip 120; an ID reading device 307 that reads the side ID 126 of the side face; an RFID reading device 308 that reads information of an RFID (not illustrated in the drawing) of the substitute gaming chip 120; and a control device 207. The control device 207 is configured to inspect a relation among the information of the side ID 126 acquired by the ID reading device 307, the information acquired from the face code reading device 306, and the information acquired from the RFID reading device 308. There is a correct database (not illustrated in the drawing), and the relation among the information is inspected by comparing a reading result with the database. This inspection is used for preventing the occurrence of a defect by detecting a print error in the face code M and the side ID 126 or for discrimination with a fake.

This example (FIG. 22) includes an extrusion device 302 that supplies substitute gaming chip 120 one at each time to a reading stage 309 by using an extruder 301 that in moved in the direction of an arrow Z by the extrusion device 302, and the stacked substitute gaming chips 120 are supplied from the extrusion device 302 to the reading stage 309. In this way, previous substitute gaming chip 120 for which the inspection is completed is extruded and falls in the direction of an arrow X, and the substitute gaming chip 120 that has fallen in the direction of the arrow X is held on a holding stage 310.

Figure 23:
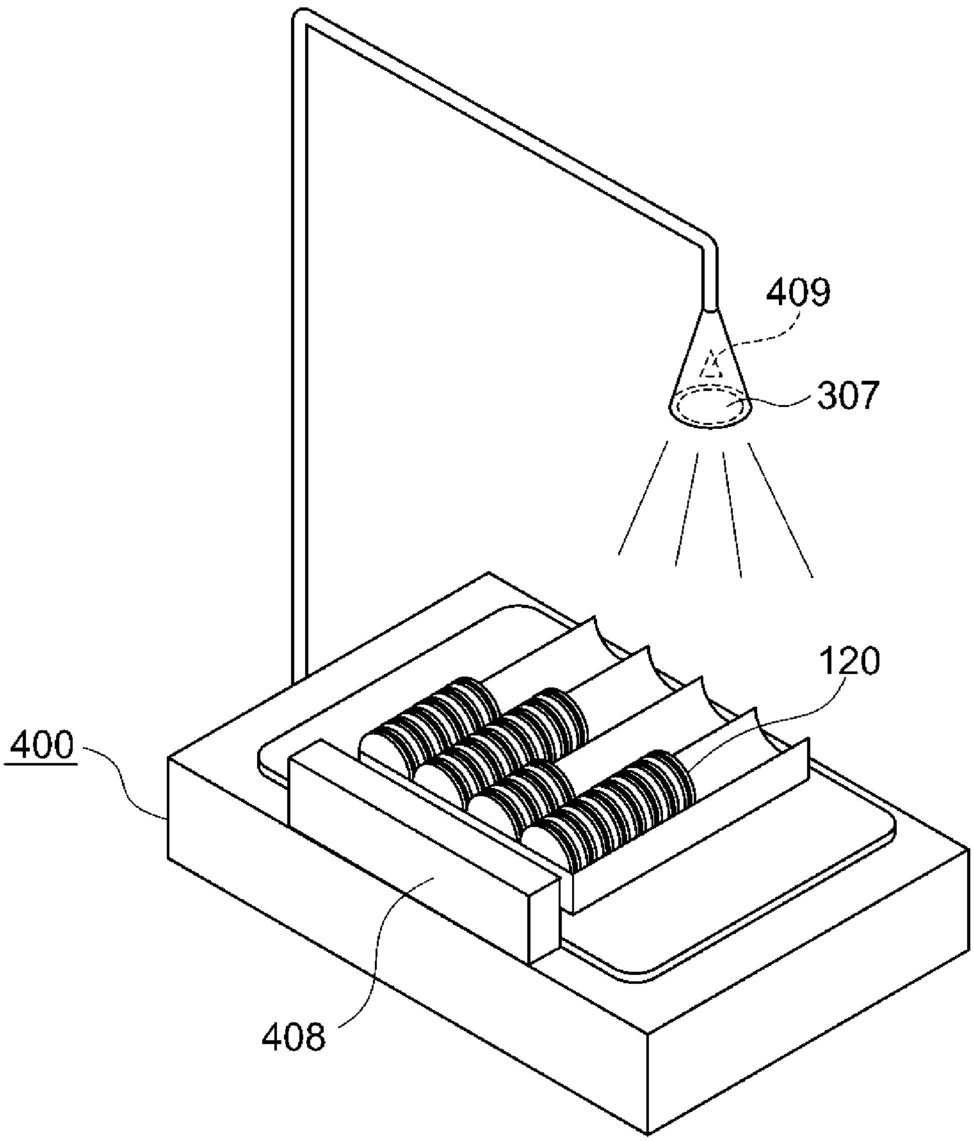
FIG. 23 is a diagram illustrating another example of an inspection device inspecting substitute gaming chips.

Further another inspection device 400 that inspects substitute gaming chips 120 will be described with reference to FIG. 23. The inspection device 400 includes: an RFID reading device 408 that reads information of an RFID (not illustrated in the drawing) of the substitute gaming chip 120; an ID reading device 307 that reads the side ID 126 of the side face; and a control device 207 and is configured to inspect a relation between the information of the side ID 126 acquired by the ID reading device 307 and the information acquired from the RFID reading device 408. There is a correct database (not illustrated in the drawing), and the relation among the information is inspected by comparing a reading result with the database. This inspection is used for preventing the occurrence of a defect by detecting a print error in the face code M and the side ID 126 or for discrimination with a fake.

The ID reading device 307 includes a single visible-light camera or a single infrared-ray camera corresponding to ink used for print the side ID 126 and is configured to include a camera 409 capable of performing switching among a plurality of functions of a visible-light camera and an infrared-ray camera corresponding to the printed ink. The visible-light camera can read the number and the color of the substitute gaming chip 120, and the infrared-ray camera can read the side ID 126 of the substitute gaming chip 120.

Figure 24:
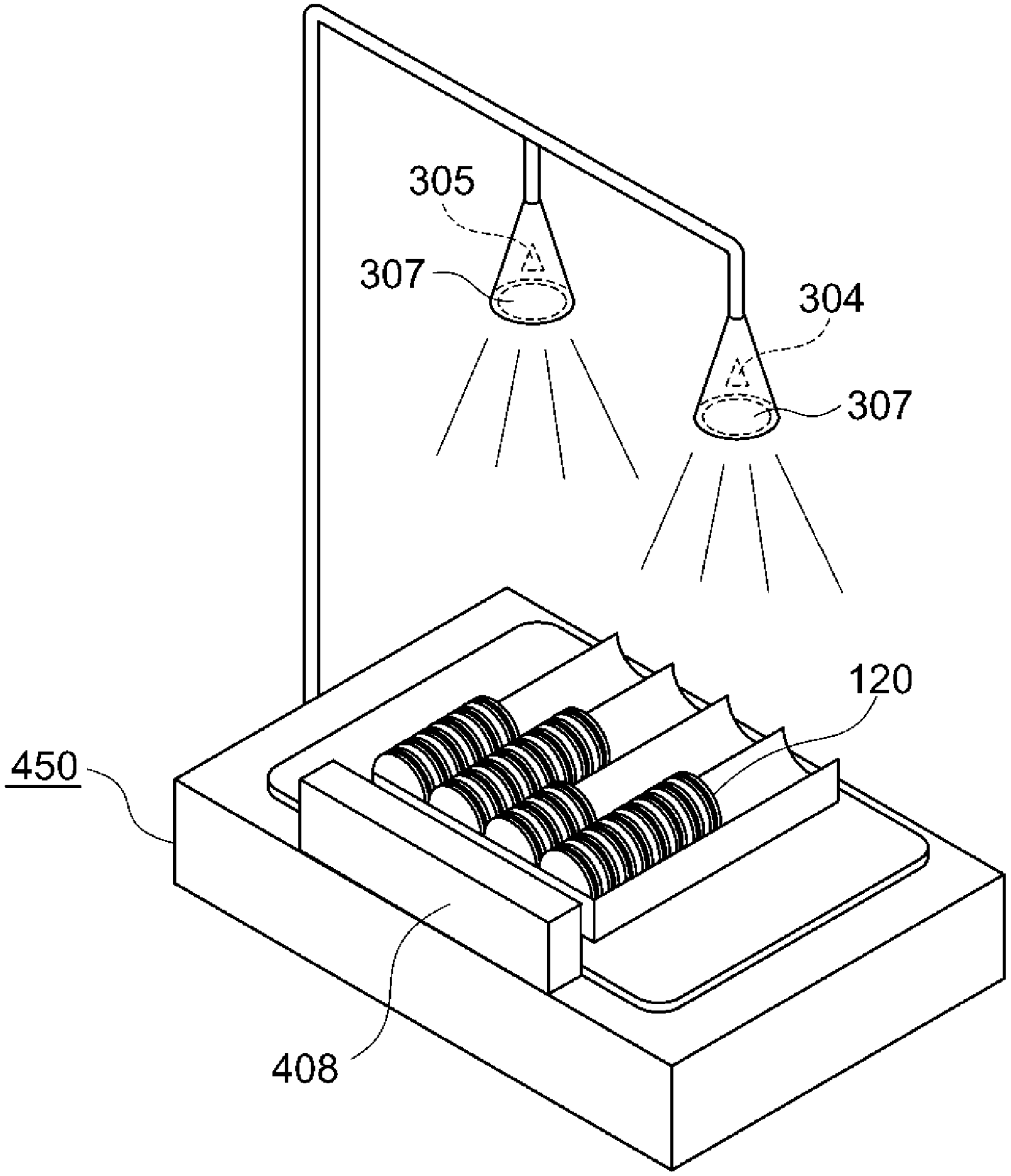
FIG. 24 is a diagram illustrating another example of an inspection device inspecting substitute gaming chips.

Still another inspection device 450 inspecting substitute gaming chips 120 will be described with reference to FIG. 24. A same reference numeral is assigned to a same component as that of the inspection device 400 (the description thereof will not be presented). An ID reading device 307 is configured to include a plurality of visible-light cameras 304 or infrared-ray cameras 305 corresponding to ink used for printing the side ID 126. The visible-light camera 304 can read the number and the color of the substitute gaming chip 120, and the infrared-ray camera 305 can read the side ID 126 of the substitute gaming chip 120.

A management control device 50 acquires a total amount of substitute gaming chips (substitute gaming chips) placed in a substitute gaming chip tray 17 after a settlement at the time of the end of a game through a substitute gaming chip determining device 52. A determination of "after a settlement" is when any one of the following 1) to 4) occurs: 1) when re-payment for winning chips 120 (winning chips) is completed; 2) when cards C used in this game are collected and are disposed in a disposal area or a disposal slot of the table; 3) when a predetermined button accompanying a card distributing device 3 functioning as a winning/losing result determining device is pressed; and 4) when a marker 43 representing winning/losing is returned to the original state In addition, in this embodiment, an image analyzing device 18 according to the second embodiment that records a state of process of a game played in the game table 4 as a video including game participants 6 and a dealer 5 through a plurality of camera devices 2 and performs an image analysis of the recorded video of the state of process of the game to analyze and perceive a total amount of the substitute gaming chips 120 in the substitute gaming chip tray 17 of a dealer 5 of the game table 4 and a measurement device 19 that performs an analysis and measurement by using information acquired by the image analyzing device 18 and determines the types and the numbers of the substitute gaming chips 120, and/or a mark reading device 205 that reads a face code formed using UV emission ink or ink absorbing infrared rays disposed on the surface of the substitute gaming chips 120 are combined, and an RFID reading device 308 that reads information of an RFID 125 of the substitute gaming chip 120 is combined as is necessary, whereby an inspection device as below including a management control device 50 can be configured.

That is, by combining the RFID reading device 308 reading the information of the RFID 125 of the substitute gaming chip 120 with the configuration described above, an inspection device including the ID reading device 53 reading the side ID 126 of the side face and the management control device 50 can be configured. In this inspection device, the management control device 50 inspects a relation between the information of the side ID 126 read by the ID reading device 53 and the information of the RFID 125 read by the RFID reading device 308 is inspected.

In addition, by combining the mark reading device 205 of the second embodiment that reads a face code formed using UV emission ink or an infrared-ray absorption ink arranged on the upper face or the lower face of the substitute gaming chip 120 with the configuration described above, an inspection device including the ID reading device 53 reading the side ID 126 of the side face and the management control device 50 can be configured. In this inspection device, the management control device 50 inspects a relation between the information of the side ID 126 read by the ID reading device 53 and the information of the face code read by the mark reading device 205.

In addition, by combining the mark reading device 205 of the second embodiment that reads a face code formed using UV emission ink or an infrared-ray absorption ink arranged on the surface of the substitute gaming chip 120 and an RFID reading device 308 reading information of the RFID 125 of the substitute gaming chip 120 with the configuration described above, an inspection device including the ID reading device 53 reading the side ID 126 of the side face and the management control device 50 can be configured. In this inspection device, the management control device 50 inspects a relation among the information of the side ID 126 read by the ID reading device 53, the information of the face code read by the mark reading device 205, and the information of the RFID 125 read by the RFID reading device 308.

As described above, in this embodiment, in the substitute gaming chip 120, side IDs 126 used for identifying each individual is attached to the outer faces of the white layer 122 or the thin-color layer.

The side IDs 126 are attached to at least three or more positions spaced apart in a rotation direction (circumferential direction) of the substitute gaming chip 120.

In addition, the side IDs 126 are printed using non-visible ink (for example, infrared-ray absorption ink or UV emission ink) that is not visible for visible light.

Furthermore, the side IDs 126 are disposed in a plurality of rows on the side faces of two layers of the white layers 122 or the thin-color layers.

In addition, at least one layer among the plurality of plastic layers configuring the coloring layer 121 and the white layers 122 is a layer containing metal powders (for example, a metal oxide of one or a plurality of metal oxides of zinc oxide and titanium oxide) used for increasing the weight in the layer.

In addition, the side IDs 126 may be printed using at least two or more types of ink among ink that is visible for visible light, an infrared-ray absorption ink, and UV ink. In such a case, the ID reading device 53 includes a plurality of cameras corresponding to each ink used for printing the side IDs 126 or includes a camera capable of performing switching among a plurality of imaging functions corresponding to each ink.

In addition, the substitute gaming chip 120 is manufactured as below. First, a coloring layer 121 and white layers 122 or thin-color layers having the coloring layer 121 interposed therebetween are thermos-compressed, whereby a stacked structure body including a plurality of plastic layers is formed. Then, drawing patterns are printed on at least the upper face or the lower face of the stacked structure body, whereby a substitute gaming chip original plate is generated. Then, punching processing is performed for the substitute gaming chip original plate by using a mold, whereby a plurality of substitute gaming chips having a predetermined shape are acquired. Here, in at least one layer among the plurality of plastic layers, a layer containing metal powders or a metal oxide used for increasing the weight is used.

On side faces of the substitute gaming chip 120 manufactured in this way, side IDs 126 used for identifying each individual are printed. At this time, the side IDs 126 may be printed through inkjet printing.

In addition, an RFID 125 is interposed between the layers of the stacked structure body, and the layers having the RFID 125 interposed therebetween are heated and welded when the layers are thermos-compressed, whereby the periphery of the RFID 125 is fixed to be adhering to the plastic layers.

In addition, the management system of table games according to this embodiment includes: a substitute gaming chip tray 17 that is disposed on a game table 4 and holds substitute gaming chips 120 for each type; a camera device 2 that images the substitute gaming chips 120 held in the substitute gaming chip tray 17; and a management control device 50 that specifies the types and the numbers of substitute gaming chips 120 held in the substitute gaming chip tray 17 and measures a total amount of the substitute gaming chips 120 disposed on the substitute gaming chip tray 17 by using a result of the imaging performed by the camera device 2.

The substitute gaming chip 120 is a stacked structure body in which the coloring layer 121 and the white layers 122 or the thin-color layers are stacked and has a stripe pattern on the side face in the stacking direction. The management control device 50 has a function of measuring the number of the coloring layers 121 or the white layers 122 or the thin-color layers of the substitute gaming chips placed by each game participant and determining the types and the amount of the substitute gaming chips based on the colors of the coloring layers 121.

The management control device 50 determines whether or not a real total amount of the substitute gaming chips 120 after the end of a game that is perceived on the substitute gaming chip tray 17 corresponds to an increase/decrease amount of the substitute gaming chips 120 calculated based on the amount of the substitute gaming chips 120 bet by all the players 6 and a result of winning/losing of the game.

In the management control device 50, the acquisition of the total amount of the substitute gaming chips 120 in the substitute gaming chip tray 17 after a settlement at the time of end of a game may be performed at one of: 1) time when re-payment for winning chips 120W for gaming ends; 2) time when cards used in the game are collected and are disposed in a disposal area of the table; 3) time when a predetermined button accompanying a card distributing device 3 functioning as a winning/losing result determining device is pressed; and 4) time when a marker representing winning/losing is returned to the original state.

The camera device 2 can also image bills place on the game table 4 for exchange of the substitute gaming chips 120, and the management control device 50 specifies the types and the numbers of substitute gaming chips 120 disposed on the substitute gaming chip tray 17 to be decreased according to exchange of the substitute gaming chips 120 disposed on the substitute gaming chip tray 17 and bills by using a result of the imaging of the bills and performs a comparison with a real total amount of the substitute gaming chips 120 disposed on the substitute gaming chip tray 17.

The management control device 50 determines through a comparison whether a total amount of substitute gaming chips 120 perceived in the substitute gaming chip tray 17 corresponds to an increase/decrease according to a paid amount of substitute gaming chips 120 corresponding to exchanged bills after the exchange of the bills and substitute gaming chips 120 is performed and an increase/decrease in substitute gaming chips 120 calculated based on the amount of substitute gaming chips 120 bet by all the players 6 and a result of winning/losing of the game.

The management control device 50 is a control device having an artificial intelligence-utilizing or deep-learning structure capable of acquiring information of the types and the numbers of substitute gaming chips 120 also in a state in which a part or one unit of the substitute gaming chips 120 is hidden when the types and the numbers of the substitute gaming chips 120 are measured and determined.

The side IDs 126 attached to the white layers 122 or the thin-color layers of the side face of the substitute gaming chip 120 at least at three or more positions spaced apart in a rotation direction (circumferential direction), the types and manufacturing information of substitute gaming chip 120 can be specified by reading the side ID 126 by using the ID reading device 53, and the specified information specified through measurement has a configuration that can be collated and managed with the database 51.

The side IDs 126 may be printed using two or more types of ink among ink (visible ink) that is visible for visible light, infrared-ray absorption ink, and UV emission ink. In such a case, the ID reading device 53 includes a plurality of types of cameras (a plurality of types of a visible-light camera, an infrared-ray camera, and an ultraviolet camera (a UV radiator and a visible-light camera, and the like) corresponding to ink used for printing the side IDs 126.

Alternatively, a camera capable of performing switching among a plurality of imaging functions (a visible-light camera, an infrared-ray camera, and an ultraviolet camera (a UV radiator and a visible-light camera, and the like) corresponding to each ink may be included.

In addition, a configuration may be employed in which substitute gaming chips 120 disposed on the game table 4 is imaged by using a plurality of camera devices 2*b*-1 and 2*b*-2 that are arranged at predetermined positions and have different heights.

In the embodiments described above, while the image analyzing device 12 and the control device 14 are devices having an artificial intelligence-utilizing or deep learning structure, more specifically, the image analyzing device 12 and the control device 14 may perform an image analysis and various control processes described above by using a scale-invariant feature transform (SIFT) algorithm, a convolutional neural network (CNN), deep learning, machine learning, or the like. Such technologies are technologies for recognizing a target included in an image by performing image recognition for a captured image, and particularly, in recent years, a target is recognized with high accuracy by using a deep learning technology having multi-layered neural network.

In this deep learning technology, generally, in an intermediate layer between an input layer and an output layer of a neural network, layers overlap each other over a plurality of stages, and accordingly, a target is recognized with high accuracy.

In these deep learning technologies, particularly, a convolutional neural network has attracted attention owing to high performance according to recognition of a target based on conventional image features.

In the convolutional neural network, a recognition target image to which labels are assigned is learned, and main target included in the recognition target image is recognized. In a case where a plurality of main targets are present in a learning image, a designation is made using an area rectangular, and learning is performed with a label assigned to an image corresponding to the designated area. In addition, in the convolutional neural network, a main target in an image and the position of the target can be determined.

The convolutional neural network will be further described. In a target recognition process, by performing an edge extracting process and the like for a recognition target image, candidate areas are extracted based on local features, and, after feature vectors are extracted by inputting the candidate areas to the convolutional neural network, classification is performed, and a candidate area having a classified highest certainty factor is acquired as a result of the recognition.

Here, the certainty factor is an amount representing a relative degree of highness of the similarity of a subject of an image learned together with an image area and a label relative to the similarity of the other classes.

In addition, devices having artificial intelligence-utilizing or deep-learning structures are disclosed in U.S. Pat. No. 9,361,577, US 2016-171336 A, US 2015-036920 A, JP 2016-110232 A, and the like, the content of which is incorporated herein by reference.

When a game ends, a dealer collects substitute gaming chips bet by players and pays substitute gaming chips to the players depending on a game result and bet contents (bet target and bet amount) of the respective players. It is preferable that the player and the dealer can clearly confirm whether or not this collection and payment (hereafter, the collection and the payment are collectively referred to as "liquidation") has been accurately performed, at that time when the liquidation is performed.

In the present embodiment, a system for displaying accuracy of liquidation at the time of liquidating the substitute gaming chips after an end of the game is provided.

A management system of substitute gaming chips according one aspect of the present embodiment includes substitute gaming chips having unique IDs that are individually identifiable, a game table for playing a game using the substitute gaming chips, a win/loss determining device that determines and displays a win/loss result of the game on the game table, a substitute gaming chip tray that holds substitute gaming chips used by a dealer on the game table, a dealer chip determining device that specifies types and the numbers of substitute gaming chips held in the substitute gaming chip tray using the unique IDs, a measuring device that measures positions, types, and the numbers of substitute gaming chips on the game table using a camera, and a management control device that has a function of grasping the positions, the types, and the numbers of substitute gaming chips on the game table and calculating a balance of a casino side on the game table using the win/loss result obtained from the win/loss determining device, wherein the management control device has a function of grasping and calculating an amount of substitute gaming chips on the game table to be collected by the casino side in the game on the basis of information obtained from the measuring device, the dealer chip determining device, and the win/loss determining device, and comparing the amount to be collected with a collection increase amount of substitute gaming chips collected by the dealer and put in the substitute gaming chip tray, obtained from the dealer chip determining device, comparing a payment amount of substitute gaming chips to be paid by the casino side with a decrease amount of substitute gaming chips put in the substitute gaming chip tray after the dealer takes out and pays the substitute gaming chips from the substitute gaming chip tray, and displaying consistency or inconsistency on a display device depending on a comparison result between the payment amount to be collected and the collection increase amount and a comparison result between the amount to be paid and the decrease amount.

The management control device may have a function of grasping and calculating an amount of substitute gaming chips to be collected and an amount of substitute gaming chips to be paid on the game table for each player position of the game table, comparing a collection amount or a payment amount with an increase amount or a decrease amount of substitute gaming chips put in the substitute gaming chip tray for each player position of the game table, and displaying consistency or inconsistency of the comparison result by the display device for each player position of the game table.

The display device may have a display function for each bet target of a banker or a player.

The display device may have a display function for each bet target of tie or pair.

The substitute gaming chip tray may be provided with a collecting portion for temporarily storing the substitute gaming chips collected by the dealer, and the management control device may have a function of comparing the amount to be collected with an increase amount due to the collection of the substitute gaming chips put in the collecting portion after being collected by the dealer and displaying consistency or inconsistency on the display device depending on a comparison result.

The measuring device may further have a function of measuring types and the numbers of substitute gaming chips held in the substitute gaming chip tray using a camera, and the management control device may have a function of comparing the number of substitute gaming chips for which the IDs are specified by the dealer chip determining device with the number of substitute gaming chips held in the substitute gaming chip tray measured by the measuring device and displaying consistency or inconsistency on the display device depending on a comparison result.

A management system of substitute gaming chips according another aspect of the present embodiment includes substitute gaming chips having unique IDs that are individually identifiable, a game table for playing a game using the substitute gaming chips, a win/loss determining device that determines and displays a win/loss result of the game on the game table, a substitute gaming chip tray that holds substitute gaming chips used by a dealer on the game table, a dealer chip determining device that specifies types and the numbers of substitute gaming chips held in the substitute gaming chip tray using the unique IDs, a measuring device that measures positions, types, and the numbers of substitute gaming chips on the game table using a camera, and a management control device that has a function of grasping the positions, the types, and the numbers of substitute gaming chips on the game table and calculating a balance of a casino side on the game table using the win/loss result obtained from the win/loss determining device, wherein the management control device has a function of grasping and calculating each of an amount to be collected and an amount to be paid by the casino side in the game on the basis of information obtained from the win/loss determining device, the dealer chip determining device, and the measuring device, comparing the amount to be collected or the amount to be paid by the casino side with an increase amount or a decrease amount of substitute gaming chips put in the substitute gaming chip tray, obtained from the dealer chip determining device after the dealer liquidates the game, and displaying consistency or inconsistency of each comparison result at the time of collecting or paying the substitute gaming chips on a display device.

The management control device may have a function of grasping amounts of substitute gaming chips to be collected and paid on the game table for each player position of the game table, and displaying consistency or inconsistency of the comparison result by the display device for each player position of the game table after the dealer liquidates the game for each player position of the game table.

The display device may have a display function for each bet target of a banker or a player.

The display device may have a display function for each bet target of tie or pair.

The management control device may have a function of grasping and calculating an amount of substitute gaming chips on the game table to be collected and an amount of substitute gaming chips on the game table to be paid by the casino side for each player position of the game table and displaying a position at which the substitute gaming chips are to be collected or paid on the display device for each player position of the game table.

The substitute gaming chip tray may be provided with a collecting portion for temporarily storing the substitute gaming chips collected by the dealer, and the management control device may have a function of comparing the amount to be collected with an increase amount due to the collection of the substitute gaming chips put in the substitute gaming chip tray after being collected by the dealer and displaying consistency or inconsistency on the display device depending on a comparison result.

The measuring device may further have a function of measuring types and the numbers of substitute gaming chips held in the substitute gaming chip tray using a camera, and the management control device may have a function of comparing the number of substitute gaming chips for which the IDs are specified by the dealer chip determining device with the number of substitute gaming chips held in the substitute gaming chip tray measured by the measuring device and displaying consistency or inconsistency on the display device depending on a comparison result.

The management control device may have a function of verifying that substitute gaming chips do not exist on the game table as a result of collecting the substitute gaming chips from the game table by the dealer by measuring substitute gaming chips to be collected from the game table by the dealer based on a measurement result obtained from the measuring device.

The management control device may have a function of verifying that the substitute gaming chips do not exist on the game table by measuring the substitute gaming chips to be collected from the game table by the dealer based on the measurement result obtained from the measuring device and collecting the substitute gaming chips from the game table by the dealer according to a predetermined rule.

The management control device may further have a function of performing verification by comparing an increase amount due to the collection of the substitute gaming chips put in the substitute gaming chip tray after being collected by the dealer, obtained from the dealer chip determining device, with a result of verifying that the substitute gaming chips do not exist on the game table as the result of collecting the substitute gaming chips from the game table by the dealer.

The management control device may have a function of specifying a game participant on the game table and associating a player position of the game table and the game participant at the time of participating in the game with each other.

A management system of substitute gaming chips according to still another aspect of the present invention includes: a substitute gaming chip tray for accommodating substitute gaming chips of a dealer and a lamp for displaying that an increase/decrease in the substitute gaming chips in the substitute gaming chip tray after an end of a game is accurate and/or inaccurate.

The management system may further include a bet determining device that determines a target and an amount bet by the player, a game result determining device that determines a result of the game, and a dealer chip determining device that determines an amount of substitute gaming chips held in the substitute gaming chip tray, wherein the lamp may be turned on or off based on determination results of the bet determining device, the game result determining device, and the dealer chip determining device.

Figure 25:
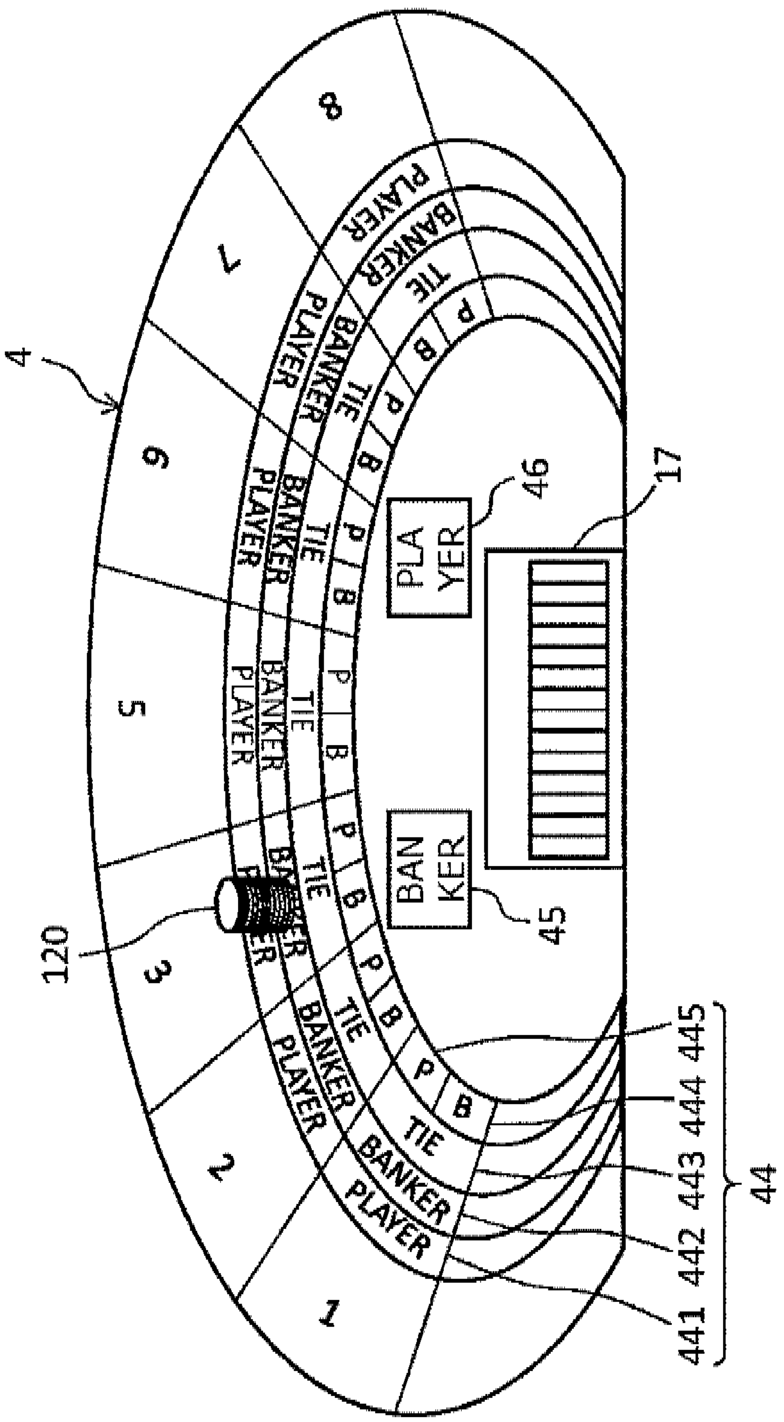
FIG. 25 is a plan view of a game table according to a fourth embodiment.
Figure 26:
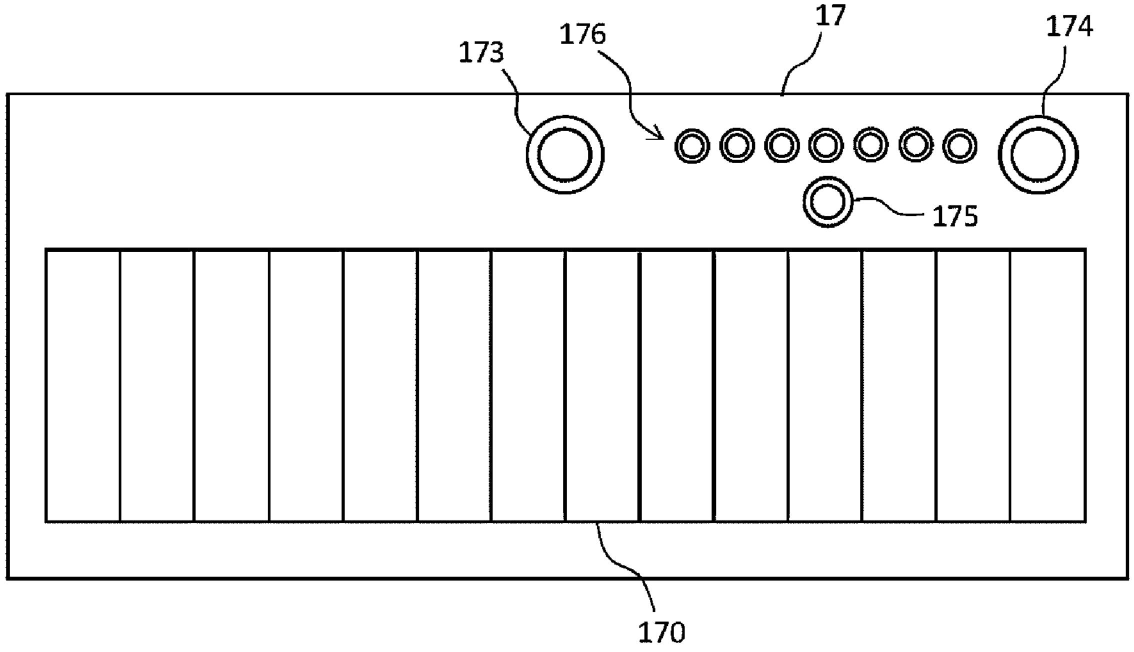
FIG. 26 is a plan view of a substitute gaming chip tray according to the fourth embodiment.
Figure 27:
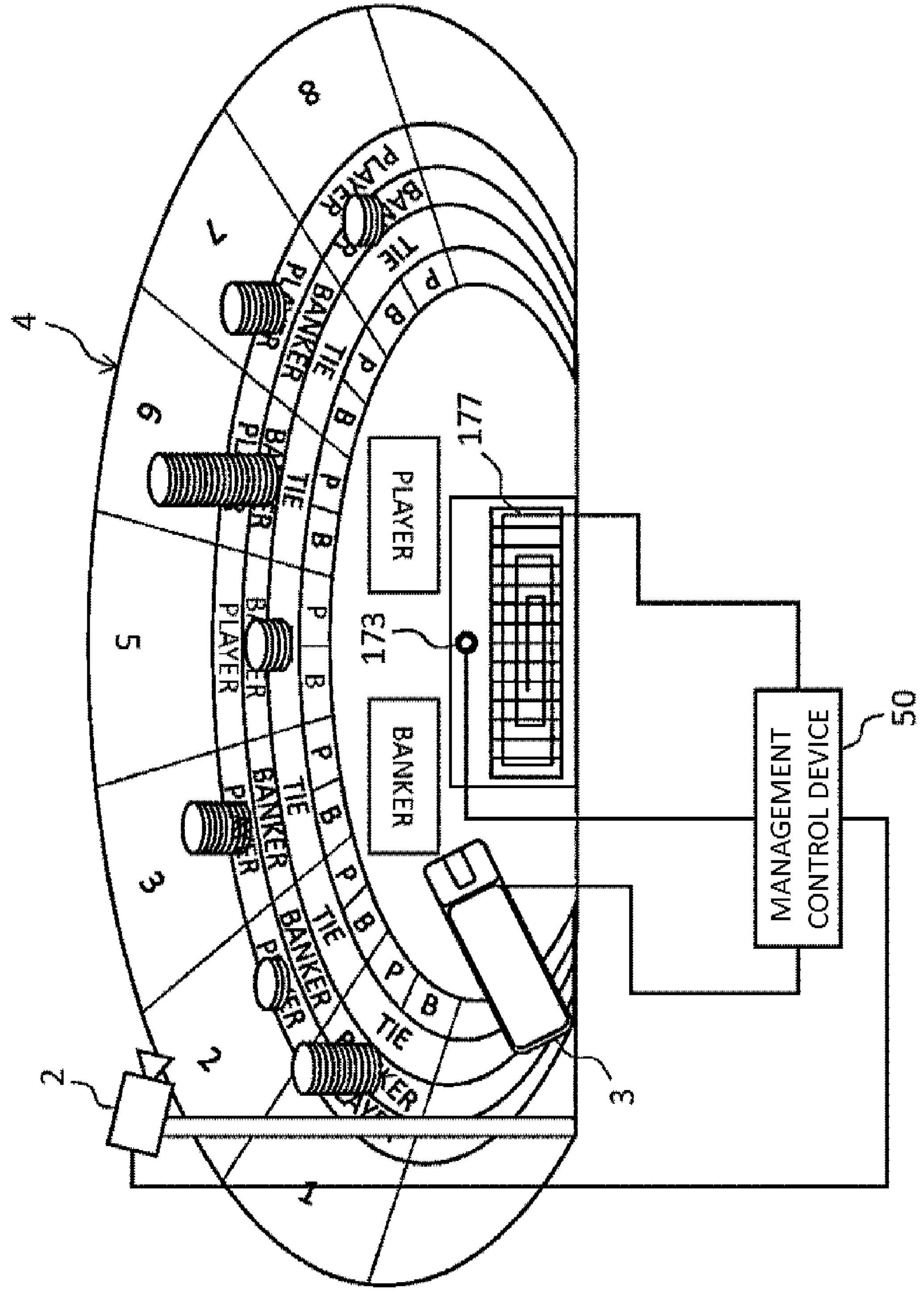
FIG. 27 is a view showing a configuration of a management system of substitute gaming chips according to the fourth embodiment.

FIG. 25 is a plan view of a game table according to the present embodiment. FIG. 26 is a plan view of a substitute gaming chip tray according to the present embodiment. FIG. 27 is a view showing an entire configuration of a management system of substitute gaming chips including the substitute gaming chip tray. In FIGS. 25 to 29, the same components as those of the first to third embodiments are denoted by the same reference numerals, and a detailed description thereof will be omitted.

A game table 4 is a table for a baccarat game, and is provided with a bet area 44 of each of seven players. The bet area 44 of each player includes each area of a player (PLAYER) 441, a banker (BANKER) 442, a tie (TIE) 443, a player pair (P) 444, and a banker pair (B) 445. Each player puts a bet amount of substitute gaming chips on a position corresponding to a target to be bet, thereby making a bet. The game table 4 is further provided with a player card area 45 for putting a drawn player card and a banker card area 46 for putting a drawn banker card.

In front of a dealer position of the game table 4, a substitute gaming chip tray 17 for the dealer to accommodate the substitute gaming chips is provided. At least a part of the substitute gaming chip tray 17 is buried in the game table 4.

Substitute gaming chips 120 used in the present embodiment have the same configuration as that of the substitute gaming chips of the first to third embodiments. That is, the substitute gaming chips 120 have marks, patterns, or colors that can specify their types (values) from each of surfaces and side surfaces thereof. In addition, radio frequency identifications (RFIDs) storing at least information that can specify types of substitute gaming chips 120 are embedded in the substitute gaming chips 120.

A camera device 2 is provided above the game table 4, and photographs the bet area 44. In the game table 4 according to the present embodiment, seven player positions ("1", "2", "3", "5", "6", "7", and "8" in FIG. 25) are provided, such that seven players can participate in a game. The camera device 2 photographs the bet areas 44 of all the player positions. It is not necessary for one camera device 2 to photograph the bet areas 44 of all the player positions, and all the bet areas 44 may be photographed in a shared manner by a plurality of camera devices 2.

A management control device 50 has all the functions described in the first to third embodiments. The management control device 50 specifies positions (bet targets), types, and the numbers of substitute gaming chips put in the bet areas based on an image photographed by the camera device 2. A device including the camera device 2 and the management control device 50 functions as a measuring device or a bet determining device for measuring positions, types, and the numbers of substitute gaming chips on the game table 4, and has the same configuration and function to those of the system including the camera device 2 and the image analyzing device 12 according to the first embodiment.

A card distributing device 3 also has the same configuration and function as those of the card distributing device of the first embodiment. That is, the card distributing device 3 determines a win/loss result of the game on the game table 4 and displays the determined win/loss result of the game on a result display lamp. In addition, the card distributing device 3 transmits the determined win/loss result of the game to the management control device 50. The management control device 50 has a function of grasping the positions, the types, and the numbers of substitute gaming chips on the game table 4 and calculating a balance of a casino side on the game table 4 using the win/loss result obtained from the card distributing device 3 as the win/loss determining device.

The management control device 50 grasps an amount of substitute gaming chips on the game table 4 to be collected and an amount of substitute gaming chips to be paid by the casino side in the game on the basis of a bet content determined based on the image obtained from the camera device 2 and information on the win/loss result obtained from the card distributing device 3, and compares the amount to be collected and the amount to be paid with an amount of substitute gaming chips actually increased in the substitute gaming chip tray 17 due to collection and an amount of substitute gaming chips actually decreased in the substitute gaming chip tray 17 due to payment, respectively.

In addition, the management control device 50 reads the RFIDs of the substitute gaming chips 120 accommodated in the substitute gaming chip tray 17 at predetermined time intervals, and stores information of the read RFIDs when a change occurs. The management control device 50 compares types and the numbers of substitute gaming chips at the past point in time with types and the numbers of substitute gaming chips at the present point in time based on the stored information, and calculates an increase/decrease amount of substitute gaming chips 120 in the substitute gaming chip tray 17.

As shown in FIG. 26, the substitute gaming chip tray 17 includes an accommodating portion 170 and display lamps 173 to 176. The accommodating portion 170 includes a plurality of columns, and each column has a configuration in which substitute gaming chips can be stacked and accommodated in a thickness direction. As shown in FIG. 27, an antenna 177 is disposed below the accommodating portion 170.

The display lamp 173 displays whether or not a balance between a collected amount and a paid amount is correct. The display lamp 174 displays whether or not a total amount of the collected amount is correct and whether or not a total amount of the paid amount is correct. The display lamp 175 displays whether or not a collection amount or a payment amount for substitute gaming chips bet on the pair is correct.

The display lamps 176 have a total of seven display lamps corresponding to the seven player positions. In the display lamp 177, in a collection step, display lamps corresponding to players (players losing the game) from which substitute gaming chips are to be collected are turned on, and in a payment step, display lamps corresponding to players (players winning the game) to which substitute gaming chips are to be paid are turned on. In FIG. 27, only the display lamp 173 is shown as a representative of the display lamps 173 to 176, and the other display lamps 174 to 176 are not shown.

The management control device 50 controls turn-on and turn-off of the display lamps 173 to 176 in order to display a result (consistency or inconsistency) of the comparison. The management system of substitute gaming chips according to the present embodiment grasps whether or not liquidation of the substitute gaming chips was correctly performed, in real time, using the display lamps 173 to 176. The management system of substitute gaming chips according to the present embodiment grasps whether or not a fraudulent substitute gaming chip is included in the collected substitute gaming chips, in real time.

The management control device 50 first specifies players that are participating in the game on the game table 4, and associates the players that are participating in the game with player position numbers ("1", "2", "3", "5", "6", "7", and "8") of the game table 4. Specifically, the management control device 50 can specify a player of each player position using a face authentication system or a members card.

When the game ends, the management control device 50 grasps substitute gaming chips (winning chips of the casino side) to be collected by the dealer for each player based on a game result, and turns on the display lamps 176 corresponding to player positions at which the substitute gaming chips are to be collected. Therefore, the dealer can grasp at which player position the substitute gaming chips are to be collected.

When the game ends, the dealer first collects all the substitute gaming chips to be collected from bet areas of players losing the game (collection step), and then pays substitute gaming chips to players winning the game (payment step). In the collection step, the dealer accommodates the substitute gaming chips collected from the bet areas of the game table 4 in the accommodating portion 170 of the substitute gaming chip tray 17 depending on the display lamps 176. Specifically, the dealer accommodates the collected substitute gaming chips in any one of two right columns, which are a collecting portion, in order of the player position numbers.

The management control device 50 determines that the substitute gaming chips are collected from the bet area 44 and an amount of collected substitute gaming chips based on the image obtained from the camera device 2 whenever the dealer collects substitute gaming chips from the bet area 44 and accommodates the collected substitute gaming chips in the collecting portion of the accommodating portion 170, and determines an amount (increase amount) of substitute gaming chips accommodated in the collecting portion based on a radio wave received by the antenna 177. The two right columns of fourteen columns as the accommodating portion 170 are used as the collecting portion in the present embodiment, but the collecting portion that accommodates the collected substitute gaming chips may be, for example, the transverse collection substitute gaming chip tray 171 shown in FIG. 13A or the collection substitute gaming chip tray 171 provided to be spaced apart from other columns, as shown in FIG. 13B.

Here, the management control device 50 calculates the increase amount by calculating a difference between total amounts of substitute gaming chips in the accommodating portion 170 before and after the collection using the RFIDs for each player. As described above, the management control device 50 reading information on types (values) of substitute gaming chips from the RFIDs of the substitute gaming chips held in the accommodating portion 170 to determine an amount of substitute gaming chips held in the accommodating portion 170 corresponds to a dealer chip determining device of the present invention.

The management control device 50 further determines whether or not an actual collection amount (image collection amount) determined based on the image obtained from the camera device 2, an increase amount (RFID collection amount) of substitute gaming chips in the collecting portion determined based on the radio wave received by the antenna 177, and a collection amount (calculated collection amount) calculated based on a game result and bet contents of the players losing the game are consistent with one another.

When all of the image collection amount, the RFID collection amount, and the calculated collection amount are consistent with one another, the management control device 50 turns off the corresponding display lamp 176. The dealer can confirm that the collection of the substitute gaming chips from the player has been accurately completed by confirming the turn-off of the display lamp 176.

On the other hand, when the image collection amount, the RFID collection amount, and the calculated collection amount are inconsistent with one another, the display lamp 176 is in a state in which it is turned on. Therefore, the dealer can know that the collection of the substitute gaming chips from the corresponding player has not been accurately completed or that there was the fraudulent substitute gaming chip in the collected substitute gaming chips.

When the collection of the substitute gaming chips as described above is completed for all the players losing the game, all the display lamps 176 are turned off. At this point in time, the management control device 50 again determines a total increase amount in the collecting portion by the RFIDs, compares the total increase amount with a total calculated collection amount calculated based on the game result and bet contents of all the players losing the game, and turns on the display lamp 174 when the total increase amount and the total calculated collection amount are consistent with each other.

Here, the management control device 50 calculates a total RFID collection amount by calculating a difference between the total amount of substitute gaming chips in the accommodating portion 170 calculated by the RFIDs before the start of the collection step after an end of the game and the total amount of substitute gaming chips in the accommodating portion 170 calculated by the RFIDs after completion of the collection. The dealer can grasp that the collection of the substitute gaming chips has been accurately completed by confirming that the display lamp 174 is turned on.

The management control device 50 determines whether or not all of the image collection amount determined based on the image obtained from the camera device 2, the RFID collection amount determined based on the radio wave received by the antenna 177, and the calculated collection amount calculated based on the game result and the bet contents of the players losing the game are consistent with one another in the above description, but the management control device 50 may also determine only whether or not the image collection amount and the calculated collection amount are consistent with each other or may determine only whether or not the RFID collection amount and the calculated collection amount are consistent with each other.

In addition, in the above description, the management control device 50 again determines the total increase amount by the RFIDs when it is determined that the collection of the substitute gaming chips has been completed for all the players losing the game, and turns on the display lamp 174 when the total increase amount is consistent with the total calculated collection amount. Instead of this, the management control device 50 may operate as follows. That is, the management control device 50 stores the read information of the RFIDs whenever there is a change in the substitute gaming chips 120 in the substitute gaming chip tray 17 as described above, but at the same time, the management control device 50 may determine the total increase amount whenever there is the change in the substitute gaming chips 120 in the substitute gaming chip tray 17, determine whether or not the total increase amount is consistent with the total calculated collection amount, and turn on the display lamp 174 at a point in time in which it is determined that the total increase amount is consistent with the total calculated collection amount.

Next, the dealer pays the substitute gaming chips to the players winning the game (payment step). When the collection of the substitute gaming chips from all the players losing the game is completed, the management control device 50 turns on the display lamps 176 corresponding to the players to which the substitute gaming chips are to be paid. The dealer can confirm the players to which the substitute gaming chips are to be paid by confirming the display lamps 176. In the payment step, the dealer takes out substitute gaming chips corresponding to a payment amount from the accommodating portion 170, and puts the taken-out substitute gaming chips in the bet areas of the corresponding players, thereby performing payment.

The management control device 50 determines that the substitute gaming chips are paid to the bet area 44 and an amount of paid substitute gaming chips based on the image obtained from the camera device 2 whenever the dealer takes out substitute gaming chips from the accommodating portion 170 and puts the taken-out substitute gaming chips on the game table 4, and determines an amount (decrease amount) of substitute gaming chips taken out from the accommodating portion 170 based on the radio wave received by the antenna 177. Here, the management control device 50 calculates the decrease amount by calculating a difference between total amounts of substitute gaming chips in the accommodating portion 170 before and after the payment, using the RFIDs, for each player.

The management control device 50 further determines whether or not an actual payment amount (image payment amount) determined based on the image obtained from the camera device 2, a decrease amount (RFID payment amount) of substitute gaming chips in the accommodating portion 170 determined based on the radio wave received by the antenna 177, and a payment amount (calculated payment amount) to the players winning the game, calculated based on a game result and bet contents are consistent with one another.

When all of the image payment amount, the RFID payment amount, and the calculated payment amount are consistent with one another, the management control device 50 turns off the corresponding display lamp 176. The dealer can confirm that the payment of the substitute gaming chips to the player has been accurately completed by confirming the turn-off of the display lamp 176.

On the other hand, when all of the image payment amount, the RFID payment amount, and the calculated payment amount are inconsistent with one another, the display lamp 176 is in a state in which it is turned on. Therefore, the dealer can know that the payment of the substitute gaming chips to the corresponding player has not been completed.

When the payment of the substitute gaming chips is completed for all the players winning the game, all the display lamps 176 are turned off. At this point in time, the management control device 50 again determines a total decrease amount in the accommodating portion 170 by the RFIDs, compares the total decrease amount with a total calculated payment amount calculated based on the game result and the bet contents, and turns on the display lamp 174 when the total decrease amount and the total calculated payment amount are consistent with each other.

Here, the management control device 50 calculates a total RFID payment amount by calculating a difference between the total amount of substitute gaming chips in the accommodating portion 170 calculated by the RFIDs before the start of the payment step after completion of the collection and the total amount of substitute gaming chips in the accommodating portion 170 calculated by the RFIDs after completion of the payment. The dealer can grasp that the payment of the substitute gaming chips has been accurately completed by confirming that the display lamp 174 is turned on.

The management control device 50 determines whether or not all of the image payment amount determined based on the image obtained from the camera device 2, the RFID payment amount determined based on the radio wave received by the antenna 177, and the calculated payment amount calculated based on the game result and the bet contents of the players winning the game are consistent with one another in the above description, but the management control device 50 may also determine only whether or not the image payment amount and the calculated payment amount are consistent with each other or may determine only whether or not the RFID payment amount and the calculated payment amount are consistent with each other.

In addition, in the above description, the management control device 50 again determines the total decrease amount by the RFIDs when it is determined that the payment of the substitute gaming chips has been completed for all the players winning the game, and turns on the display lamp 174 when the total decrease amount is consistent with the total calculated payment amount. Instead of this, the management control device 50 may operate as follows. That is, the management control device 50 stores the read information of the RFIDs whenever there is a change in the substitute gaming chips 120 in the substitute gaming chip tray 17 as described above, but at the same time, the management control device 50 may determine the total decrease amount whenever there is the change in the substitute gaming chips 120 in the substitute gaming chip tray 17, determine whether or not the total decrease amount is consistent with the total calculated payment amount, and turn on the display lamp 174 at a point in time in which it is determined that the total decrease amount is consistent with the total calculated payment amount.

When the liquidation (collection and payment) of the substitute gaming chips is completed as described above, the management control device 50 determines whether or not the total increase/decrease amount of substitute gaming chips in the accommodating portion 170 due to the liquidation is correct. In detail, the management control device 50 calculates a total increase/decrease amount (total RFID increase/decrease amount) due to the liquidation by calculating a difference between the total amount of substitute gaming chips in the accommodating portion 170 calculated by the RFIDs before the start of the liquidation after the end of the game and the total amount of substitute gaming chips in the accommodating portion 170 calculated by the RFIDs after an end of the liquidation.

Meanwhile, the management control device 50 calculates a total increase/decrease amount (total calculated increase/decrease amount) of the dealer due to the liquidation of the game based on the game result and the bet contents. The calculated increase/decrease amount can be calculated by subtracting the total calculated payment amount from the calculated collection amount. The management control device 50 compares the total RFID increase/decrease amount with the total calculated increase/decrease amount, and turns on the display lamp 174 when the total RFID increase/decrease amount and the total calculated increase/decrease amount are consistent with each other. The dealer can confirm that the liquidation of the substitute gaming chips in the game has been accurately completed and can start the next game, by confirming that the display lamp 174 is turned on.

Next, the display lamp 175 will be described. The display lamp 175 functions as a pair lamp. In the baccarat game, the player can also make a bet on “pair” in addition to “player”, “banker”, and “tie”. The “pair” is to make a bet on the fact that ranks of first distributed two cards are consistent with each other. Specifically, the “pair” includes “player pair” making a bet on consistency between ranks of two player cards and “bank pair” making a bet on consistency between ranks of two banker cards.

When any one of the players makes a bet on the pair and two ranks are consistent with each other (the pair is established), a predetermined multiple (for example, 11 times) of a bet amount is paid to a player making a bet on the pair regardless of a game result (“player”, “banker”, or “tie”). When the pair is not established, all the substitute gaming chips bet on the pair are collected. When the pair is not established at a point in time in which first four cards (two player cards and two banker cards) are drawn, substitute gaming chips bet on the pair at that point in time are collected.

When a bet is made on the pair, the management control device 50 calculates a total calculated collection amount (when the pair is not established) or a total calculated payment amount (when the pair is established) at the point in time in which the four cards are drawn, and compares the total calculated collection amount or the total calculated payment amount with a total increase/decrease amount of substitute gaming chips in the accommodating portion 170 calculated using the RFIDs before and after liquidation of the pair. It is to be noted that the management control device 50 can recognize whether or not substitute gaming chips are bet on the pair and an amount of bet substitute gaming chips, based on the image obtained from the camera device 2.

The management control device 50 turns on the display lamp 175 when the total calculated collection amount or the total calculated payment amount is consistent with the total increase/decrease amount of substitute gaming chips in the accommodating portion 170. The dealer can confirm that the liquidation of the pair has been accurately completed by confirming the turn-on of the display lamp 175.

Instead of the above, the management control device 50 may also turn on the display lamp 175 when the substitute gaming chips are bet on the pair. A timing in which the display lamp 175 is turned on may be a timing in which the bet is closed or a timing in which four cards are drawn. In this case, the dealer can recognize that it is necessary to perform the liquidation of the pair by confirming that the display lamp 175 is turned on.

In addition, in this case, the management control device 50 turns off the display lamp 175 when the total calculated collection amount or the total calculated payment amount is consistent with the total increase/decrease amount of substitute gaming chips in the accommodating portion 170. The dealer can confirm that the liquidation of the pair has been accurately completed by confirming the turn-off of the display lamp 175.

In the baccarat game, there are a case where the game ends by the draw of four cards (two player cards and two banker cards) depending on ranks of distributed cards and a case where a fifth card or the following sixth card is drawn. In the case where the game ends by the draw of the four cards, as soon as the liquidation of the pair ends, the general liquidation described above is performed. In the case where the fifth card or a following card is drawn, the liquidation of the pair is performed after a fourth card is drawn, the fifth card (or the following sixth card) is drawn when the liquidation of the pair is completed, and the general liquidation described above is performed when the game ends.

The display lamps 176 of the players losing the game from which the substitute gaming chips are to be collected are turned on and are turned off in order of the players from which the collection is completed in the collection step and the display lamps 176 of the players winning the game to which the substitute gaming chips are to be paid are turned on and are turned off in order of the players to which the payment is completed in the payment step in the abovementioned embodiment, but all the display lamps 176 may also be turned on with colors distinguished between the players winning the game and the players losing the game at a point in time in which the game ends.

For example, the display lamps 176 corresponding to the players losing the game may be turned on with a red color, and the display lamps 176 corresponding to the players winning the game may be turned on with a green color. In this case, it can be confirmed that the collection of the substitute gaming chips from all the players losing the game has been accurately completed by confirming that all the red display lamps 176 are turned off, and it can be confirmed that the payment of the substitute gaming chips to all the players winning the game has been accurately completed by confirming that all the green display lamps 176 are turned off.

Figure 28:
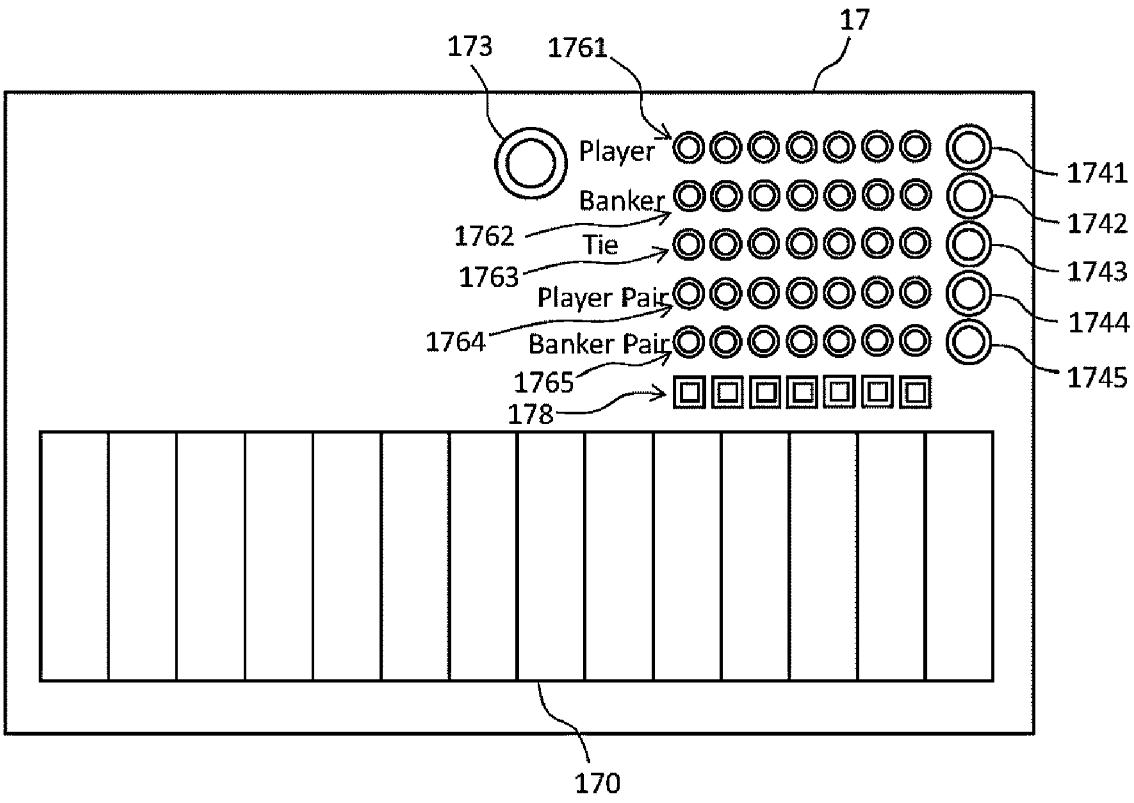
FIG. 28 is a plan view of a substitute gaming chip tray according to a modified example of the fourth embodiment.

FIG. 28 is a plan view of a substitute gaming chip tray according to a modified example. In a substitute gaming chip tray 17 of FIG. 28, the same components as those of the substitute gaming chip tray 17 of FIG. 26 are denoted by the same reference numerals, and a description thereof will be appropriately omitted. In the substitute gaming chip tray 17 according to the present modified example, display lamps 1761 to 1765 for each bet target (specifically, a display lamp 1761 displaying "player", a display lamp 1762 displaying "banker", a display lamp 1763 displaying "tie", a display lamp 1764 displaying "player pair", and a display lamp 1765 displaying "banker pair") and a display lamp 178 displaying that liquidation has been accurately completed are provided for each player position.

The display lamps 1761 to 1765 are turned on corresponding to bet targets (positions at which substitute gaming chips are put) of players, respectively, and turned off when liquidation is completed. The display lamp 178 is turned on when liquidation is accurately completed for each player.

The substitute gaming chip tray 17 according to the present modified example further includes display lamps 1741 to 1745 displaying that the liquidation has been accurately completed for each of the bet targets ("player", "banker", "tie", "player pair", and "banker pair"). Depending on a win/loss result of the game, any one of the "player", the "banker", and the "tie" becomes payment and the others become collection. In addition, when the player pair is established, the "player pair" becomes payment, and when the player pair is not established, the "player pair" becomes collection. Similarly, when the banker pair is established, the "banker pair" becomes payment, and when the banker pair is not established, the "banker pair" becomes collection. The display lamps 1741 to 1745 are turned on when liquidation (collection or payment) for each of the "player", the "banker", the "tie", the "player pair", and the "banker pair" is accurately completed.

Figure 29:
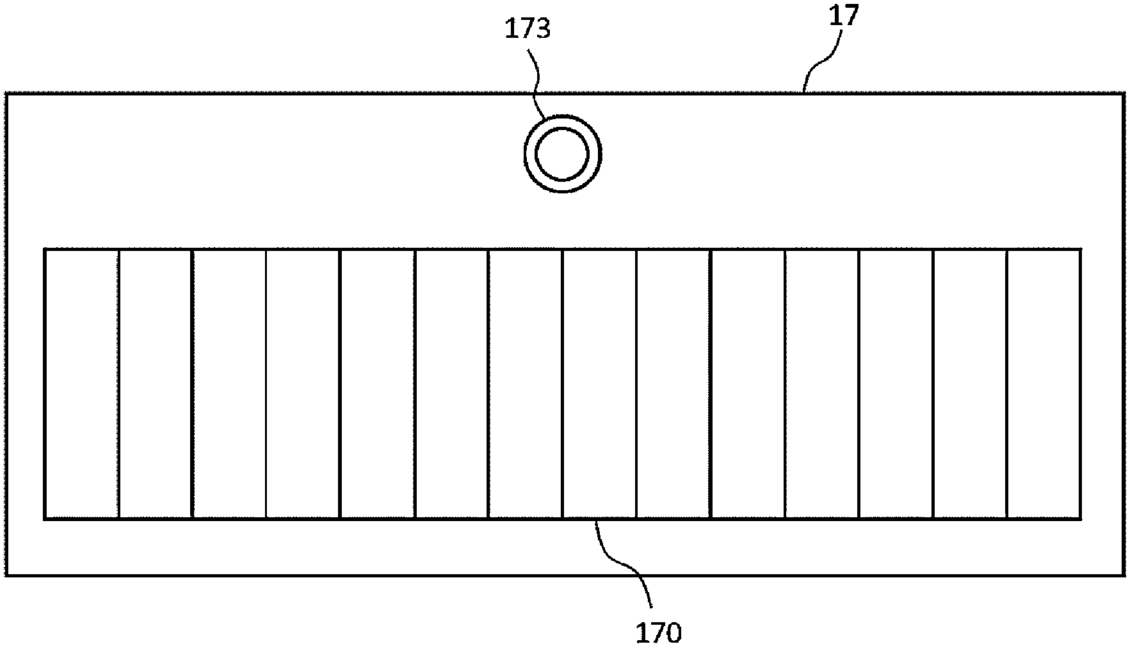
FIG. 29 is a plan view of a substitute gaming chip tray according to another modified example of the fourth embodiment.

FIG. 29 is a plan view of a substitute gaming chip tray 17 according to another modified example. As in the example of FIG. 29, only a display lamp 173 displaying whether or not a balance between a collected amount and a paid amount is correct may be provided in the substitute gaming chip tray 17.

Figure 30:
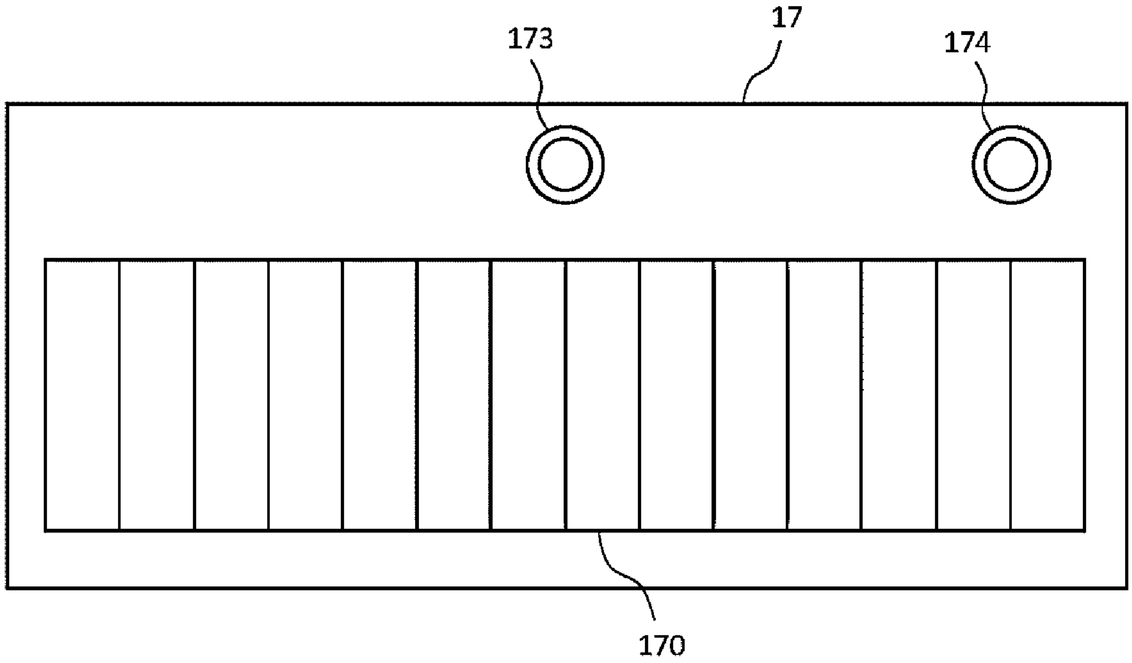
FIG. 30 is a plan view of a substitute gaming chip tray according to still another modified example of the fourth embodiment.

FIG. 30 is a plan view of a substitute gaming chip tray 17 according to still another modified example. As shown in FIG. 30, only a display lamp 173 displaying whether or not a balance between a collected amount and a paid amount is correct and a display lamp 174 displaying whether or not a total amount of the collected amount is correct and whether or not a total amount of the paid amount is correct may be provided in the substitute gaming chip tray 17.

The management control device 50 determines an amount of substitute gaming chips accommodated in the substitute gaming chip tray 17 by wirelessly reading the RFIDs using the RFIDs embedded in the substitute gaming chips and the antenna 177 embedded below the substitute gaming chip tray 17 in the abovementioned embodiment and the modified examples thereof, but an amount of substitute gaming chips accommodated in the substitute gaming chip tray 17 may also be determined by providing a camera device photographing substitute gaming chips accommodated in the substitute gaming chip tray 17 and performing image recognition on an image obtained from the camera device. In this case, the RFIDs may not be embedded in the substitute gaming chips.

In addition, an example in which a plurality of display lamps including the display lamp 173 are configured as physically realized lamps has been described in the abovementioned embodiment, but these lamps may be configured as images on a display device such as a liquid crystal panel.

In addition, in the abovementioned embodiment, the information on the types and the numbers of substitute gaming chips 120 accommodated in the substitute gaming chip tray 17 is determined by reading the RFIDs embedded in the substitute gaming chips 120. Instead of or in addition to this, the information on the types and the numbers of substitute gaming chips 120 accommodated in the substitute gaming chip tray 17 may be determined by providing a camera device photographing the substitute gaming chips 120 accommodated in the substitute gaming chip tray 17 and performing image recognition in the management control device 50. In this case, the camera device photographing the substitute gaming chips 120 accommodated in the substitute gaming chip tray 17 may be used as the camera device 2 described above or may be provided as a dedicated camera device.

In addition, when the image recognition is performed on the image obtained from the camera device in addition to the reading of the RFIDs, verification of the substitute gaming chips 120 may be performed by comparing the number of substitute gaming chips 120 obtained by the reading of the RFIDs with the number of substitute gaming chips determined by the image recognition. When the RFIDs are damaged in the substitute gaming chip tray 17 or a substitute gaming chip (fraudulent substitute gaming chip) that does not have the RFID is accommodated in the substitute gaming chip tray 17, the number of substitute gaming chips determined by the image recognition becomes larger than the number of substitute gaming chips determined by the reading of the RFID. Therefore, when such inconsistency occurs, the management control device 50 turns on the display lamp, such that the dealer can grasp that the fraudulent substitute gaming chip is included in the substitute gaming chip tray 17 through the display lamp.

In particular, by performing the reading of the RFIDs and the image recognition at predetermined time intervals to perform the comparison whenever the information is updated, when the inconsistency between the number of substitute gaming chips determined by the reading of the RFIDs and the number of substitute gaming chips determined by the image recognition occurs, it is seen that the inconsistency is due to substitute gaming chips 120 recently added to the substitute gaming chip tray 17, such that it is also possible to specify a player who had the fraudulent substitute gaming chip.

In addition, the management control device 50 may verify that substitute gaming chips do not exist on the game table as a result of collecting the corresponding substitute gaming chips from the game table by the dealer. In this case, specifically, the management control device 50 verifies that substitute gaming chips 120 corresponding to a calculated collection amount do not exist on the game table 4 based on the image obtained from the camera device 2 by determining on which bet target which type of and how many substitute gaming chips are bet based on the image obtained from the camera device 2 and further determining an amount (calculated collection amount) to be collected according to a game rule based on a game result in the card distributing device 3.

Further, the management control device 50 may verify that the collection has been accurately performed by comparing an amount (image collection amount) of substitute gaming chips that do not exist on the game table 4 with an amount of substitute gaming chips added to the substitute gaming chip tray 17 based on the image obtained from the camera device 2. In this case, the management control device 50 turns on the display lamp when the image collection amount and the amount of substitute gaming chips added to the substitute gaming chip tray 17 are inconsistent with each other as a result of the comparison.

In addition, the management control device 50 may verify that substitute gaming chips exist on the game table as a result of paying the corresponding substitute gaming chips to the game table by the dealer. In this case, specifically, the management control device 50 verifies that substitute gaming chips 120 corresponding to a calculated payment amount are added onto the game table 4 based on the image obtained from the camera device 2 by determining on which bet target which type of and how many substitute gaming chips are bet based on the image obtained from the camera device 2 and further determining an amount (calculated payment amount) to be paid according to a game rule based on a game result in the card distributing device 3.

Further, the management control device 50 may verify that the payment has been accurately performed by comparing an amount (image payment amount) of substitute gaming chips added onto the game table 4 with an amount of substitute gaming chips taken out from the substitute gaming chip tray 17 based on the image obtained from the camera device 2. In this case, the management control device 50 turns on the display lamp when the image payment amount and the amount of substitute gaming chips taken out from the substitute gaming chip tray 17 are inconsistent with each other as a result of the comparison.

As described above, the dealer basically collects the substitute gaming chips 120 bet by the players losing the game in order of player position numbers. The management control device 50 determines whether or not the dealer takes the substitute gaming chips in order according to this rule (in order of the player position numbers), and further determines whether or not an amount of substitute gaming chips that are sequentially collected is correct. In this case, the management control device 50 determines how far substitute gaming chips have been collected (up to which player position number substitute gaming chips have been collected), in addition to individual player positions and all player positions, and determines whether or not the substitute gaming chips 120 collected from the game table 4 have been certainly added to the substitute gaming chip tray 17 in each step depending on the determination. For example, when substitute gaming chips 120 of three places are collected, the management control device 50 determines whether or not the substitute gaming chips 120 of the three places have been certainly accommodated in the substitute gaming chip tray 17.

As described above, according to the present embodiment and the modified examples thereof, the display lamp 173 and the like for displaying that the increase/decrease in the substitute gaming chips in the substitute gaming chip tray 17 after the end of the game is accurate and/or inaccurate is provided, and it is thus possible to confirm whether or not the liquidation has been accurately performed, in real time at the time of performing the liquidation.

While various embodiments of the present invention have been described hereinabove, the abovementioned embodiments can be modified by those skilled in the art within the scope of the present invention, and devices according to the present embodiment may be appropriately modified as necessary in a game to which they are applied.

The present embodiment relates to a management system that manages a game played using substitute gaming chips in a game house.

The present embodiment corresponds to an application of the fourth embodiment, and the configuration of the management system described in the fourth embodiment can be adopted. In addition, as described above, since the first to third embodiments can be applied to the management system according to the fourth embodiment, the first to third embodiments can also be applied to in the present embodiment.

In the fourth embodiment, when the increase/decrease amount of substitute gaming chips in the substitute gaming chip tray 17 after the end of the game is inconsistent with an ideal increase/decrease amount calculated by calculation, it is possible to inform the dealer that the increase/decrease amount of substitute gaming chips in the substitute gaming chip tray 17 after the end of the game is inconsistent with the ideal increase/decrease amount by turning on the display lamp provided in the substitute gaming chip tray 17. When the dealer recognizes that the inconsistency exists through the display lamp, the dealer can interrupt the game and find a cause of fraud, thereby correcting the fraud or taking an action so that the fraud does not continue.

However, in the case where an amount of inconsistency is small, when the dealer interrupts the game whenever such a small amount of inconsistency occurs, a decrease amount of sales of a casino side due to the interruption of the game becomes larger than loss of the casino side due to the fraud that can be prevented by the interruption of the game.

Therefore, in the present embodiment, when an actual increase amount, decrease amount, or increase/decrease amount (actual liquidation amount) of substitute gaming chips in liquidation after the end of the game and a calculated increase amount, decrease amount, or increase/decrease amount (calculated liquidation amount) are inconsistent with each other, it is determined whether or not a loss amount due to the inconsistency is large, and it is possible to interrupt the game and take an action such as finding of the cause when the loss amount is large.

In the management system according to the present embodiment, the first to third configurations are adopted in the management system including the game table and the substitute gaming chips, and the configuration according to the fourth embodiment is adopted in the substitute gaming chip tray.

A repeated detailed description of each component is avoided, but components necessary for the management system according to the present embodiment are summarized as follows. The management system is configured as the fraud detection system according to the first embodiment, and includes substitute gaming chips, a game table 4, a card distributing device 3 as a win/loss determining device or a game determining unit, a measuring device 19, a substitute gaming chip tray 17, and a management control device 50. The management control device 50 functions as a dealer chip determining device.

The substitute gaming chips can be the substitute gaming chips described in the second or third embodiment, and can be individually identified by colors or marks of surfaces and side surfaces thereof or RFIDs embedded therein. On the game table 4, a game using the substitute gaming chips is played. On the game table 4, bet targets are divided depending on positions, and players put the substitute gaming chips in the corresponding division to bet the substitute gaming chips. The card distributing device 3 grasps which rank and suit of cards have been distributed to the game table 4 by reading contents of discharged cards, and determines a win/loss result of the game by applying information of the distributed cards to a game rule. The win/loss determining device or the game determining unit may be configured to include a camera device 2 that photographs cards on the game table 4 and an image analyzing device 12 that analyzes an image obtained from the camera device 2 to determine win/loss of the game.

The substitute gaming chip tray 17 is a tray for a dealer to hold the substitute gaming chips used on the game table 4, and is installed in the vicinity of a dealer position on the game table 4. In the present embodiment, a tray provided with various display lamps is used as the substitute gaming chip tray 17. The measuring device 19 is configured to include a camera device 2 that photographs the substitute gaming chips on the game table 4 and an image analyzing device 12 that specifies positions, types, and the numbers of substitute gaming chips on the game table 4 by analyzing the image obtained by the camera device 2. It is possible to determine on which bet target on the game table 4 how many substitute gaming chips are bet, by the measuring device 19, and the measuring device 19 becomes a bet determining unit.

The dealer chip determining device is configured to include a camera device 2 that photographs the substitute gaming chips accommodated in the substitute gaming chip tray 17 and an image analyzing device 12 that specifies types and the numbers of substitute gaming chips accommodated in the substitute gaming chip tray 17 by analyzing the image obtained from the camera device 2. In the management system, an actual liquidation amount of substitute gaming chips delivered between the dealer and the player is determined using the measuring device 19 or the dealer chip determining unit to constitute a liquidation determining unit. The management control device 50 performs the following controls based on information obtained from the measuring device, the dealer chip determining device, and the win/loss determining device or based on information obtained from the game determining unit, the bet determining unit, and the liquidation determining unit.

In the present embodiment, the management control device 50 determines whether or not the actual liquidation amount of substitute gaming chips is consistent with the calculated liquidation amount when the game ends and controls display lamps 173 to 176 and the like, depending on a determination result as in the fourth embodiment, but performs a first control by continuously transmitting signals to the display lamps 173 to 176 and the like, without stopping the game when the following conditions are not satisfied and performs a second control by transmitting signals for stopping the game to the display lamps 173 to 176 and the like, when the following conditions are satisfied, in the case where it is determined that the actual liquidation amount and the calculated liquidation amount are inconsistent with each other.

The conditions are as follows: (1) A difference (degree of inconsistency) between an actual liquidation amount and a calculated liquidation amount in a one-time game is larger than a first threshold value (for example, 500 dollars); (2) The total sum of differences (degrees of inconsistency) between actual liquidation amounts and calculated liquidation amounts in recent predetermined-time (for example, five-time) games is larger than a second threshold value (for example, 500 dollars); and (3) A difference (degree of inconsistency) between an actual liquidation amount and a calculated liquidation amount is continuously equal to or larger than a third threshold value (for example, 50 dollars) in recent predetermined-time (for example, three-time) games.

When there is a difference between the actual liquidation amount and the calculated liquidation amount, the management control device 50 performs the second control on the display lamps 173 to 176 and the like, in the case where any one of the above conditions (1) to (3) is satisfied, and performs the first control in other cases.

It is possible to determine an amount (image collection amount) collected from the game table and an amount (image payment amount) paid to the game table as the actual liquidation amount based on the image obtained from the camera device 2 (The image collection amount and the image payment amount are collectively referred to as an "image liquidation amount".), and it is possible to determine an amount (RFID collection amount) collected in a collecting portion of the substitute gaming chip tray 17 and an amount (RFID payment amount) paid from an accommodating portion 170 of the substitute gaming chip tray 17 as the actual liquidation amount based on a radio wave received by an antenna 177 (The RFID collection amount and the RFID payment amount are collectively referred to as an "RFID liquidation amount".).

That is, the management control device 50 may compare the image liquidation amount with the calculated liquidation amount, compare the RFID liquidation amount with the calculated liquidation amount, or compare each of the image liquidation amount and the RFID liquidation amount with the calculated liquidation amount in order to compare the actual liquidation amount with the calculated liquidation amount.

When the substitute gaming chip tray 17 shown in FIG. 26 is used as the substitute gaming chip tray, the management control device 50 controls the display lamp as follows. It should be noted that the display lamp is one form of a lighting device and the lighting device is one form of a display device. The management control device 50 turns on the display lamp 173 with a red color as the second control when the difference between the actual liquidation amount and the calculated liquidation amount satisfies any one of the conditions (1) to (3), turns on the display lamp 173 with a yellow color as the first control when the difference between the actual liquidation amount and the calculated liquidation amount does not satisfy any of the conditions (1) to (3), and turns on the display lamp 173 with a green color as a third control when there is no difference between the actual liquidation amount and the calculated liquidation amount, with respect to a balance between the collected amount and the paid amount (liquidation amount), that is, a final balance (that may be minus) obtained by summing up all collections and all payments.

Note that the display lamp 173 is configured to include light emitting diodes (LEDs) of three primary colors, and can express an arbitrary color. The management control device 50 realizes light emission of colors such as the red color, the yellow color, and the green color as described above by controlling emission intensity of each of the LEDs of the three primary colors in the display lamp 173.

The management control device 50 turns on the display lamp 174 with a red color as the second control when a difference between an actual collection amount and a calculated collection amount or a difference between an actual payment amount and a calculated payment amount satisfies any one of the conditions (1) to (3), turns on the display lamp 174 with a yellow color as the first control when the difference between the actual collection amount and the calculated collection amount or the difference between the actual payment amount and the calculated payment amount does not satisfy any of the conditions (1) to (3), and turns on the display lamp 174 with a green color as a third control when there is no difference between the actual collection amount and the calculated collection amount or difference between the actual payment amount and the calculated payment amount.

The display lamps 176 have a total of seven display lamps corresponding to the seven player positions. The management control device 50 turns on display lamps 176 corresponding to players (players losing the game) from which substitute gaming chips are to be collected with a white color in a collection step, and turns on display lamps 176 corresponding to players (player winning the game) to which substitute gaming chips are to be paid with a white color in a payment step.

The management control device 50 determines whether or not a difference between an actual collection amount and a calculated collection amount satisfies any one of the conditions (1) to (3) or whether there is no difference between the actual collection amount and the calculated collection amount, turns off the corresponding display lamp 176 in the case where there is no difference, changes a color of the display lamp 176 from a white color to a red color as the second control when the difference satisfies any one of the conditions (1) to (3) in the case where there is a difference, and changes a color of the display lamp 176 to a yellow color as the second control when the difference does not satisfy any one of the conditions (1) to (3) in the case where there is a difference, for each player in the collection step. Likewise, the management control device 50 determines whether or not a difference between an actual payment amount and a calculated payment amount satisfies any one of the conditions (1) to (3) or whether there is no difference between the actual payment amount and the calculated payment amount, turns off the corresponding display lamp 176 in the case where there is no difference, changes a color of the display lamp 176 from a white color to a red color as the second control when the difference satisfies any one of the conditions (1) to (3) in the case where there is a difference, and changes a color of the display lamp 176 to a yellow color as the second control when the difference does not satisfy any one of the conditions (1) to (3) in the case where there is a difference, for each player in the payment step.

By the control of the display lamp 176 by the management control device 50, the dealer can determine whether there is a small amount of fraud, there is a large amount of fraud, or there is no fraud, for each player.

Likewise, with respect to the display lamp 175, the management control device 50 determines whether a difference between a collection amount or a payment amount and a calculated collection amount or a calculated payment amount for substitute gaming chips bet on "pair" satisfies any one of the conditions (1) to (3) or whether there is no difference, turns on the display lamp 175 with a green color as a third control in the case where there is no difference, turns on the display lamp 175 with a yellow color as the first control in the case where the difference does not satisfy any of the conditions (1) to (3), and turns on the display lamp 175 with a red color as the second control in the case where the difference satisfies any one of the conditions (1) to (3).

Even in the case where the substitute gaming chip tray of FIG. 28 or 29 is adopted as the substitute gaming chip tray 17, various display lamps are turned on with different colors depending on whether or not there is a difference and whether or not the difference satisfies the conditions (1) to (3), as described above. In particular, when the present embodiment is applied to the substitute gaming chip tray 17 of FIG. 28, a display that can specify a player position or a player (game participant) that is a cause of the difference is made.

By the control by the management control device 50, the dealer can interrupt the game and investigate the fraud when the display lamp is turned on with a color corresponding to the second control (when the difference is large) and can continue the game while paying attention to the fraud when the display lamp is turned on with a color corresponding to the first control (when the difference is small), by confirming the colors of the various display lamps. Alternatively, the dealer can take an action so as to solve the difference at that place by performing simple investigation or confirmation within a range that does not hinder the progress of the game when the display lamp is turned on with a color corresponding to the first control. In addition, the present embodiment is also useful even in the case where accuracy of recognition of the substitute gaming chips in the image analyzing device 12, identification of the cards distributed by the card distributing device 3, detection of the substitute gaming chips by the RFIDs and the like, is low. That is, when the accuracy of the recognition of the substitute gaming chips in the image analyzing device 12, the identification of the cards distributed by the card distributing device 3, the detection of the substitute gaming chips by the RFIDs and the like, is low, an inaccurate result such as inconsistency (there is a difference) may be obtained even though amounts are originally consistent with each other (there is no difference), but when an amount of inaccurate result is small, it is possible to ignore the inaccurate result as described above and proceed with the game.

The management control device 50 includes a storage device to record all actual liquidation amounts and calculated liquidation amounts and also store determination result such as determination for at which display lamp which color is displayed, that is, whether there was a difference, whether a signal for stopping the game has been output due to the difference, and whether a signal for continuing the game has been output even though there is a difference. The dealer can grasp the fraud in real time by confirming the various display lamps provided in the substitute gaming chip tray 17, as described above, and a casino operator can grasp the fraud later by confirming data recorded in the storage device.

The management control device 50 can receive an input operation of a user (typically, a casino operator), and change various concrete values of the above conditions based on the input. That is, various parameters of the above conditions are variable.

The conditions (1) to (3) have been set as conditions for determining whether to perform the first control or the second control when there is a difference between the actual liquidation amount and the calculated liquidation amount in the abovementioned embodiment, but all of these conditions (1) to (3) are conditions relating to the difference. The management control device 50 may determine whether to perform the first control or the second control using other conditions, in addition to these conditions or instead of these conditions. For example, in the case where there is a difference between the actual liquidation amount and the calculated liquidation amount, the second control may be performed when a bet amount is equal to or larger than a fourth threshold value, and the first control may be performed when the bet amount is smaller than the fourth threshold value. In addition, the management control device 50 may output a signal for stopping the game by performing the second control when a ratio of an amount of inconsistency to the bet amount is larger than a predetermined ratio (predetermined threshold value) and continuously output a signal without stopping the game by performing the first control when the ratio of the amount of inconsistency to the bet amount is equal to or smaller than the predetermined ratio (predetermined threshold value), in the case where there is a difference between the actual liquidation amount and the calculated liquidation amount.

The lighting device (display lamp) is used as the display device and the management control device 50 performs a control to select the color with which the lighting device is turned on as the first to third controls in the abovementioned embodiment, but a control target of the first to third controls is not limited thereto. For example, in the case where a display panel including a two-dimensional array such as a liquid crystal panel is provided as a display device at the substitute gaming chip tray 17 or other places, whether or not there is a difference and whether or not the difference satisfies any one of the conditions (1) to (3) when there is a difference may be displayed as text information or image information on the display panel. Further, the management control device 50 may display whether the difference satisfies any one of the conditions (1) to (3), on the display panel.

Alternatively, the management control device 50 may control the card distributing device 3. In this case, the card distributing device 3 has a stopper restricting the discharge of the card, and the management control device 50 may operate the stopper at a timing at which the game ends to prohibit the discharge of the card, release the stopper as the first control and the third control to permit the discharge of the card, and operate the stopper as the second control so as to maintain prohibition of the discharge of the card. Alternatively, a control target of the management control device 50 may be an output device that appeals to other senses of a person (dealer), such as a sound output device or a vibration output device.

In addition, the management control device 50 determines whether to perform the first control or the second control based on the conditions (1) to (3) relating to the difference in the abovementioned embodiment, but these conditions (1) to (3) may be applied only when the casino side suffers a loss. For example, only when the difference in a one-time game exceeds the first threshold value but the loss on the casino side occurs due to the difference, it may be determined that the condition of (1) is satisfied, and when the difference causes a loss of the player, it may be determined that the condition is not satisfied.

In addition, the management system evaluates the difference between the actual liquidation amount and the calculated liquidation amount with respect to each of the collection and payment or with the balance by the collection and the payment in the abovementioned embodiment, but the management system may perform a control by evaluating only a difference of any one of the collection and the payment.

In addition, the management control device 50 evaluates the difference between the actual liquidation amount and the calculated liquidation amount and outputs each of a signal indicating that an amount of inconsistency is small and a signal indicating that an amount of inconsistency is large in the abovementioned embodiment, but the management control device 50 may output a signal indicating an amount of inconsistency when there is a difference between the actual liquidation amount and the calculated liquidation amount. In this case, the display device may receive a signal indicating the amount of inconsistency and display the amount of inconsistency (difference amount). The dealer may determine whether to stop or continue the game by viewing the amount of inconsistency displayed on the display device.

In addition, the management control device 50 may transmit a signal indicating that there is a small amount of inconsistency, a signal indicating that there is a large amount of inconsistency, a signal indicating that there is no inconsistency, and/or a signal indicating an amount of inconsistency to a backyard, when there is a difference between the actual liquidation amount and the calculated liquidation amount. In addition, a display device may be installed in the backyard, and contents of the signal received from the management control device 50 may be displayed on the display device.

In a substitute gaming chip according to one aspect of the present invention, at least a colored layer and a white layer or a thin color layer are stacked to configure a stack structure including a plurality of plastic layers, stripe patterns in a stack direction are formed on a side surface, a type of substitute gaming chip can be specified by the colored layer, printed layers indicating a type of substitute gaming chip are provided on upper and lower surfaces of the stack structure, and the respective layers are thermo-compression-bonded to each other to form a layer structure.

In the substitute gaming chip, side IDs that can be individually identified may be attached to an outer side surface of the white layer or the thin color layer.

In the substitute gaming chip, the side IDs may be attached to at least three or more places at intervals in a rotation direction on a side surface of the substitute gaming chip.

In the substitute gaming chip, the side ID may be printed by ink that is not viewed by visible ray.

In the substitute gaming chip, the side ID may be printed by ink absorbing infrared ray.

In the substitute gaming chip, the side IDs may be provided in a plurality of rows on each of outer side surfaces of two layers of the white layer or the thin color layer.

In the substitute gaming chip, R processing may be performed on outer corners of upper and lower surfaces of the printed layer.

In the substitute gaming chip, at least one layer of the plurality of plastic layers may be a heavy layer containing metal powders for weight increase in the layer.

In the substitute gaming chip, the metal powder for weight increase may be a metal oxide, and may be one or a plurality of metal oxides of a zinc oxide and a titanium oxide in particular.

In the substitute gaming chip, white layers or thin color layers may be provided on both sides with the colored layer interposed therebetween, and thicknesses of upper and lower layers of the white layers or the thin color layers provided with the colored layer interposed therebetween may be different from each other.

In the substitute gaming chip, an RFID may be closely adhered and fixed between plastic layers forming any one of the colored layer, the white layer, and the thin color layer.

In the substitute gaming chip, the printed layer may be provided with a face code by UV emitting ink or ink absorbing infrared ray.

In the substitute gaming chip, the side ID may be attached to a side surface and the RFID may be embedded, the printed layer may be provided with a face code by UV emitting ink or ink absorbing infrared ray, and information of the side ID attached to the side surface and information of the RFID may be associated with each other, the information of the side ID and information of the face code may be associated with each other, or the information of the side ID, the information of the RFID, and the information of the face code may be associated with one another.

An inspection apparatus according to one aspect of the present invention is an inspection apparatus that inspects the substitute gaming chip, and includes an RFID reading device that reads information of an RFID of the substitute gaming chip, an ID reading device that reads a side ID on a side surface, and a control device, wherein the control device inspects association between information of the side ID obtained by the ID reading device and the information obtained from the RFID reading device.

An inspection apparatus according to another aspect of the present invention is an inspection apparatus that inspects the substitute gaming chip, and includes a face code reading device that reads a face code by UV emitting ink provided on a surface of the substitute gaming chip or ink absorbing infrared ray, an ID reading device that reads a side ID on a side surface, and a control device, wherein the control device inspects association between information of the side ID obtained by the ID reading device and information obtained from the face code reading device.

An inspection apparatus according to still another aspect of the present invention is an inspection apparatus that inspects the substitute gaming chip, and includes a face code reading device that reads a face code by UV emitting ink provided on a surface of the substitute gaming chip or ink absorbing infrared ray, an ID reading device that reads a side ID on a side surface, an RFID reading device that reads information of an RFID of the substitute gaming chip, and a control device, wherein the control device inspects association among information of the side ID obtained by the ID reading device, information obtained from the face code reading device, and the information obtained from the RFID reading device.

In the inspection apparatus, the side ID may be printed by at least any one of ink viewed by visible ray and ink absorbing infrared ray or by a combination thereof, and the ID reading device may include a single visible ray camera or infrared ray camera or a plurality of visible ray cameras or infrared ray cameras corresponding to the printed ink of the side ID or include a camera that can switch a plurality of functions of a visible ray camera or an infrared ray camera corresponding to the ink.

The inspection apparatus may further include a determining device of a type of substitute gaming chip that determines a color of a stripe pattern in a stack direction of a side surface of the substitute gaming chip by photographing the side surface of the substitute gaming chip or a printing inspecting device that reads printing of a printed layer provided in the substitute gaming chip to inspect a relationship between the type of substitute gaming chip and a printed content of the printed layer.

In a method of manufacturing a substitute gaming chip according to one aspect of the present invention, at least a colored layer and a white layer or a thin color layer are stacked to form a stack structure including a plurality of plastic layers, a printed layer on which patterns are printed is provided on at least an upper surface or a lower surface of the stack structure of the plurality of plastic layers, the respective layers of the stack structure and the printed layer are heated and compressed to be thermally welded to each other, thereby creating a substitute gaming chip original plate, the substitute gaming chip original plate is punched by a mold to obtain a plurality of substitute gaming chips having a predetermined shape, and R processing is performed on upper and lower corners of the substitute gaming chips with the mold at the time of the punching the substitute gaming chip original plate.

In a method of manufacturing a substitute gaming chip according to another aspect of the present invention, at least an intermediate color layer is provided, white layers or thin color layers are stacked on and beneath the intermediate colored layer to form a stack structure including a plurality of plastic layers, a layer containing metal powders or a metal oxide for weight increase in the layer is used as at least one layer of the plurality of plastic layers, a printed layer on which patterns are printed is provided on at least an upper surface or a lower surface of the stack structure, the respective layers of the stack structure and the printed layer are heated and compressed to be thermally welded to each other, thereby creating a substitute gaming chip original plate, and the substitute gaming chip original plate is punched by a mold to obtain a plurality of substitute gaming chips having a predetermined shape.

In the method of manufacturing a substitute gaming chip, a side ID may be attached by inkjet printing.

In the method of manufacturing a substitute gaming chip, an RFID may be interposed between the layers of the stack structure, and the respective layers between which the RFID is interposed may be thermally welded to each other at the time of heating and compressing the respective layers to closely adhere the surrounding of the RFID to the plastic layer.

In the method of manufacturing a substitute gaming chip, any one or more of a face code, a security mark, and an optical variable device (OVD) may be printed on the printed layer.

A management system of a table game according to one aspect of the present invention includes a card distributing device that determines and displays a win/loss result of each game on a game table, a camera device that photographs and records substitute gaming chips put on the game table using a camera, and a management control device that specifies and stores positions, types, and the numbers of substitute gaming chips put on the game table by game participants using an image-capturing result of the camera device in each game, wherein the substitute gaming chip is a structure having at least a colored layer and a white layer or a thin color layer in an appearance so as to form stripe patterns in an axial direction on a side surface thereof and has a configuration in which a type thereof can be specified by the colored layer, and the management control device has a calculation function of calculating a balance of a casino side on the game table for each game using the win/loss result obtained from the card distributing device and an image-capturing result of the positions, the types, and the numbers of substitute gaming chips put by the game participants.

In the management system of a table game, the management control device may have a function of measuring the numbers of colored layers or white layers or thin color layers of substitute gaming chips put by the respective game participants and determining types or amounts of substitute gaming chips depending on colors of the colored layers.

In the management system of a table game, the management control device captures an image of the positions, the types, and the numbers of substitute gaming chips put by the game participants in each game, but the image-capturing is performed when it is detected that the card distributing device draws a first card, before or after the card distributing device draws the first card, or after the management control device recognizes a betting end sign of a dealer.

A management system of a table game according to another aspect of the present invention includes a substitute gaming chip tray that is provided on a game table and holds substitute gaming chips for each type of substitute gaming chips, a camera device that captures an image of substitute gaming chips put on the substitute gaming chip tray using a camera, and a management control device that specifies and stores types and the numbers of substitute gaming chips on the substitute gaming chip tray using an image-capturing result of the camera device, wherein the substitute gaming chip is a structure having at least a colored layer and a white layer or a thin color layer in an appearance so as to form stripe patterns in an axial direction on a side surface thereof and has a configuration in which a type thereof can be specified by the colored layer, and the management control device can measure a total amount of substitute gaming chips on the substitute gaming chip tray using an image-capturing result of the types and the numbers of substitute gaming chips on the substitute gaming chip tray.

In the management system of a table game, the management control device may have a function of measuring the numbers of colored layers or white layers or thin color layers of substitute gaming chips put by the respective game participants and determining types or amounts of substitute gaming chips depending on colors of the colored layers.

In the management system of a table game, the management control device can determine a difference by which an actual total amount of substitute gaming chips after an end of the game grasped in the substitute gaming chip tray of a dealer of the game table does not correspond to an increase/decrease amount of substitute gaming chips calculated from an amount of substitute gaming chips bet by all players and a win/loss result of the game.

In the management system of a table game, a total amount of substitute gaming chips in the substitute gaming chip tray after liquidation at the end of the game through the management control device may be obtained: 1) when redemption for winning chips ends, 2) when cards used in the game are collected and discarded in a discard area of the table, 3) when a predetermined button annexed to a win/loss result determining device is pressed, or 4) when a marker indicating win/loss returns.

In the management system of a table game, the camera device may be capable of capturing an image of paper money for exchanging the substitute gaming chips, and the management control device may specify types and the numbers of substitute gaming chips on the substitute gaming chip tray to be reduced by exchange between the substitute gaming chips on the substitute gaming chip tray and the paper money using an image-capturing result of the paper money and compare and measure the specified types and numbers of substitute gaming chips with an actual total amount of substitute gaming chips on the substitute gaming chip tray.

In the management system of a table game, the management control device may compare and determine whether or not a total amount of substitute gaming chips grasped in the substitute gaming chip tray of the dealer of the game table corresponds to an increase/decrease depending on a payment amount of substitute gaming chips corresponding to exchanged bills after exchange between the bills and the substitute gaming chips is performed and an increase/decrease of substitute gaming chips calculated from an amount of substitute gaming chips bet by all players and a win/loss result of the game.

In the management system of a table game, the management control device may be an artificial intelligence utilization type or a deep learning structure capable of obtaining information on types and the number of substitute gaming chips even in a state in which a part or the entirety of one substitute gaming chip is hidden by a blind spot of the camera at the time of measuring and determining the types and the numbers of substitute gaming chips.

In the management system of a table game, the substitute gaming chip may have at least three side IDs attached at intervals in a rotation direction to the white layer or the thin color layer of the side surface thereof, a type and manufacturing information of substitute gaming chip may be specified by reading the side IDs by an ID reading device, and the measured and specified information may be collated and managed with a predetermined database.

In the management system of a table game, the side ID may be printed by at least any one of ink viewed by visible ray and ink absorbing infrared ray or by both of them, and the ID reading device may include a plurality of visible ray cameras or infrared ray cameras corresponding to the printed ink of the side ID or include a camera that can switch a plurality of functions of a visible ray camera or an infrared ray camera corresponding to the ink.

In the management system of a table game, the camera device that photographs and records the substitute gaming chips put on the game table may photograph the substitute gaming chips by a single camera disposed at a predetermined position or a plurality of cameras disposed at predetermined positions and having different heights.

DESCRIPTION OF THE REFERENCE NUMERALS

1, Playing card
1*s*, A plurality of shuffled playing cards
2, Camera device
3, Card distributing device
4, Game table
5, Dealer
6, Customer (Game participant/Player)
7, Player position
8, Bet area
10, Area
10P, Player area
10B, Baker area
11, Game recording device
12, Image analyzing device

13, Result display lamp
14, Control device
14C, Card distribution detection device
15, Output (abnormal determination result etc.)
16, Abnormal display lamp
17, Substitute gaming chip tray
30, Distribution restriction device
33, Slot
34, Lock member
35, Driving unit
36, Lock member
37, Driving unit
40, Distribution restriction device
50, Management control device
102, Card storing portion
103, Index
105, Card guide portion
106, Opening portion
107, Card guide
109, Control unit
112, Side monitor
120, Substitute gaming chip
121, Coloring layer
122, White layer
123, Print
124, Transparent layer (Print layer)
125, RFID
126, Side RFID
127-176, 1741-1745, 1761-1765, Display lamp
200, Inspection device
201, Inlet
202, Outlet
203, Passage
204, Type determining device
205, Mark reading device
206, Print inspecting device
207, Control device

What is claimed is:

1. A management system comprising:

a win/loss determining device, wherein the win/loss determining device is configured to determine and display a win/loss result of a game played on a game table, wherein the game is played using substitute gaming chips that are individually identifiable;

a substitute gaming chip tray that is configured to hold the substitute gaming chips, for use by a dealer on the game table; and a dealer chip determining and measuring device, wherein the dealer chip determining and measuring device is configured to identify types and numbers of those of the substitute gaming chips that are held in the substitute gaming chip tray and includes a management control device;

wherein the management control device is configured to:

determine positions, types, and numbers of those of the substitute gaming chips that are on the game table based on a measurement by the dealer chip determining and measuring device;

calculate a balance of a casino side with respect to the game table using the win/loss result obtained from the win/loss determining device;

compare (a) a collection amount of substitute gaming chips to be collected from the game table by the casino side in the game based on information obtained from the dealer chip determining and measuring device and the win/loss determining device to (b) an increase amount of the substitute gaming chips in the substitute gaming chip tray after the dealer collects the substitute gaming chips into the substitute gaming chip tray;

compare (a) a payment amount of substitute gaming chips to be paid by the casino side in the game to (b) a decrease amount of the substitute gaming chips in the substitute gaming chip tray after the dealer removes one or more of the substitute gaming chips from the substitute gaming chip tray for a payout;

determine whether or not an inconsistency in at least one of a comparison result between the collection amount and the increase amount, a comparison result between the payment amount and the decrease amount, or a result of summing the comparison result between the collection amount and the increase amount and the comparison result between the payment amount and the decrease amount is present;

in a case determining that the inconsistency is not present, transmit a signal or present a display on a display device based on the inconsistency not being present; and in a case determining that the inconsistency is present:

determine whether or not a degree of the inconsistency satisfies the following conditions:

(a) the degree of the inconsistency in a one-time game is larger than a first threshold value;

(b) total sum of the degree of the inconsistency in recent predetermined-time games is larger than a second threshold value; and (c) the degree of the inconsistency is equal to or larger than a third threshold value continuously in recent predetermined-time games; and transmit a signal or present a display on a display device when the inconsistency satisfies at least one of the above conditions, wherein content of the signal or display depends on whether or not the degree of the inconsistency satisfies at least one of the above conditions.

2. The management system according to claim 1, wherein the management control device is configured so that the content of the signal or display depends on a degree of the inconsistency of the comparison result between the collection amount and the increase amount or a degree of the inconsistency of the comparison result between the payment amount and the decrease amount.

3. The management system according to claim 1, wherein the management control device is configured so that the content of the signal or the display depends on a degree of the inconsistency of the sum of the comparison result between the collection amount and the increase amount and the comparison result between the payment amount and the decrease amount.

4. The management system according to claim 1, wherein, in a case where a degree of the inconsistency is more than a predefined amount, the management control device is configured to transmit the signal, and, in a case where the degree of the inconsistency is not more than the predefined amount, the management control device is configured not to transmit the signal.

5. The management system according to claim 1, wherein the management control device is configured to output a signal for stopping the game or a signal for continuing the game when the inconsistency is determined in the comparison result between the collection amount and the increase amount or the comparison result between the payment amount and the decrease amount.

6. The management system according to claim 5, wherein the management control device is configured to output the signal for stopping the game of the game table when the inconsistency is continuous even though an amount of the inconsistency divided by a predetermined amount is a small amount.

7. The management system according to claim 1, wherein the management control device is configured to identify a game participant who participated the game in which the inconsistency has been determined.

8. The management system according to claim 1, wherein the management control device is configured to identify, and cause the display device to display, a player position or a game participant that is a cause of the inconsistency.

9. The management system according to claim 1, wherein the management control device is configured to perform the comparison between the collection amount and the increase amount for each of a plurality of players or for each of a plurality of player positions.

10. The management system according to claim 1, wherein the management control device is configured to perform the comparison between the payment amount and the decrease amount for each of a plurality of players or for each of a plurality of player positions.

11. The management system according to claim 1, wherein the win/loss determining device includes an electronic shooter, a camera, or an image analyzing device.

12. The management system according to claim 1, wherein the dealer chip determining and measuring device includes a camera, an image analyzing device, or an RFID reader.

13. The management system according to claim 12, wherein the dealer chip determining and measuring device includes a camera, an image analyzing device, and an RFID reader.

14. The management system according to claim 13, wherein the dealer chip determining and measuring device includes the RFID reader.

15. The management system according to claim 1, wherein the management control device includes a processor, a memory, or a combination thereof.

16. A management system comprising:

a win/loss determining device configured to determine a win/loss result of a game played on a game table, wherein the game is played using substitute gaming chips that are individually identifiable;

a substitute gaming chip tray configured to hold the substitute gaming chips, for use by a dealer on the game table; and a management control device configured to:

determine positions, types, and numbers of those of the substitute gaming chips that are on the game table;

calculate a balance of a casino side with respect to the game table based on the win/loss result; obtain:

a first result of a first comparison between:

a collection amount of substitute gaming chips to be collected from the game table by the casino side in the game, and an increase amount of the substitute gaming chips in the substitute gaming chip tray after the dealer collects the substitute gaming chips into the substitute gaming chip tray;

a second result of a second comparison between:

a payment amount of substitute gaming chips to be paid by the casino side in the game, and a decrease amount of the substitute gaming chips in the substitute gaming chip tray after the dealer removes one or more of the substitute gaming chips from the substitute gaming chip tray for a payout; and a third result of summing the first comparison result between the collection amount and the increase amount and the second comparison result between the payment amount and the decrease amount;

determine whether or not an inconsistency in at least one of the first to third results is present;

in a case determining that the inconsistency is not present, transmit a signal or present a display on a display device based on the inconsistency not being present; and in a case determining that the inconsistency is present:

determine whether or not a degree of the inconsistency satisfies the following conditions:

(a) the degree of the inconsistency in a one-time game is larger than a first threshold value;

(b) total sum of the degree of the inconsistency in recent predetermined-time games is larger than a second threshold value; and (c) the degree of the inconsistency is equal to or larger than a third threshold value continuously in recent predetermined-time games; and transmit a signal or present a display on a display device when the inconsistency satisfies at least one of the above conditions, wherein content of the signal or display depends on whether or not the degree of the inconsistency satisfies at least one of the above conditions.

17. The management system according to claim 16, wherein the win/loss determining device includes an electronic shooter.

18. The management system according to claim 16, wherein the management control device includes a processor, a memory, or a combination thereof.

19. The management system according to claim 16, wherein:

the management control device is further configured to receive measurement information, and the positions, types, and numbers of those of the substitute gaming chips that are on the game table is determined based on the measurement information.

20. The management system according to claim 19, further comprising a measuring device configured to generate the measurement information.

21. The management system according to claim 20, wherein the measurement device includes an RFID reader or a camera.

22. The management system according to claim 21, wherein the measurement device includes the RFID reader.

23. The management system according to claim 16, wherein a collection amount of substitute gaming chips to be collected from the game table by the casino side in the game based on the positions, types, and numbers of those of the substitute gaming chips that are on the game table, the types and numbers of those of the substitute gaming chips that are held in the substitute gaming chip tray, the win/loss result, or a combination thereof.

24. The management system according to claim 16, wherein the management control device is configured to transmit the signal or perform the display on the display device based on the first result, the second result, and the third result.

25. The management system according to claim 16, further comprising the display device.

26. The management system according to claim 16, further comprising a dealer chip determining device configured to identify types and numbers of those of the substitute gaming chips that are held in the substitute gaming chip tray.

27. The management system according to claim 26, wherein the dealer chip determining device includes a camera or an RFID reader.

28. The management system according to claim 16, further comprising:

a camera; and an image analyzer, and wherein each substitute gaming chip includes a radio frequency identification (RFID) tag.

* * * * *